United States Patent
Crabtree et al.

(10) Patent No.: US 11,531,539 B2
(45) Date of Patent: Dec. 20, 2022

(54) AUTOMATED COMPLIANCE AND TESTING FRAMEWORK FOR SOFTWARE DEVELOPMENT

(71) Applicant: QOMPLX, Inc., Tysons, VA (US)

(72) Inventors: Jason Crabtree, Vienna, VA (US); Andrew Sellers, Monument, CO (US)

(73) Assignee: QOMPLX, INC., Tysons, VA (US)

( * ) Notice: Subject to any disclaimer, the term of this patent is extended or adjusted under 35 U.S.C. 154(b) by 9 days.

(21) Appl. No.: 17/336,108

(22) Filed: Jun. 1, 2021

(65) Prior Publication Data

US 2021/0397447 A1 Dec. 23, 2021

Related U.S. Application Data

(63) Continuation-in-part of application No. 17/216,754, filed on Mar. 30, 2021, now Pat. No. 11,321,085, which is a continuation of application No. 16/856,886, filed on Apr. 23, 2020, now Pat. No. 10,970,069, which is a continuation of application No. 15/823,285, filed on Nov. 27, 2017, now Pat. No.

(Continued)

(51) Int. Cl.
| | |
|---|---|
| *G06F 11/36* | (2006.01) |
| *G06F 8/77* | (2018.01) |
| *G06F 8/71* | (2018.01) |
| *G06F 16/22* | (2019.01) |

(52) U.S. Cl.
CPC .................. *G06F 8/77* (2013.01); *G06F 8/71* (2013.01); *G06F 11/3616* (2013.01); *G06F 16/22* (2019.01)

(58) Field of Classification Search
CPC .................................................. G06F 11/362
See application file for complete search history.

(56) References Cited

U.S. PATENT DOCUMENTS

| | | |
|---|---|---|
| 5,950,010 A | 9/1999 | Hesse et al. |
| 6,256,544 B1 | 7/2001 | Weissinger |

(Continued)

FOREIGN PATENT DOCUMENTS

| | | |
|---|---|---|
| WO | 2014159150 A1 | 10/2014 |
| WO | 2017075543 A1 | 5/2017 |

*Primary Examiner* — Jae U Jeon
(74) *Attorney, Agent, or Firm* — Galvin Patent Law LLC; Brian R. Galvin

(57) ABSTRACT

A system for enforcing compliance and testing for software development, comprising an indexing service configured to create a dataset by processing and indexing source code of a project by a developer, perform a code audit on the indexed source code, store results from the code audit in the dataset, gather additional information relating to the provided project, store the additional information in the dataset, and store the dataset into memory; and a monitoring service configured to continuously monitor the project for source code changes and make changes to the dataset as needed. Further comprising an enforcement module to automatically verify code and other media related to the software development process by ensuring obligations from a rules database are met and where not able to automate the compliance check forward to an appropriate authority, receive back the manually reviewed compliance check, then produce and implement automated recommendations for compliance adherence.

20 Claims, 40 Drawing Sheets

Related U.S. Application Data 10,740,096, which is a continuation-in-part of application No. 15/788,718, filed on Oct. 19, 2017, now Pat. No. 10,861,014, which is a continuation-in-part of application No. 15/788,002, filed on Oct. 19, 2017, now abandoned, which is a continuation-in-part of application No. 15/787,601, filed on Oct. 18, 2017, now Pat. No. 10,860,660, which is a continuation-in-part of application No. 15/616,427, filed on Jun. 7, 2017, now abandoned, which is a continuation-in-part of application No. 14/925,974, filed on Oct. 28, 2015, now abandoned.

(60) Provisional application No. 62/568,312, filed on Oct. 4, 2017, provisional application No. 62/568,305, filed on Oct. 4, 2017, provisional application No. 62/568,307, filed on Oct. 4, 2017.

(56) References Cited

U.S. PATENT DOCUMENTS

| | | |
|---|---|---|
| 6,321,204 B1 * | 11/2001 | Kazami ............ G06Q 10/06312 705/7.22 |
| 7,284,274 B1 | 10/2007 | Walls et al. |
| 7,657,832 B1 * | 2/2010 | Lin ...................... G06F 40/143 715/237 |
| 7,739,653 B2 | 6/2010 | Venolia |
| 7,860,842 B2 | 12/2010 | Bronnikov et al. |
| 7,933,926 B2 | 4/2011 | Ebert |
| 8,010,494 B2 | 8/2011 | Chandrasekaran et al. |
| 8,380,843 B2 | 2/2013 | Loizeaux et al. |
| 8,607,197 B2 | 12/2013 | Barcia et al. |
| 8,731,954 B2 | 5/2014 | Heinze et al. |
| 8,799,225 B2 | 8/2014 | Vaitzblit et al. |
| 8,954,925 B2 | 2/2015 | Dutta et al. |
| 9,135,286 B2 | 9/2015 | Sengupta et al. |
| 9,143,624 B2 | 9/2015 | Rossi |
| 9,286,063 B2 | 3/2016 | Kriegsman et al. |
| 9,946,740 B2 | 4/2018 | Athani et al. |
| 10,180,780 B2 | 1/2019 | Ainalem |
| 10,318,739 B2 | 6/2019 | Brucker et al. |
| 10,360,203 B2 | 7/2019 | Bhatnagar et al. |
| 2004/0267756 A1 * | 12/2004 | Bayardo, Jr. ............ G06F 16/93 |
| 2005/0060317 A1 | 3/2005 | Lott et al. |
| 2005/0289072 A1 | 12/2005 | Sabharwal |
| 2006/0149575 A1 | 7/2006 | Varadarajan et al. |
| 2006/0288035 A1 | 12/2006 | Viavant |
| 2007/0005665 A1 | 1/2007 | Vaitzblit et al. |
| 2009/0049094 A1 | 2/2009 | Howell et al. |
| 2010/0228835 A1 * | 9/2010 | Pitts .................... G06F 12/0813 709/219 |
| 2010/0275183 A1 | 10/2010 | Panicker et al. |
| 2012/0109806 A1 * | 5/2012 | Willard .................. G06Q 40/00 705/35 |
| 2012/0272220 A1 | 10/2012 | Calcagno et al. |
| 2013/0014093 A1 * | 1/2013 | Lee ............................ G06F 8/75 717/142 |
| 2015/0124644 A1 | 5/2015 | Pani |
| 2016/0162813 A1 | 6/2016 | Hoffman et al. |
| 2016/0275123 A1 | 9/2016 | Lin et al. |

\* cited by examiner

ND TESTING
AUTOMATED COMPLIANCE AND TESTING FRAMEWORK FOR SOFTWARE DEVELOPMENT

CROSS-REFERENCE TO RELATED APPLICATIONS

Priority is claimed in the application data sheet to the following patents or patent applications, the entire written description of each of which is expressly incorporated herein by reference in its entirety:
Ser. No. 17/216,754
Ser. No. 16/856,886
Ser. No. 15/823,285
Ser. No. 15/788,718
Ser. No. 15/788,002
Ser. No. 15/787,601
62/568,312
Ser. No. 15/616,427
Ser. No. 14/925,974
62/568,305
62/568,307

BACKGROUND OF THE INVENTION

Field of the Invention

The disclosure relates to the field of software development frameworks, particularly to code compliance and testing.

Discussion of the State of the Art

Securing modern software systems is a formidable task, largely because software developers are under strict deadlines to push products to market without a full analysis of cybersecurity concerns. Currently, no widely available system or method can evaluate the cybersecurity of technology components throughout their entire lifecycle to a sufficient degree. Thus, there is ample opportunity for improvement in software and manufacturer suites used in product development to meet all the requirements of the software development cycle.

What is needed is a system that can automate compliance checking and testing for a codebase. Such a system should simplify management of complex projects for both developers, and end-users.

SUMMARY OF THE INVENTION

Accordingly, the inventor has conceived, and reduced to practice, a system and method for enforcing compliance and testing for software development, comprising an indexing service configured to create a dataset by processing and indexing source code of a project by a developer, perform a code audit on the indexed source code, store results from the code audit in the dataset, gather additional information relating to the provided project, store the additional information in the dataset, and store the dataset into memory; and a monitoring service configured to continuously monitor the project for source code changes and make changes to the dataset as needed. Further comprising an enforcement module to automatically verify code and other media related to the software development process by ensuring obligations from a rules database are met and where not able to automate the compliance check forward to an appropriate authority, receive back the manually reviewed compliance check, then produce and implement automated recommendations for compliance adherence.

According to a first preferred embodiment, a system for a compliance and testing framework for software development is disclosed, comprising: a computing device comprising at least a processor and a memory; an indexing service comprising a first plurality of programming instructions stored in the memory and operable on the processor of the computing device, wherein the first plurality of programmable instructions, when operating on the processor, cause the processor to: create a dataset by processing and indexing source code of a project provided by a developer; perform a code audit using automated analysis using a distributed computational graph comprising at least a plurality of network-addressable processors and memories operating on a plurality of network-connected computing devices, the distributed computational graph collectively maintaining a distributed computational graph and a plurality of interfaces for accessing the functionality thereof across a network, on the indexed source code; store results from the code audit in the dataset; gather additional information relating to a project; store the additional information in the dataset; and store the dataset into memory; and an enforcement module comprising a second plurality of programming instructions stored in the memory and operable on the processor of the computing device, wherein the second plurality of programmable instructions, when operating on the processor, cause the processor to: retrieve a software asset from the database for compliance verification, wherein the software asset is a portion of code; retrieve metadata from the additional information, wherein the metadata pertains to the software asset; retrieve rules and obligations relating to the software asset using the metadata from a rules database; automatically confirm the compliance of the software asset according to the rules and obligations; produce a compliance recommendation for any non-complaint part of the software asset; forward any non-automatically verifiable rule and obligation to an enforcement queue; receive a manual recommendation and an approval or disapproval regarding the any non-automatically verifiable rule and obligation; and store the results of the compliance verification.

According to a second preferred embodiment, a method for a compliance and testing framework for software development is disclosed, comprising the steps of: creating a dataset by processing and indexing source code of a project provided by a developer; performing a code audit using automated analysis using a distributed computational graph comprising at least a plurality of network-addressable processors and memories operating on a plurality of network-connected computing devices, the distributed computational graph collectively maintaining a distributed computational graph and a plurality of interfaces for accessing the functionality thereof across a network, on the indexed source code; storing results from the code audit in the dataset; gathering additional information relating to a project; storing the additional information in the dataset; storing the dataset into memory; retrieving a software asset from the database for compliance verification, wherein the software asset is a portion of code; retrieving metadata from the additional information, wherein the metadata pertains to the software asset; retrieving rules and obligations relating to the software asset using the metadata from a rules database; automatically confirming the compliance of the software asset according to the rules and obligations; producing a compliance recommendation for any non-complaint part of the software asset; forwarding any non-automatically verifiable rule and obligation to an enforcement queue; receiving a manual recommendation and an approval or disapproval regarding the any non-automatically verifiable rule and obligation; and storing the results of the compliance verification.

According to various aspects; further comprising a monitoring service comprising a third plurality of programming instructions stored in the memory and operable on the processor of the computing device, wherein the third plurality of programmable instructions, when operating on the processor, cause the processor to continuously monitor the project for at least source code changes and to make changes to the dataset as needed; further comprising a licensing service that the developer may use to manage, track, and restrict usage of the provided project; wherein the licensing service may be used to detect and automatically take steps to resolve inappropriate usage of the provided project; further comprising a recommendation engine to provide usage recommendations to end-users; wherein at least a portion of the information relating to the provided project that is gathered comprises links to relevant message forums; wherein at least a portion of the information relating to the provided project that is gathered comprises vulnerability information of related libraries and dependencies; wherein a software asset may be any medium associated with a software development process; wherein the compliance recommendation is automatically applied; further comprising a user interface.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION

Figure 1:
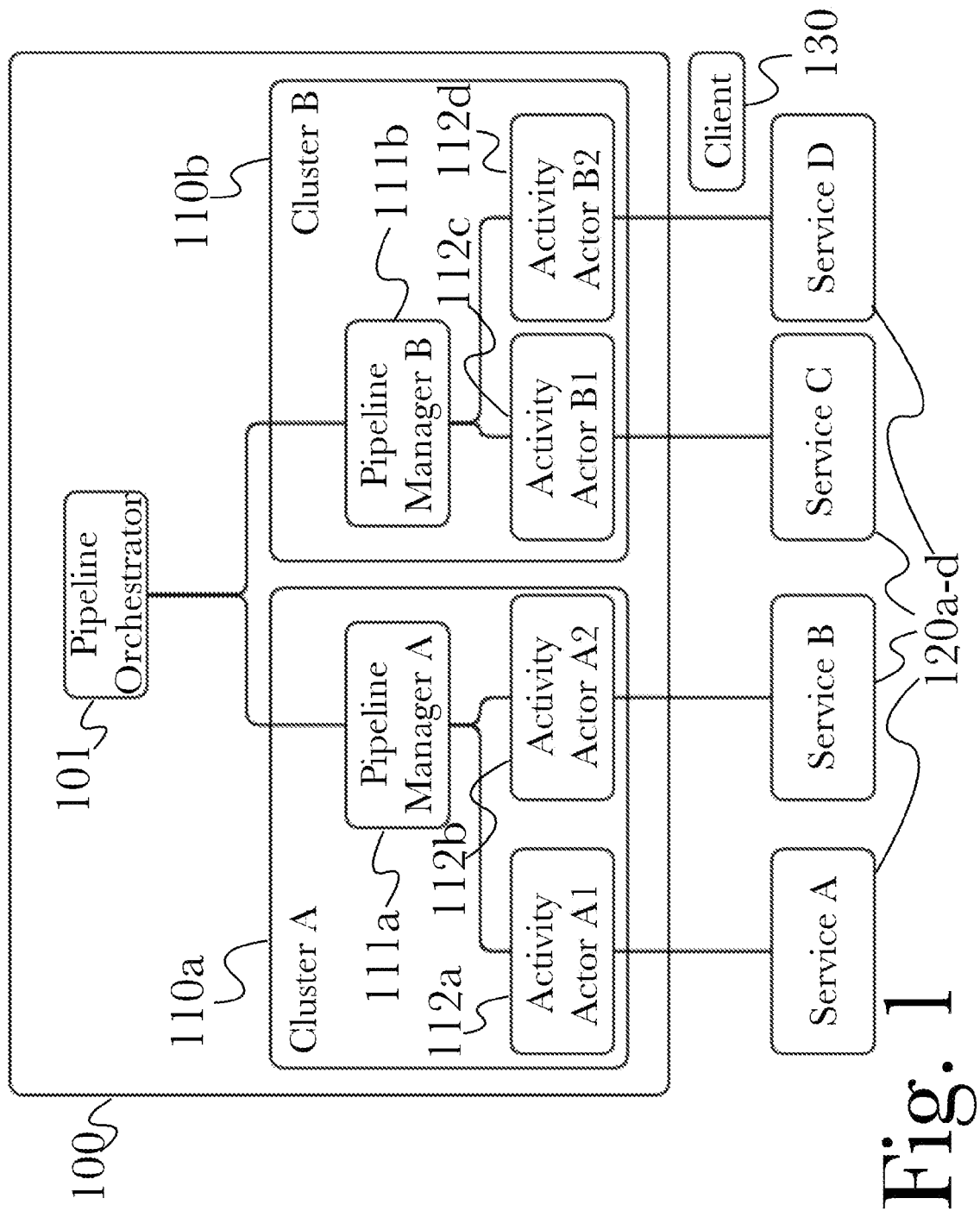
FIG. 1 is a diagram of an exemplary architecture for a system for rapid predictive analysis of very large data sets using an actor-driven distributed computational graph, according to one aspect.

The inventor has conceived, and reduced to practice, a system and method for enforcing compliance and testing for software development, comprising an indexing service configured to create a dataset by processing and indexing source code of a project by a developer, perform a code audit on the indexed source code, store results from the code audit in the dataset, gather additional information relating to the provided project, store the additional information in the dataset, and store the dataset into memory; and a monitoring service configured to continuously monitor the project for source code changes and make changes to the dataset as needed. Further comprising an enforcement module to automatically verify code and other media related to the software development process by ensuring obligations from a rules database are met and where not able to automate the compliance check forward to an appropriate authority, receive back the manually reviewed compliance check, then produce and implement automated recommendations for compliance adherence.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

As used herein, "graph" is a representation of information and relationships, where each primary unit of information makes up a "node" or "vertex" of the graph and the relationship between two nodes makes up an edge of the graph. The concept of "node" as used herein can be quite general; nodes are elements of a workflow that produce data output (or other side effects to include internal data changes), and nodes may be for example (but not limited to) data stores that are queried or transformations that return the result of arbitrary operations over input data. Nodes can be further qualified by the connection of one or more descriptors or "properties" to that node. For example, given the node "James R," name information for a person, qualifying properties might be "183 cm tall", "DOB 08/13/1965" and "speaks English". Similar to the use of properties to further describe the information in a node, a relationship between two nodes that forms an edge can be qualified using a "label". Thus, given a second node "Thomas G," an edge between "James R" and "Thomas G" that indicates that the two people know each other might be labeled "knows." When graph theory notation (Graph=(Vertices, Edges)) is applied this situation, the set of nodes are used as one parameter of the ordered pair, V and the set of 2 element edge endpoints are used as the second parameter of the ordered pair, E. When the order of the edge endpoints within the pairs of E is not significant, for example, the edge James R, Thomas G is equivalent to Thomas G, James R, the graph is designated as "undirected." Under circumstances when a relationship flows from one node to another in one direction, for example James R is "taller" than Thomas G, the order of the endpoints is significant. Graphs with such edges are designated as "directed." In the distributed computational graph system, transformations within transformation pipeline are represented as directed graph with each transformation comprising a node and the output messages between transformations comprising edges. Distributed computational graph stipulates the potential use of non-linear transformation pipelines which are programmatically linearized. Such linearization can result in exponential growth of resource consumption. The most sensible approach to overcome possibility is to introduce new transformation pipelines just as they are needed, creating only those that are ready to compute. Such method results in transformation graphs which are highly variable in size and node, edge composition as the system processes data streams. Those familiar with the art will realize that transformation graph may assume many shapes and sizes with a vast topography of edge relationships. The examples given were chosen for illustrative purposes only and represent a small number of the simplest of possibilities. These examples should not be taken to define the possible graphs expected as part of operation of the invention.

As used herein, "transformation" is a function performed on zero or more streams of input data which results in a single stream of output which may or may not then be used as input for another transformation. Transformations may comprise any combination of machine, human or machine-human interactions Transformations need not change data that enters them, one example of this type of transformation would be a storage transformation which would receive input and then act as a queue for that data for subsequent transformations. As implied above, a specific transformation may generate output data in the absence of input data. A time stamp serves as an example. In the invention, transformations are placed into pipelines such that the output of one transformation may serve as an input for another. These pipelines can consist of two or more transformations with the number of transformations limited only by the resources of the system. Historically, transformation pipelines have been linear with each transformation in the pipeline receiving input from one antecedent and providing output to one subsequent with no branching or iteration. Other pipeline configurations are possible. The invention is designed to permit several of these configurations including, but not limited to: linear, afferent branch, efferent branch and cyclical.

A "database" or "data storage subsystem" (these terms may be considered substantially synonymous), as used herein, is a system adapted for the long-term storage, indexing, and retrieval of data, the retrieval typically being via some sort of querying interface or language. "Database" may be used to refer to relational database management systems known in the art, but should not be considered to be limited to such systems. Many alternative database or data storage system technologies have been, and indeed are being, introduced in the art, including but not limited to distributed non-relational data storage systems such as Hadoop, column-oriented databases, in-memory databases, and the like. While various aspects may preferentially employ one or another of the various data storage subsystems available in the art (or available in the future), the invention should not be construed to be so limited, as any data storage architecture may be used according to the aspects. Similarly, while in some cases one or more particular data storage needs are described as being satisfied by separate components (for example, an expanded private capital markets database and a configuration database), these descriptions refer to functional uses of data storage systems and do not refer to their physical architecture. For instance, any group of data storage systems of databases referred to herein may be included together in a single database management system operating on a single machine, or they may be included in a single database management system operating on a cluster of machines as is known in the art. Similarly, any single database (such as an expanded private capital markets database) may be implemented on a single machine, on a set of machines using clustering technology, on several machines connected by one or more messaging systems known in the art, or in a master/slave arrangement common in the art. These examples should make clear that no particular architectural approaches to database management is preferred according to the invention, and choice of data storage technology is at the discretion of each implementer, without departing from the scope of the invention as claimed.

A "data context", as used herein, refers to a set of arguments identifying the location of data. This could be a Rabbit queue, a .csv file in cloud-based storage, or any other such location reference except a single event or record. Activities may pass either events or data contexts to each other for processing. The nature of a pipeline allows for direct information passing between activities, and data locations or files do not need to be predetermined at pipeline start.

A "pipeline", as used herein and interchangeably referred to as a "data pipeline" or a "processing pipeline", refers to a set of data streaming activities and batch activities. Streaming and batch activities can be connected indiscriminately within a pipeline. Events will flow through the streaming activity actors in a reactive way. At the junction of a streaming activity to batch activity, there will exist a StreamBatchProtocol data object. This object is responsible for determining when and if the batch process is run. One or more of three possibilities can be used for processing triggers: regular timing interval, every N events, or optionally an external trigger. The events are held in a queue or similar until processing. Each batch activity may contain a "source" data context (this may be a streaming context if the upstream activities are streaming), and a "destination" data context (which is passed to the next activity). Streaming activities may have an optional "destination" streaming data context (optional meaning: caching/persistence of events vs. ephemeral), though this should not be part of the initial implementation.

Conceptual Architecture

FIG. 1 is a diagram of an exemplary architecture for a system for rapid predictive analysis of very large data sets using an actor-driven distributed computational graph 100, according to one aspect. According to the aspect, a directed computational graph (DCG) 100 may comprise a pipeline orchestrator 101 that may be used to perform the functions of a transformation pipeline software module 561 as described below, with reference to FIG. 5. Pipeline orchestrator 101 may spawn a plurality of child pipeline clusters 110a-b, which may be used as dedicated workers for streamlining parallel processing. In some arrangements, an entire data processing pipeline may be passed to a child cluster 110a for handling, rather than individual processing tasks, enabling each child cluster 110a-b to handle an entire data pipeline in a dedicated fashion to maintain isolated processing of different pipelines using different cluster nodes 110a-b. Pipeline orchestrator 101 may provide a software API for starting, stopping, submitting, or saving pipelines. When a pipeline is started, pipeline orchestrator 101 may send the pipeline information to an available worker node 110a-b, for example using AKKA™ clustering. For each pipeline initialized by pipeline orchestrator 101, a reporting object with status information may be maintained. Streaming activities may report the last time an event was processed, and the number of events processed. Batch activities may report status messages as they occur. Pipeline orchestrator 101 may perform batch caching using, for example, an IGFS™ caching filesystem. This allows activities 112a-d within a pipeline 110a-b to pass data contexts to one another, with any necessary parameter configurations.

A pipeline manager 111a-b may be spawned for every new running pipeline, and may be used to send activity, status, lifecycle, and event count information to the pipeline orchestrator 101. Within a particular pipeline, a plurality of activity actors 112a-d may be created by a pipeline manager 111a-b to handle individual tasks, and provide output to data services 120a-d, optionally using a client API 130 for integration with external services or products. Data models used in a given pipeline may be determined by the specific pipeline and activities, as directed by a pipeline manager 111a-b. Each pipeline manager 111a-b controls and directs the operation of any activity actors 112a-d spawned by it. A service-specific client API 130 is separated from any particular activity actor 112a-d and may be handled by a dedicated service actor in a separate cluster. A pipeline process may need to coordinate streaming data between tasks. For this, a pipeline manager 111a-b may spawn service connectors to dynamically create TCP connections between activity instances 112a-d. Data contexts may be maintained for each individual activity 112a-d, and may be cached for provision to other activities 112a-d as needed. A data context defines how an activity accesses information, and an activity 112a-d may process data or simply forward it to a next step. Forwarding data between pipeline steps may route data through a streaming context or batch context.

A client service cluster 130 may operate a plurality of service actors 221a-d to serve the requests of activity actors 112a-d, ideally maintaining enough service actors 221a-d to support each activity per the service type. These may also be arranged within service clusters 220a-d, in an alternate arrangement described below in FIG. 2.

Figure 2:
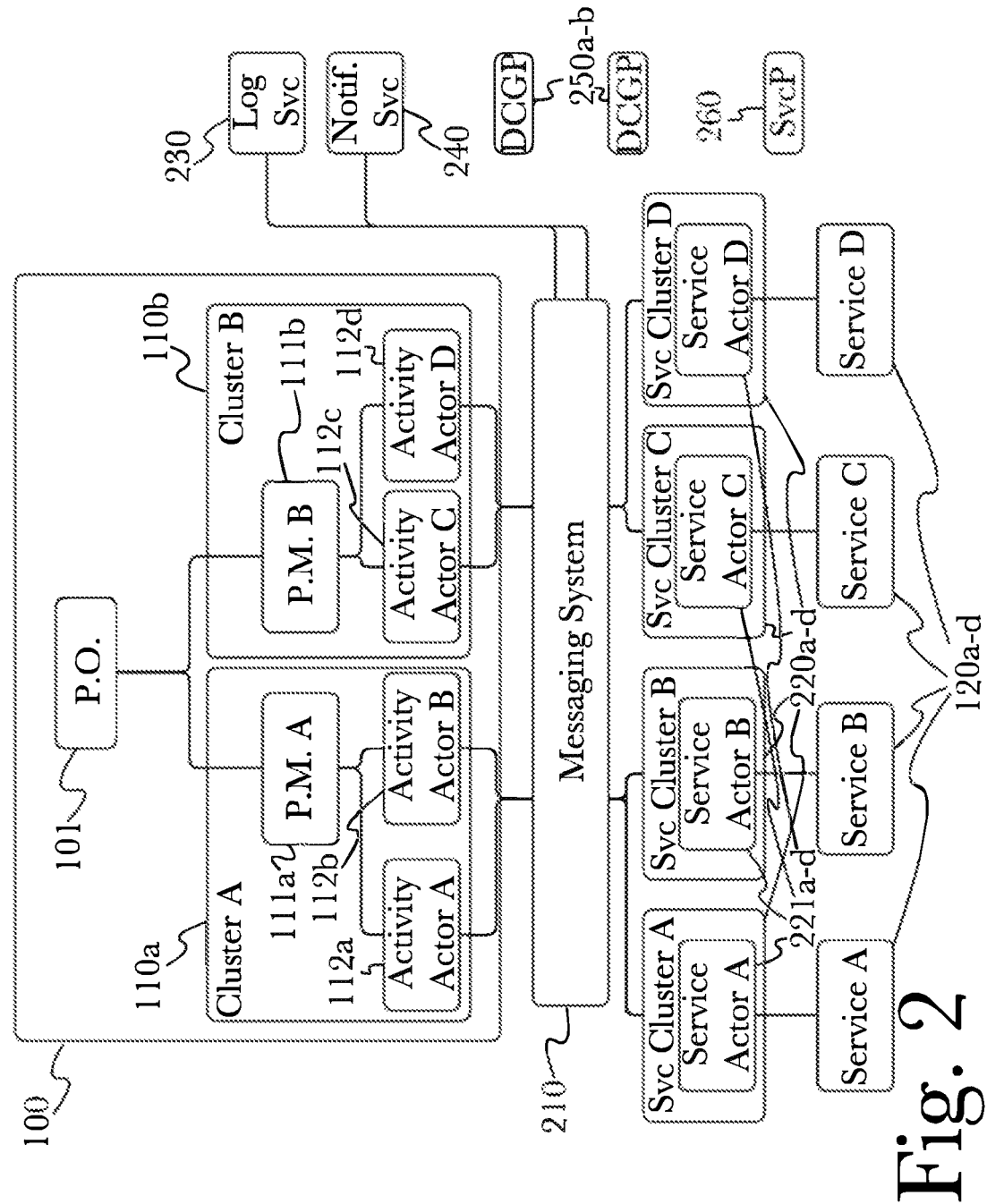
FIG. 2 is a diagram of an exemplary architecture for a system for rapid predictive analysis of very large data sets using an actor-driven distributed computational graph, according to one aspect.

FIG. 2 is a diagram of an exemplary architecture for a system for rapid predictive analysis of very large data sets using an actor-driven distributed computational graph 100, according to one aspect. According to the aspect, a DCG 100 may be used with a messaging system 210 that enables communication with any number of various services and protocols, relaying messages and translating them as needed into protocol-specific API system calls for interoperability with external systems (rather than requiring a particular protocol or service to be integrated into a DCG 100). Service actors 221a-d may be logically grouped into service clusters 220a-d, in a manner similar to the logical organization of activity actors 112a-d within clusters 110a-b in a data pipeline. A logging service 230 may be used to log and sample DCG requests and messages during operation while notification service 240 may be used to receive alerts and other notifications during operation (for example to alert on errors, which may then be diagnosed by reviewing records from logging service 230), and by being connected externally to messaging system 210, logging and notification services can be added, removed, or modified during operation without impacting DCG 100. A plurality of DCG-compatible protocols 250a-b may be used to provide structured messaging between a DCG 100 and messaging system 210, or to enable messaging system 210 to distribute DCG messages across service clusters 220a-d as shown. A service protocol 260 may be used to define service interactions so that a DCG 100 may be modified without impacting service implementations. In this manner, it can be appreciated that the overall structure of a system using an actor-driven DCG 100 operates in a modular fashion, enabling modification and substitution of various components without impacting other operations or requiring additional reconfiguration.

Figure 3:
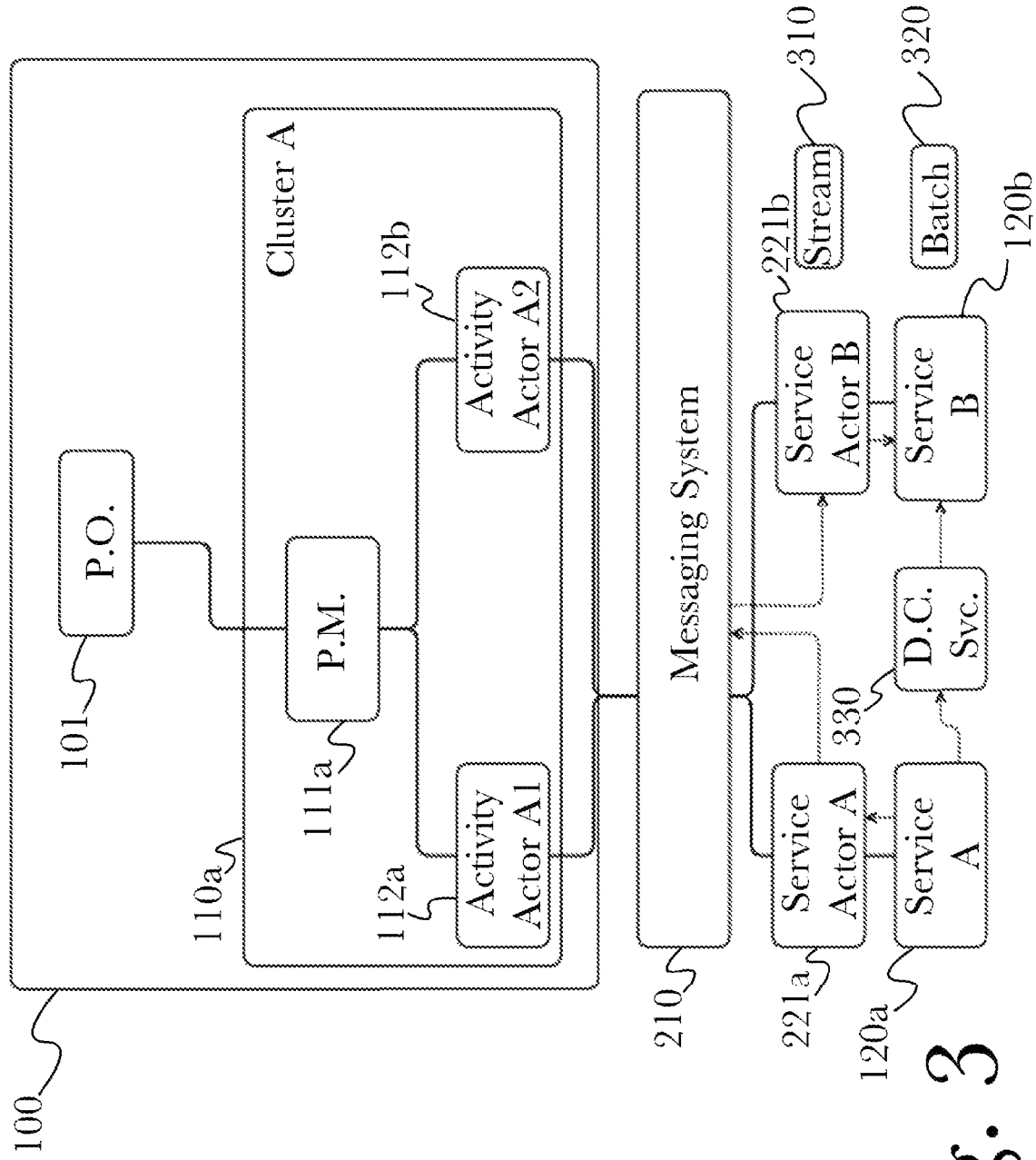
FIG. 3 is a diagram of an exemplary architecture for a system for rapid predictive analysis of very large data sets using an actor-driven distributed computational graph, according to one aspect.

FIG. 3 is a diagram of an exemplary architecture for a system for rapid predictive analysis of very large data sets using an actor-driven distributed computational graph 100, according to one aspect. According to the aspect, a variant messaging arrangement may utilize messaging system 210 as a messaging broker using a streaming protocol 310, transmitting and receiving messages immediately using messaging system 210 as a message broker to bridge communication between service actors 221a-b as needed. Alternately, individual services 120a-b may communicate directly in a batch context 320, using a data context service 330 as a broker to batch-process and relay messages between services 120a-b.

Figure 4:
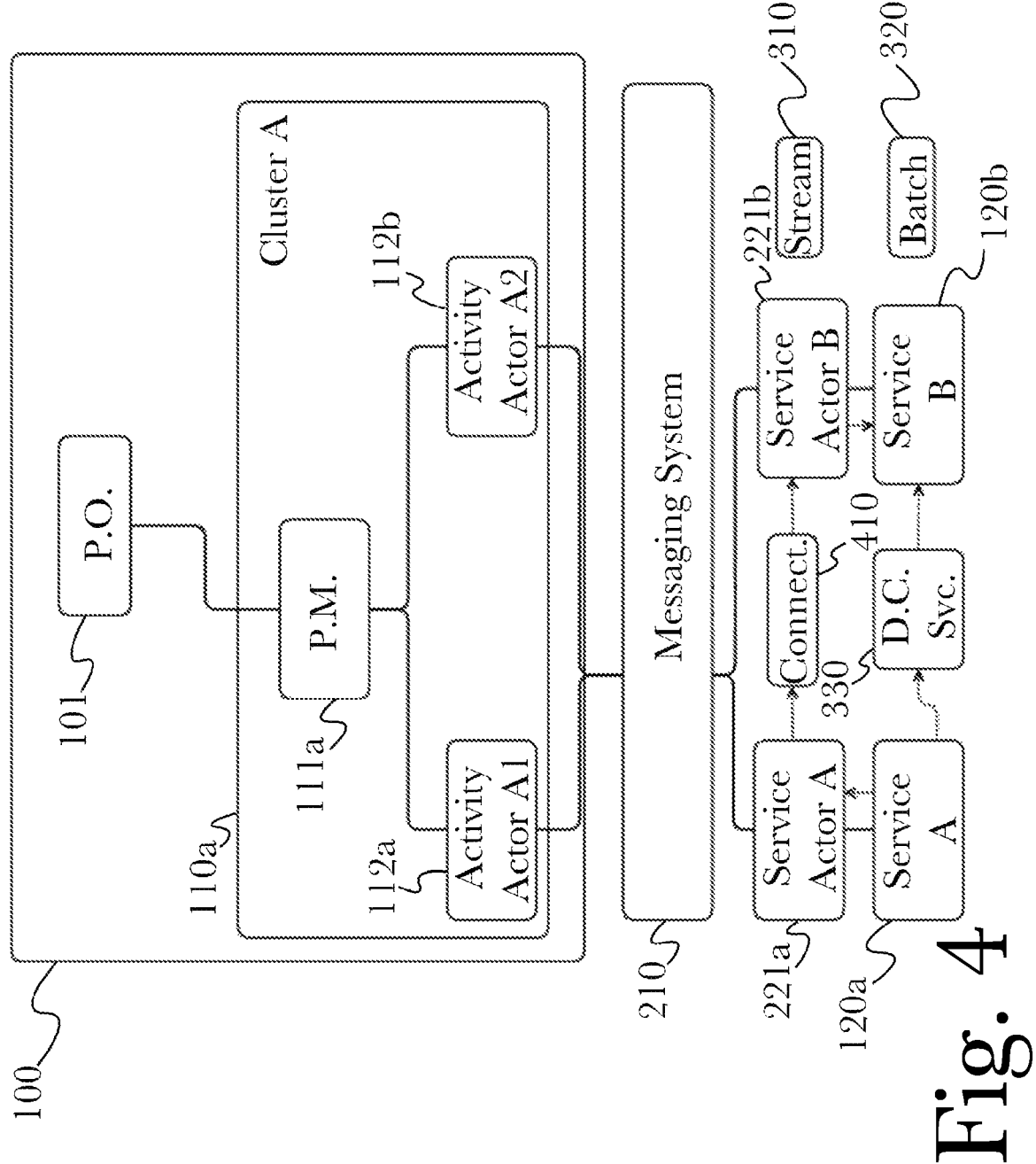
FIG. 4 is a diagram of an exemplary architecture for a system for rapid predictive analysis of very large data sets using an actor-driven distributed computational graph, according to one aspect.

FIG. 4 is a diagram of an exemplary architecture for a system for rapid predictive analysis of very large data sets using an actor-driven distributed computational graph 100, according to one aspect. According to the aspect, a variant messaging arrangement may utilize a service connector 410 as a central message broker between a plurality of service actors 221a-b, bridging messages in a streaming context 310 while a data context service 330 continues to provide direct peer-to-peer messaging between individual services 120a-b in a batch context 320.

It should be appreciated that various combinations and arrangements of the system variants described above (referring to FIGS. 1-4) may be possible, for example using one particular messaging arrangement for one data pipeline directed by a pipeline manager 111a-b, while another pipeline may utilize a different messaging arrangement (or may not utilize messaging at all). In this manner, a single DCG 100 and pipeline orchestrator 101 may operate individual pipelines in the manner that is most suited to their particular needs, with dynamic arrangements being made possible through design modularity as described above in FIG. 2.

Figure 5:
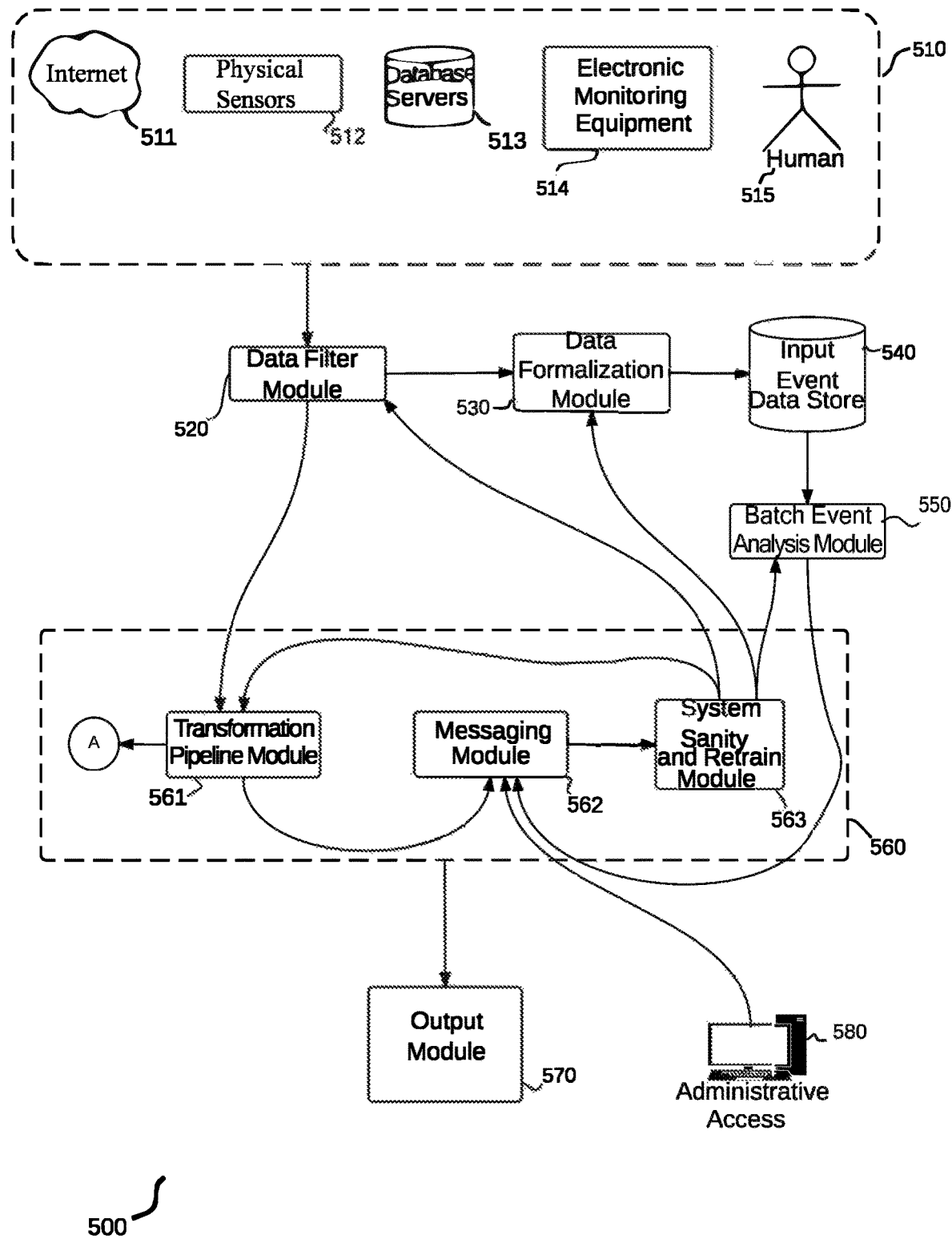
FIG. 5 is a diagram of an exemplary architecture for a system where streams of input data from one or more of a plurality of sources are analyzed to predict outcome using both batch analysis of acquired data and transformation pipeline manipulation of current streaming data according to one aspect.

FIG. 5 is a block diagram of an exemplary architecture for a system 500 for predictive analysis of very large data sets using a distributed computational graph. According to the aspect, streaming input feeds 510 may be a variety of data sources which may include but are not limited to the internet 511, arrays of physical sensors 512, database servers 513, electronic monitoring equipment 514 and direct human interaction 515 ranging from a relatively few number of participants to a large crowd sourcing campaign. Streaming data from any combinations of listed sources and those not listed may also be expected to occur as part of the operation of the invention as the number of streaming input sources is not limited by the design. All incoming streaming data may be passed through a data filter software module 520 to remove information that has been damaged in transit, is misconfigured, or is malformed in some way that precludes use. Many of the filter parameters may be expected to be preset prior to operation, however, design of the invention makes provision for the behavior of the filter software module 520 to be changed as progression of analysis requires through the automation of the system sanity and retrain software module 563 which may serve to optimize system operation and analysis function. The data stream may also be split into two identical substreams at the data filter software module 520 with one substream being fed into a streaming analysis pathway that includes the transformation pipeline software module 561 of the distributed computational graph 560. The other substream may be fed to data formalization software module 530 as part of the batch analysis pathway. The data formalization module 530 formats the data stream entering the batch analysis pathway of the invention into data records to be stored by the input event data store 540. The input event data store 540 can be a database of any architectural type known to those knowledgeable in the art, but based upon the quantity of the data the data store module would be expected to store and retrieve, options using highly distributed storage and map reduce query protocols, of which Hadoop is one, but not the only example, may be generally preferable to relational database schema.

Analysis of data from the input event data store may be performed by the batch event analysis software module 550. This module may be used to analyze the data in the input event data store for temporal information such as trends, previous occurrences of the progression of a set of events, with outcome, the occurrence of a single specific event with all events recorded before and after whether deemed relevant at the time or not, and presence of a particular event with all documented possible causative and remedial elements, including best guess probability information. Those knowledgeable in the art will recognize that while examples here focus on having stores of information pertaining to time, the use of the invention is not limited to such contexts as there are other fields where having a store of existing data would be critical to predictive analysis of streaming data 561. The search parameters used by the batch event analysis software module 550 are preset by those conducting the analysis at the beginning of the process, however, as the search matures and results are gleaned from the streaming data during transformation pipeline software module 561 operation, providing the system more timely event progress details, the system sanity and retrain software module 563 may automatically update the batch analysis parameters 550. Alternately, findings outside the system may precipitate the authors of the analysis to tune the batch analysis parameters administratively from outside the system 570, 562, 563. The real-time data analysis core 560 of the invention should be considered made up of a transformation pipeline software module 561, messaging module 562 and system sanity and retrain software module 563. The messaging module 562 has connections from both the batch and the streaming data analysis pathways and serves as a conduit for operational as well as result information between those two parts of the invention. The message module also receives messages from those administering analyses 580. Messages aggregated by the messaging module 562 may then be sent to system sanity and retrain software module 563 as appropriate. Several of the functions of the system sanity and retrain software module have already been disclosed. Briefly, this is software that may be used to monitor the progress of streaming data analysis optimizing coordination between streaming and batch analysis pathways by modifying or "retraining" the operation of the data filter software module 520, data formalization software module 530 and batch event analysis software module 540 and the transformation pipeline module 550 of the streaming pathway when the specifics of the search may change due to results produced during streaming analysis. System sanity and retrain module 563 may also monitor for data searches or transformations that are processing slowly or may have hung and for results that are outside established data stability boundaries so that actions can be implemented to resolve the issue. While the system sanity and retrain software module 563 may be designed to act autonomously and employs computer learning algorithms, according to some arrangements status updates may be made by administrators or potentially direct changes to operational parameters by such, according to the aspect.

Streaming data entering from the outside data feeds 510 through the data filter software module 520 may be analyzed in real time within the transformation pipeline software module 561. Within a transformation pipeline, a set of functions tailored to the analysis being run are applied to the input data stream. According to the aspect, functions may be applied in a linear, directed path or in more complex configurations. Functions may be modified over time during an analysis by the system sanity and retrain software module 563 and the results of the transformation pipeline, impacted by the results of batch analysis are then output in the format stipulated by the authors of the analysis which may be human readable printout, an alarm, machine readable information destined for another system or any of a plurality of other forms known to those in the art.

Figure 6:
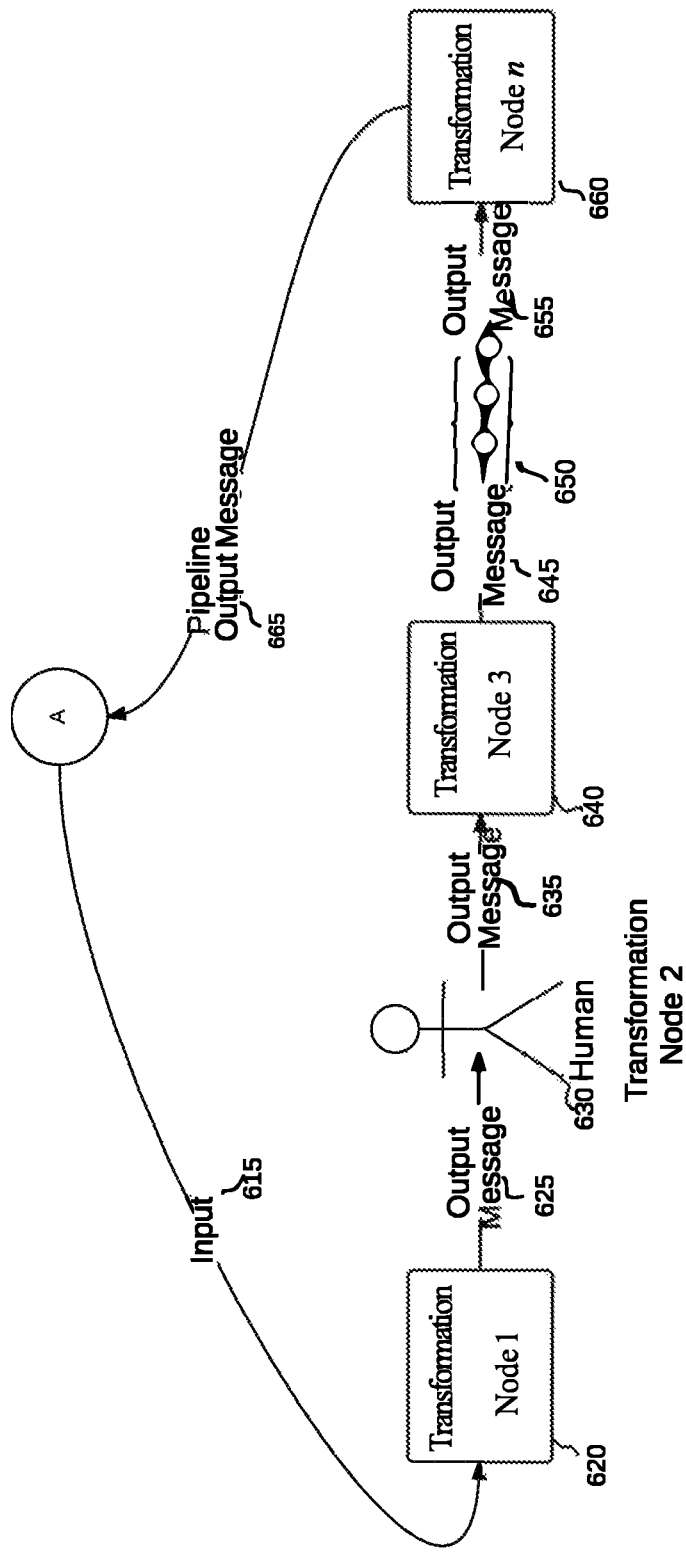
FIG. 6 is a diagram of an exemplary architecture for a linear transformation pipeline system which introduces the concept of the transformation pipeline as a directed graph of transformation nodes and messages according to one aspect.

FIG. 6 is a block diagram of a preferred architecture for a transformation pipeline within a system for predictive analysis of very large data sets using distributed computational graph 600. According to the aspect, streaming input from the data filter software module 520, 615 serves as input to the first transformation node 620 of the transformation pipeline. Transformation node's function is performed on input data stream and transformed output message 625 is sent to transformation node 2 630. The progression of transformation nodes 620, 630, 640, 650, 660 and associated output messages from each node 625, 635, 645, 655, 665 is linear in configuration this is the simplest arrangement and, as previously noted, represents the current state of the art. While transformation nodes are described according to various aspects as uniform shape (referring to FIGS. 6-9), such uniformity is used for presentation simplicity and clarity and does not reflect necessary operational similarity between transformations within the pipeline. It should be appreciated that one knowledgeable in the field will realize that certain transformations in a pipeline may be entirely self-contained; certain transformations may involve direct human interaction 630, such as selection via dial or dials, positioning of switch or switches, or parameters set on control display, all of which may change during analysis; other transformations may require external aggregation or correlation services or may rely on remote procedure calls to synchronous or asynchronous analysis engines as might occur in simulations among a plurality of other possibilities. Further according to the aspect, individual transformation nodes in one pipeline may represent function of another transformation pipeline. It should be appreciated that the node length of transformation pipelines depicted in no way confines the transformation pipelines employed by the invention to an arbitrary maximum length 640, 650, 660 as, being distributed, the number of transformations would be limited by the resources made available to each implementation of the invention. It should be further appreciated that there need be no limits on transform pipeline length. Output of the last transformation node and by extension, the transform pipeline 660 may be sent back to messaging software module 562 for predetermined action.

Figure 7:
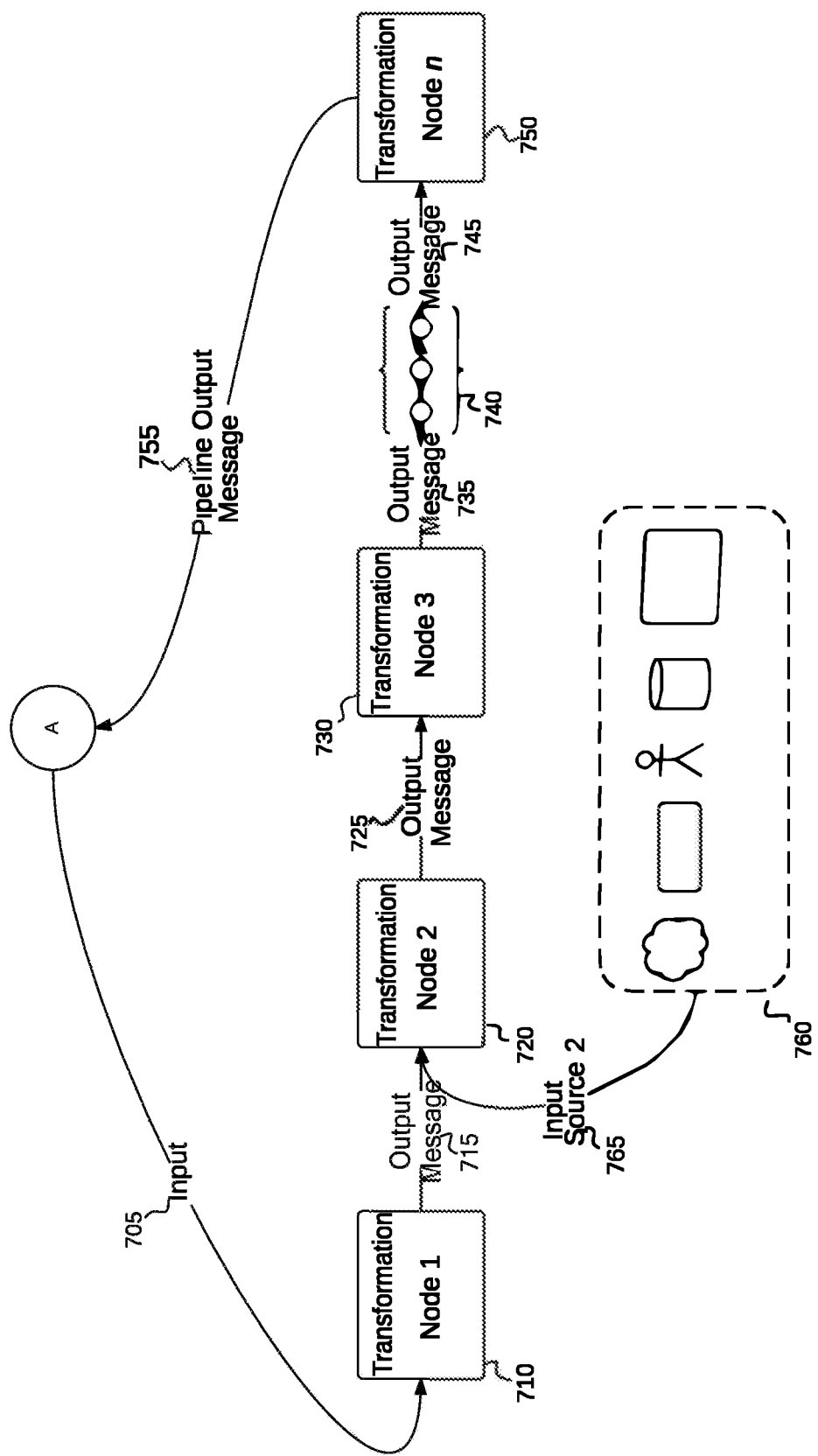
FIG. 7 is a diagram of an exemplary architecture for a transformation pipeline system where one of the transformations receives input from more than one source which introduces the concept of the transformation pipeline as a directed graph of transformation nodes and messages according to one aspect.

FIG. 7 is a block diagram of another preferred architecture for a transformation pipeline within a system for predictive analysis of very large data sets using distributed computational graph 700. According to the aspect, streaming input from a data filter software module 520, 705 serves as input to the first transformation node 710 of the transformation pipeline. Each transformation node's function 710, 720, 730, 740, 750 is performed on input data stream and transformed output message 715, 725, 735, 745, 755, 765 is sent to the next step. In this aspect, transformation node 2 720 has a second input stream 760. The specific source of this input is inconsequential to the operation of the invention and could be another transformation pipeline software module, a data store, human interaction, physical sensors, monitoring equipment for other electronic systems or a stream from the internet as from a crowdsourcing campaign, just to name a few possibilities 760. Functional integration of a second input stream into one transformation node requires the two input stream events be serialized. The invention performs this serialization using a decomposable transformation software module (not shown), the function of which is described below, referring to FIG. 13. While transformation nodes are described according to various aspects as uniform shape (referring to FIGS. 6-9), such uniformity is used for presentation simplicity and clarity and does not reflect necessary operational similarity between transformations within the pipeline. It should be appreciated that one knowledgeable in the field will realize that certain transformations in a pipeline may be entirely self-contained; certain transformations may involve direct human interaction 630, such as selection via dial or dials, positioning of switch or switches, or parameters set on control display, all of which may change during analysis; other transformations may require external aggregation or correlation services or may rely on remote procedure calls to synchronous or asynchronous analysis engines as might occur in simulations among a plurality of other possibilities. For example, engines may be singletons (composed of a single activity or transformation). Furthermore, leveraging the architecture in this way allows for versioning and functional decomposition (i.e. embedding entire saved workflows as single nodes in other workflows). Further according to the aspect, individual transformation nodes in one pipeline may represent function of another transformation pipeline. It should be appreciated that the node length of transformation pipelines depicted in no way confines the transformation pipelines employed by the invention to an arbitrary maximum length 710, 720, 730, 740, 750, as, being distributed, the number of transformations would be limited by the resources made available to each implementation of the invention. It should be further appreciated that there need be no limits on transform pipeline length. Output of the last transformation node and by extension, the transform pipeline, 750 may be sent back to messaging software module 562 for pre-decided action.

Figure 8:
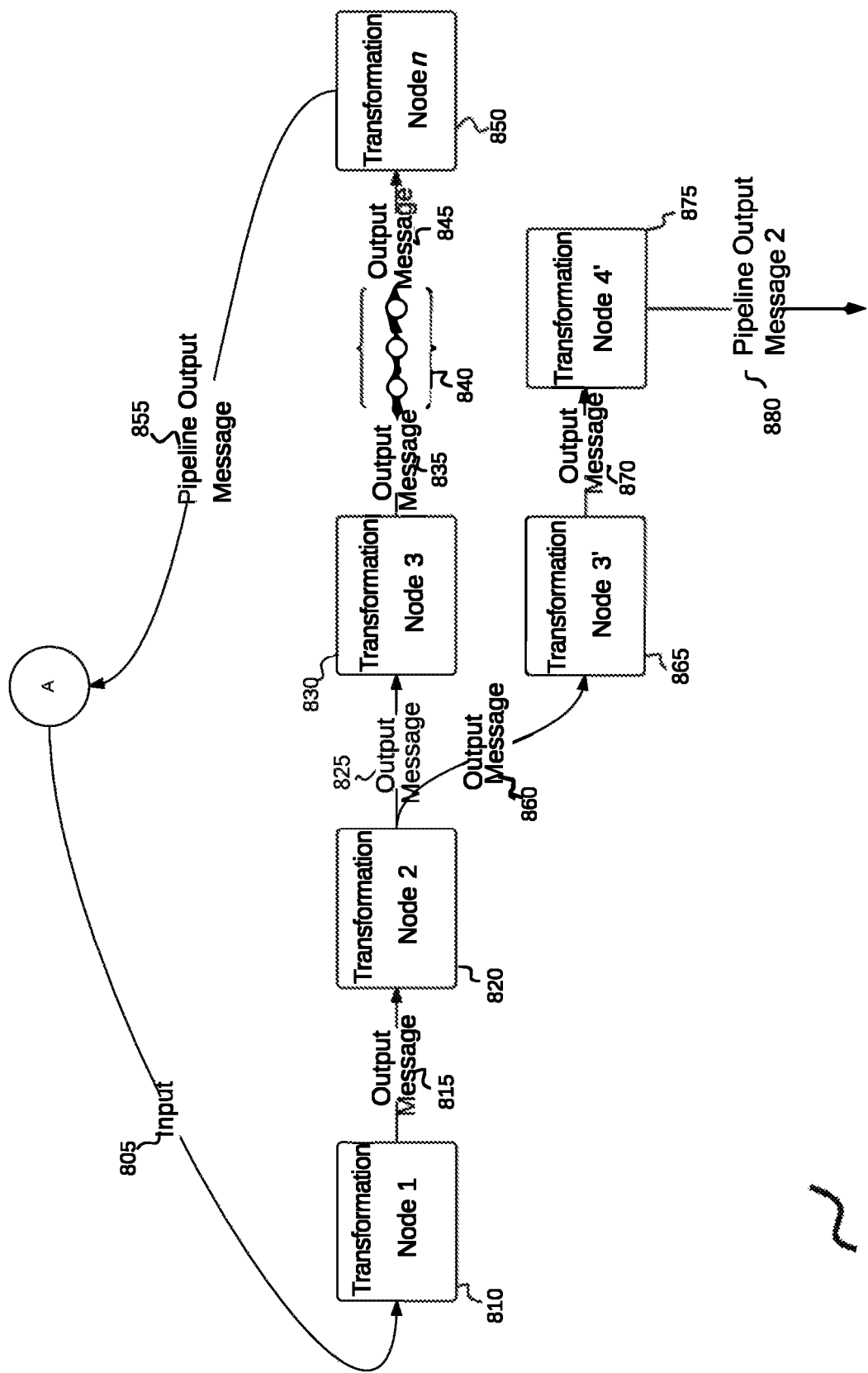
FIG. 8 is a diagram of an exemplary architecture for a transformation pipeline system where the output of one data transformation servers as the input of more than one downstream transformations which introduces the concept of the transformation pipeline as a directed graph of transformation nodes and messages according to one aspect.

FIG. 8 is a block diagram of another preferred architecture for a transformation pipeline within a system for predictive analysis of very large data sets using distributed computational graph 700. According to the aspect, streaming input from a data filter software module 520, 805 serves as input to the first transformation node 810 of the transformation pipeline. Transformation node's function is performed on input data stream and transformed output message 815 is sent to transformation node 2 820. In this aspect, transformation node 2 820 sends its output stream 825, 860 to two transformation pipelines 830, 840, 850; 865, 875. This allows the same data stream to undergo two disparate, possibly completely unrelated, analyses 825, 835, 845, 855; 860, 870, 880 without having to duplicate the infrastructure of the initial transform manipulations, greatly increasing the expressivity of the invention over current transform pipelines. Functional integration of a second output stream from one transformation node 820 requires that the two output stream events be serialized. The invention performs this serialization using a decomposable transformation software module (not shown), the function of which is described below, referring to FIG. 14. While transformation nodes are described according to various aspects as uniform shape (referring to FIGS. 6-9), such uniformity is used for presentation simplicity and clarity and does not reflect necessary operational similarity between transformations within the pipeline. It should be appreciated that one knowledgeable in the field will realize that certain transformations in pipelines, which may be entirely self-contained; certain transformations may involve direct human interaction 630, such as selection via dial or dials, positioning of switch or switches, or parameters set on control display, all of which may change during analysis; other transformations may require external aggregation or correlation services or may rely on remote procedure calls to synchronous or asynchronous analysis engines as might occur in simulations, among a plurality of other possibilities. Further according to the aspect, individual transformation nodes in one pipeline may represent function of another transformation pipeline. It should be appreciated that the node number of transformation pipelines depicted in no way confines the transformation pipelines employed by the invention to an arbitrary maximum length 810, 820, 830, 840, 850; 865, 875 as, being distributed, the number of transformations would be limited by the resources made available to each implementation of the invention. Further according to the aspect, there need be no limits on transform pipeline length. Output of the last transformation node and by extension, the transform pipeline 850 may be sent back to messaging software module 562 for contemporary enabled action.

Figure 9:
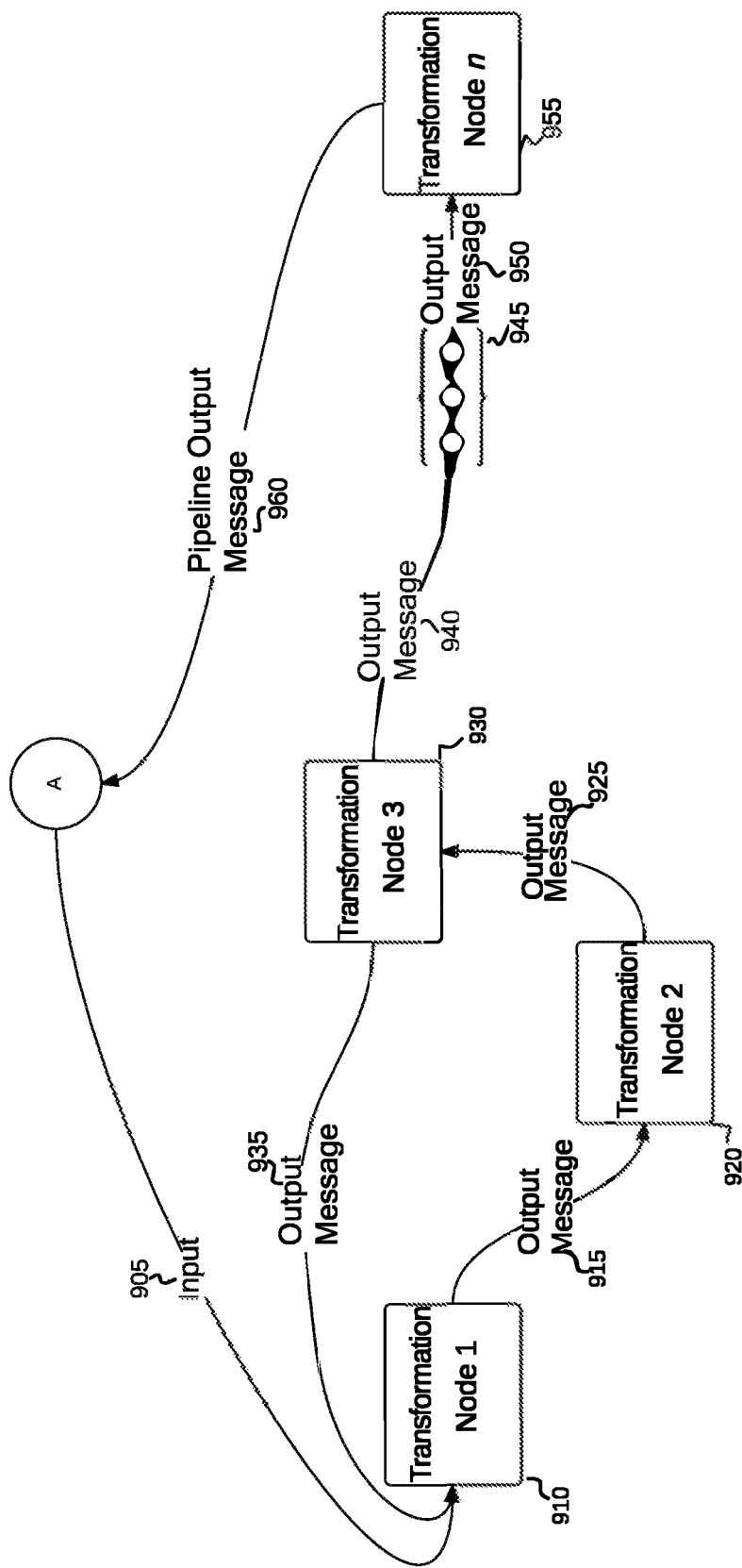
FIG. 9 is a diagram of an exemplary architecture for a transformation pipeline system where a set of three data transformations act to form a cyclical pipeline which also introduces the concept of the transformation pipeline as a directed graph of transformation nodes and messages according to one aspect.

FIG. 9 is a block diagram of another preferred architecture for a transformation pipeline within a system for predictive analysis of very large data sets using distributed computational graph 700. According to the aspect, streaming input from a data filter software module 520, 905 serves as input to the first transformation node 910 of the transformation pipeline. Transformation node's function may be performed on an input data stream and transformed output message 915 may then be sent to transformation node 2 920. Likewise, once the data stream is acted upon by transformation node 2 920, its output is sent to transformation node 3 930 using its output message 925 In this aspect, transformation node 3 930 sends its output stream back 935 to transform node 1 910 forming a cyclical relationship between transformation nodes 1 910, transformation node 2 920 and transformation node 3 930. Upon the achievement of some gateway result, the output of cyclical pipeline activity may be sent to downstream transformation nodes within the pipeline 940, 945. The presence of a generalized cyclical pathway construct allows the invention to be used to solve complex iterative problems with large data sets involved, expanding ability to rapidly retrieve conclusions for complicated issues. Functional creation of a cyclical transformation pipeline requires that each cycle be serialized. The invention performs this serialization using a decomposable transformation software module (not shown), the function of which is described below, referring to FIG. 15. While transformation nodes are described according to various aspects as uniform shape (referring to FIGS. 6-9), such uniformity is used for presentation simplicity and clarity and does not reflect necessary operational similarity between transformations within the pipeline. It should be appreciated that one knowledgeable in the field will appreciate that certain transformations in pipelines, may be entirely self-contained; certain transformations may involve direct human interaction 630, such as selection via dial or dials, positioning of switch or switches, or parameters set on control display, all of which may change during analysis; still other transformations may require external aggregation or correlation services or may rely on remote procedure calls to synchronous or asynchronous analysis engines as might occur in simulations, among a plurality of other possibilities. Further according to the aspect, individual transformation nodes in one pipeline may represent the cumulative function of another transformation pipeline. It should be appreciated that the node number of transformation pipelines depicted in no way confines the transformation pipelines employed by the invention to an arbitrary maximum length 910, 920, 930, 940, 950, 960; 965, 975 as, being distributed, the number of transformations would be limited by the resources made available to each implementation of the invention. It should be further appreciated that there need be no limits on transform pipeline length. Output of the last transformation node and by extension, the transform pipeline 955 may be sent back to messaging software module 562 for concomitant enabled action.

Figure 38:
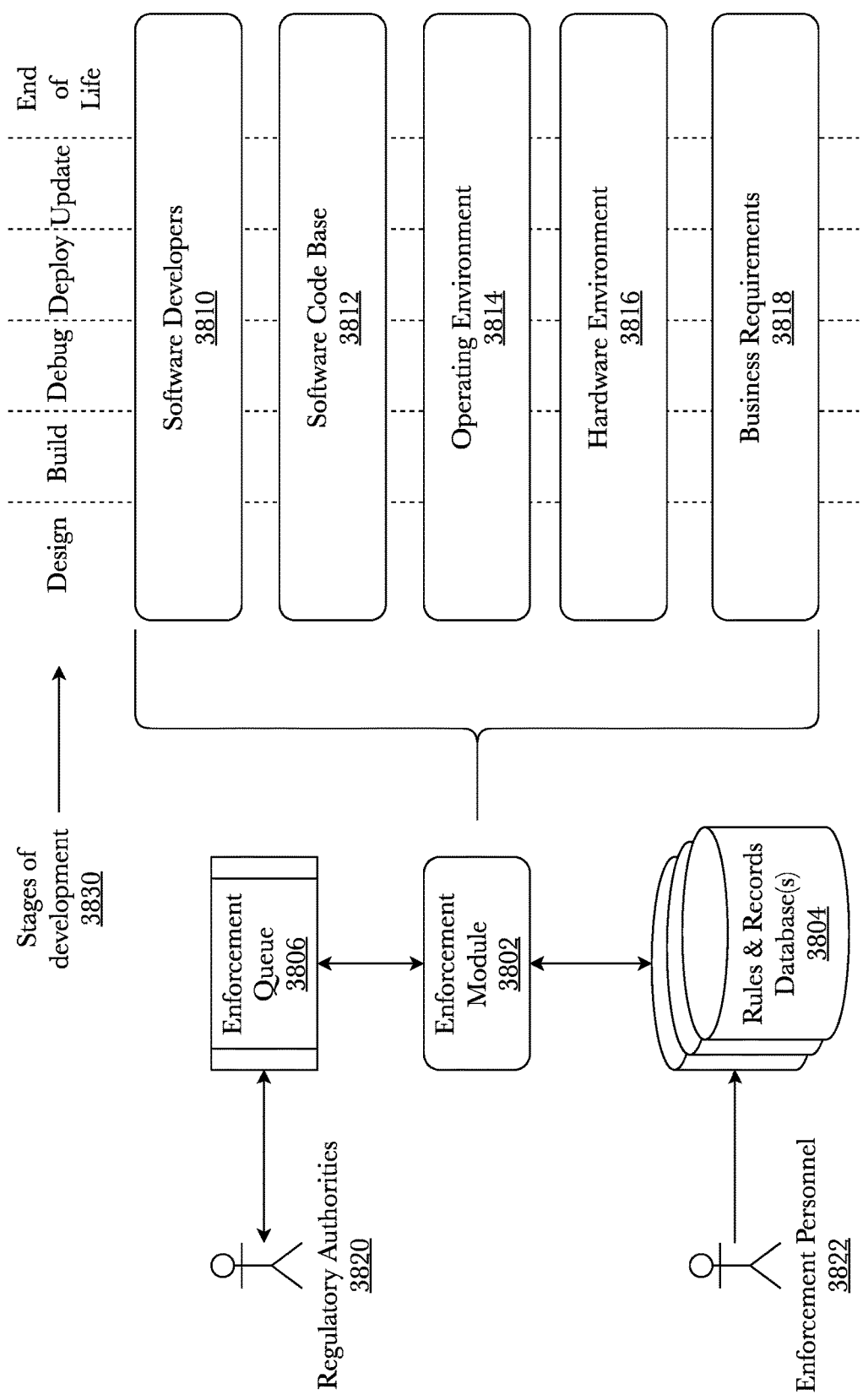
FIG. 38 is a block diagram illustrating a system for software development compliance at all stages of development.

FIG. 38 is a block diagram illustrating a system for software development compliance at all stages of development. Regarding previous figures contained herein disclosing the various embodiments of the invention, an enforcement module 3802 may be further added to ensure compliance of rules, regulations, and best practices is adhered to. Complimenting enforcement module 3802 is one or more databases 3804 comprising at least rules pertaining to software development. Databases 3804 may further contain records of software developers 3810 and other persons not listed here. Such records may hold industry certifications and other pertinent information regarding the personnel involved with the software development process. Databases 3804 may comprise international, federal, state, and business regulation rules and procedures. Databases 3804 may comprise best practices as known in the industry or guidelines thereof. Rules comprised within databases 3804 are enforced automatically by the enforcement module 3802. Rules, regulations, and guidelines are typically configured—or decided upon, as it may not be the actual deciding authority who physically enters in the rule, regulation, or guideline—by the proper enforcement personnel 3822. For example, coding best practices rules, regulations, and guidelines will be configured by lead software developers while cybersecurity rules, regulations, and guidelines will be configured by cybersecurity department personnel, and as a last example, business rules, regulations, deadlines, and guidelines will come from business management. Rules, regulations, and guidelines not able to be automatically enforced will be forwarded to an enforcement queue 3806 where the appropriate authority 3820 may review and approve or disapprove such action. Enforcement queue 3806 may be presented to authorities via a computing device or a means of communication enabled by a communications/computing device.

Figure 39:
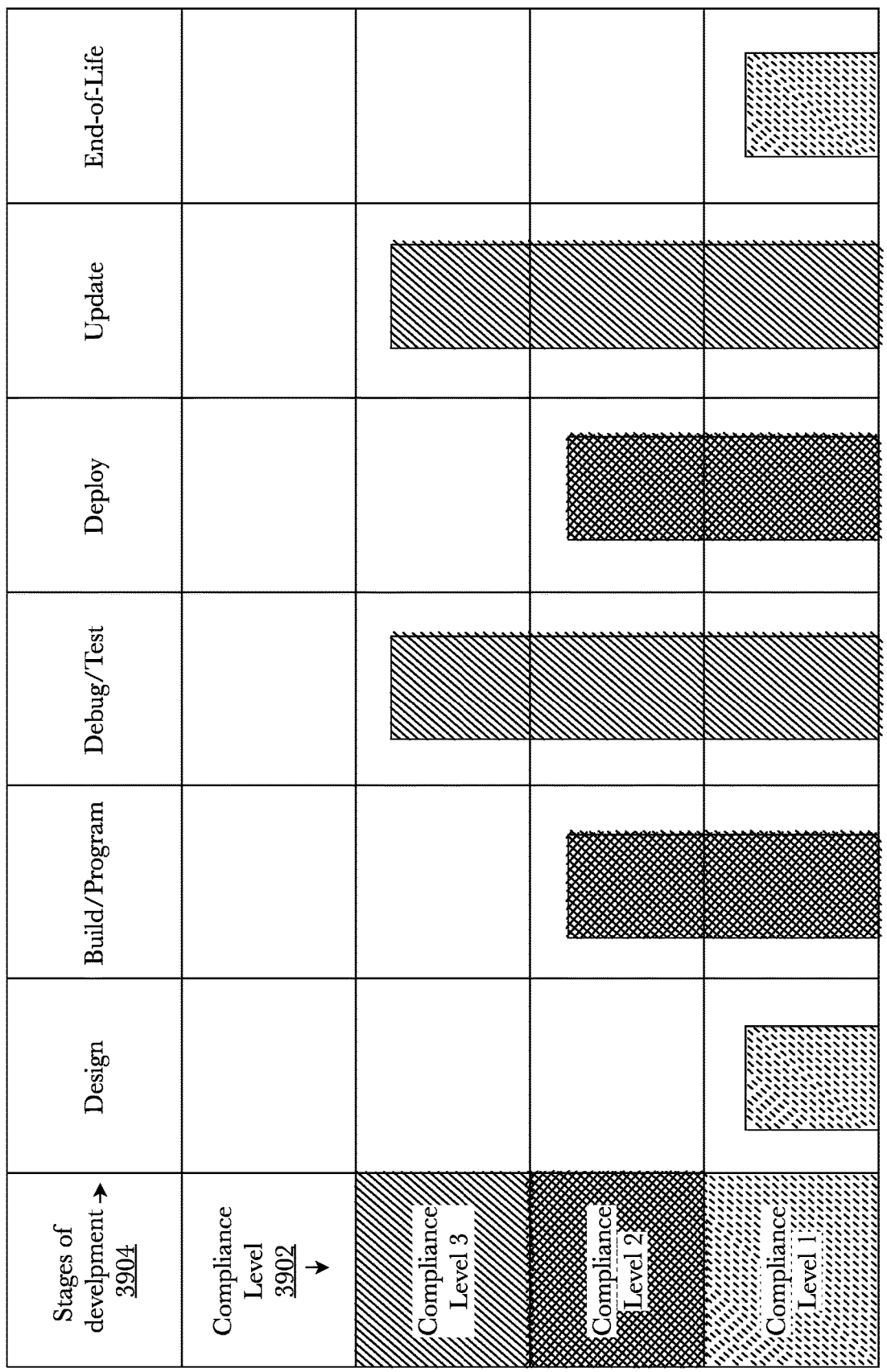
FIG. 39 is a bar chart diagram of an exemplary compliance level configuration according to one exemplary software development process.

The enforcement of rules, regulations, deadlines, and guidelines changes between each stage of development 3830. As seen in FIG. 39, which is an exemplary configuration of compliance levels 3902 for an imaginary software development process, for each stage 3904 there is a requirement of compliance 3902 to be met by each stage 3904. As seen in the design stage, compliance is minimal as the core functionality is being decided and designed. This means there is little concern at this stage for actual adherence to rules, regulations, and guidelines because the software package itself is in an incubation period. For example, while cybersecurity is always a concern, it is more of a concern during the testing/debugging and update stages, as at least cybersecurity partly contributes to the aforementioned stages compliance level 3 requirement. Each governing body over a software development process may configure their own set of compliance levels for each stage enforcing the rules, regulations, deadlines, and guidelines deemed fit. It is the job of the enforcement module to retrieve, receive, and monitor processes relating to the software development and alert/inform the appropriate personnel of each compliance check.

As a specific example, software developers 3810 may be required to have specific credentials or security clearances before working on a software asset on any or a specific stage. Moreover, code 3812 written by software developers 3810 may be required to have documentation every N number of lines along with requirements for no hard-coding of variables and debug sessions before each commit. The enforcement module 3802 may be configured to test for buffer overflow vulnerabilities which if found, will fail compliance for that particular stage. Test engineers may need to upload or otherwise confirm the performing of various tests in operating 3814 and hardware environments 3816. Business analysts may have to meet certain business requirements 3818 before certain stages are completed. For example, FCC communication interference tests may need to be confirmed by the enforcement module 3802 before moving from a build stage to a debug stage. The enforcement module 3802 may automatically verify compliance with these and other examples by using the various components of the various embodiments disclosed herein (See at least FIG. 33).

Figure 40:
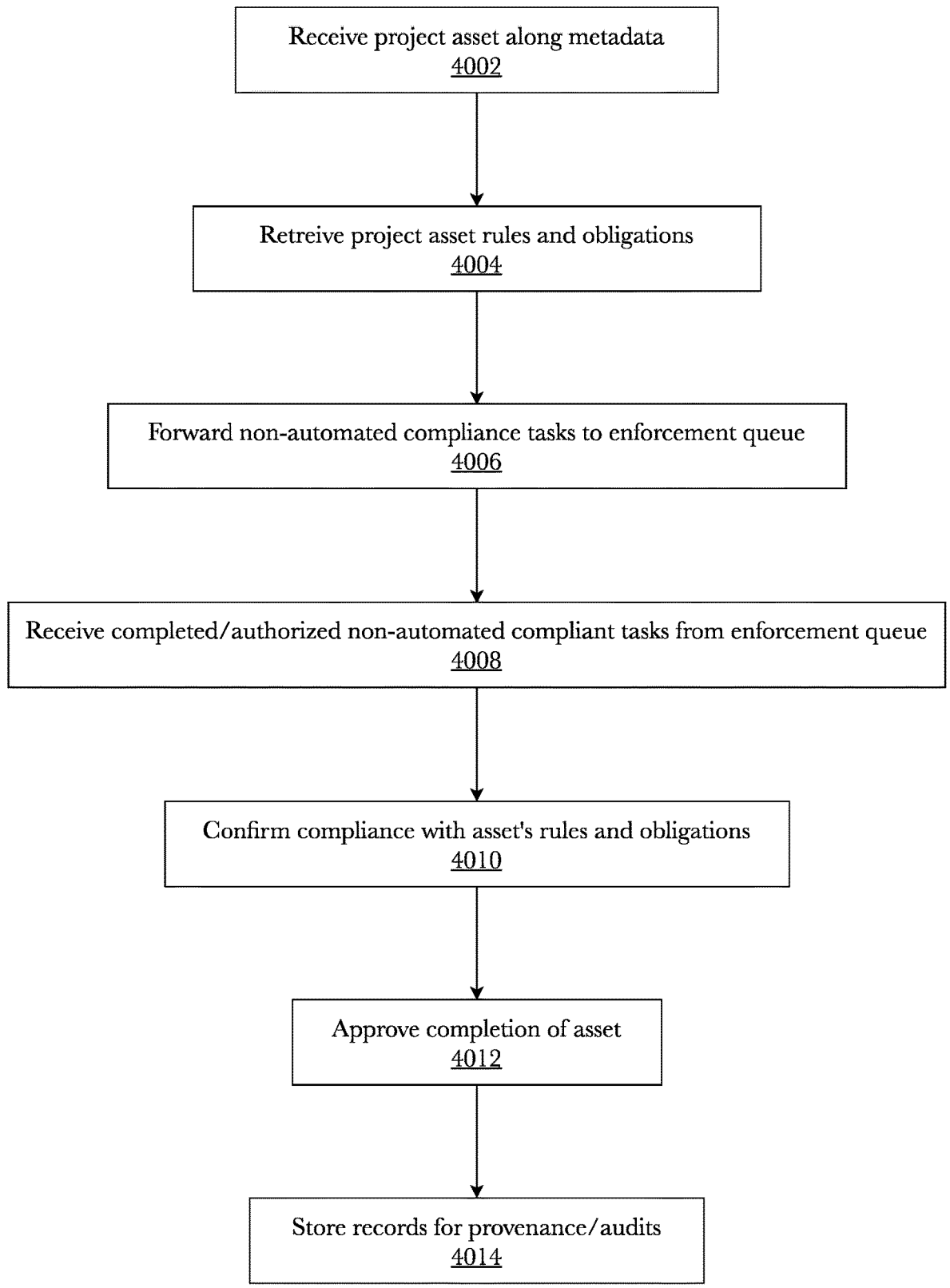
FIG. 40 is a flow diagram illustrating a method for enforcing rules and best practices compliance during the software development process.

Implementation and mode of operation of the invention comprises populating the rules and records databases 3804 and while described above is a method for manually populating such rules, regulations, deadlines, and guidelines; automated processes may be employed as well. Integration with Gannt charts, project milestones, management software suites, and retrieval of rules, regulations, and guidelines from external databases such as IEEE, FCC, and ISO. The following steps refer to FIG. 40. After population of rules, regulations, guidelines, personnel accounts, etc. in the database(s), each project asset will be monitored by enforcement module. Each asset may comprise metadata further comprising a timestamp, personnel ID, or other unique identification markers 4002 for at least tracking and compliance. A unique identification marker may be associated with each asset indicating certain properties of the asset. For example, the unique identification marker may associate the asset as being a code snippet from the development team during the debug stage. The unique identification marker may further be used in combination with the timestamp and personnel ID to further indicate which phase of the software development the asset pertains. Enforcement module will then use the metadata to retrieve the appropriate asset rules and obligations 4004. Any rules or obligations marked for manual review will be forwarded to the enforcement queue 4006. Upon verification that automated and non-automated checks have met the obligations of set forth by the rules database 4008/4010, the asset is approved 4012 and confirmation is sent to the appropriate channels. In the case that compliance fails, details of the failure will be sent to the appropriate channels. Every compliance check, even continuous checks, may be stored in a database for provenance and audit purposes 4014. Each compliance check whether pass or fail may produce a suggested recommendation. In the case of a failure, recommendations to alter the code, alter the operating environment, or submit for inspection some required documentation is provided. Recommendations may be stored with the rules associated with the recommendation, while manual compliance checks from the enforcement queue may also comprise manual responses input from reviewing personnel.

Further anticipated aspects comprise a GUI allowing users to interact with the components of the invention. Such as configuring the rules, regulations, deadlines, and guidelines, as well as assigning, reviewing, and completing tasks within the enforcement queue. Compliance reports may be generated and exported to be sent to regulatory agencies and similar tasks. The GUI may allow users to define and name bespoke stages according to their practices and procedures. The GUI may provide a drag-n-drop interface to place each rule in a respective stage such that each obligation to compliance is in accordance with the user's desires. Output of the past, current, and predicted status of the various stages and compliance statistics may be displayed on a screen using various charts (Gannt, bar chart, pie graph, etc.), or output to certain formats (CSV, JSON, etc.).

Description of Method Aspects

Figure 17:
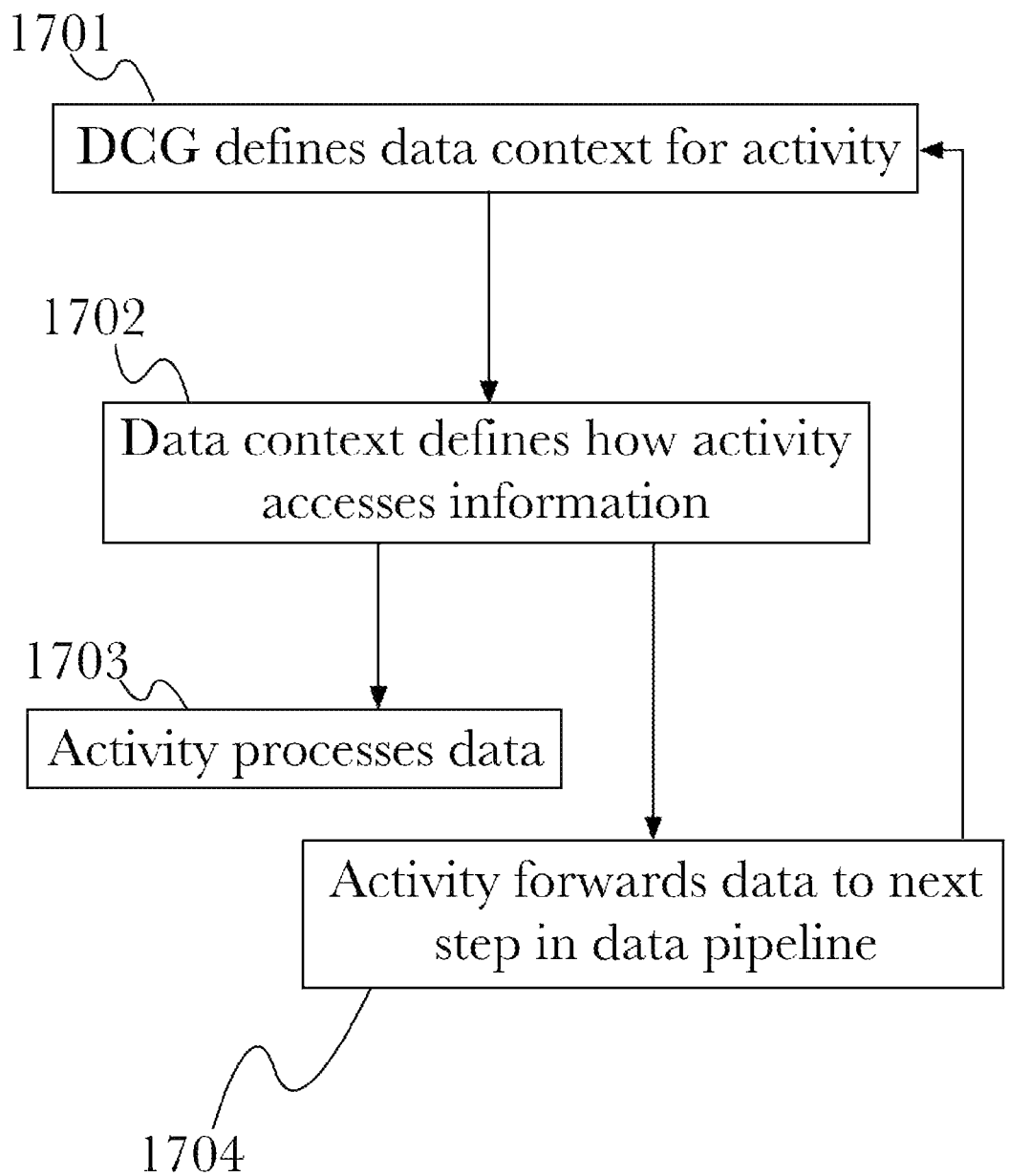
FIG. 17 is a process flow diagram for an exemplary method for rapid predictive analysis of very large data sets using an actor-driven distributed computational graph, according to one aspect.

FIG. 17 is a process flow diagram for an exemplary method 1700 for rapid predictive analysis of very large data sets using an actor-driven distributed computational graph, according to one aspect. In an initial step 1701, a DCG 100 may define a plurality of data contexts for each of a plurality of actions within a data pipeline. These contexts each in turn define 1702 how their respective activities may interact with data in the pipeline. Any given activity may, based on the defined data context, either process data 1703 (generally by performing any of a number of data transformations as described previously, referring to FIG. 5), or by forwarding at least a portion of the data onward to the next step in the pipeline 1704, which may in turn be another activity with a defined context determining how it handles the forwarded data. In this manner, operation may continue in a directed fashion wherein each agent has clearly-defined capabilities and data progresses toward the end of the pipeline according to the established definitions.

Figure 18:
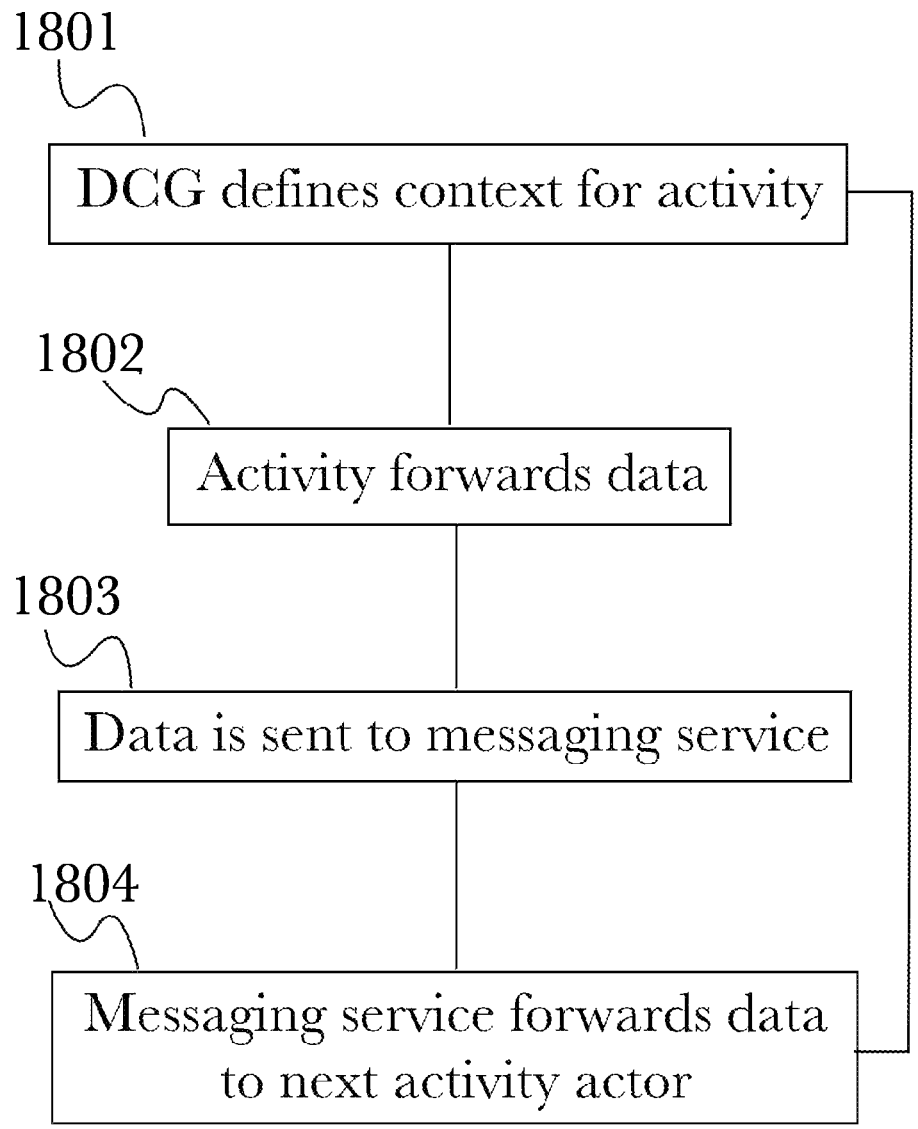
FIG. 18 is a process flow diagram for an exemplary method for rapid predictive analysis of very large data sets using an actor-driven distributed computational graph, according to one aspect.

FIG. 18 is a process flow diagram for an exemplary method 1800 for rapid predictive analysis of very large data sets using an actor-driven distributed computational graph, according to one aspect. In an initial step 1801, a DCG 100 defines a data context for an activity, determining how the activity handles data that is passed to it. The activity then, according to the context definition, receives data and forwards it 1802 to the next step in the data pipeline. The data is then 1803 passed to a messaging system 210 that acts as a central data broker, receiving the data and passing it on 1804 to the next activity actor in the pipeline, which may then have a context assigned 1801 so that operation continues as shown. This allows brokered, centralized messaging between activity actors within data pipelines, using a messaging system 210 to bridge communication between different actors.

Figure 19:
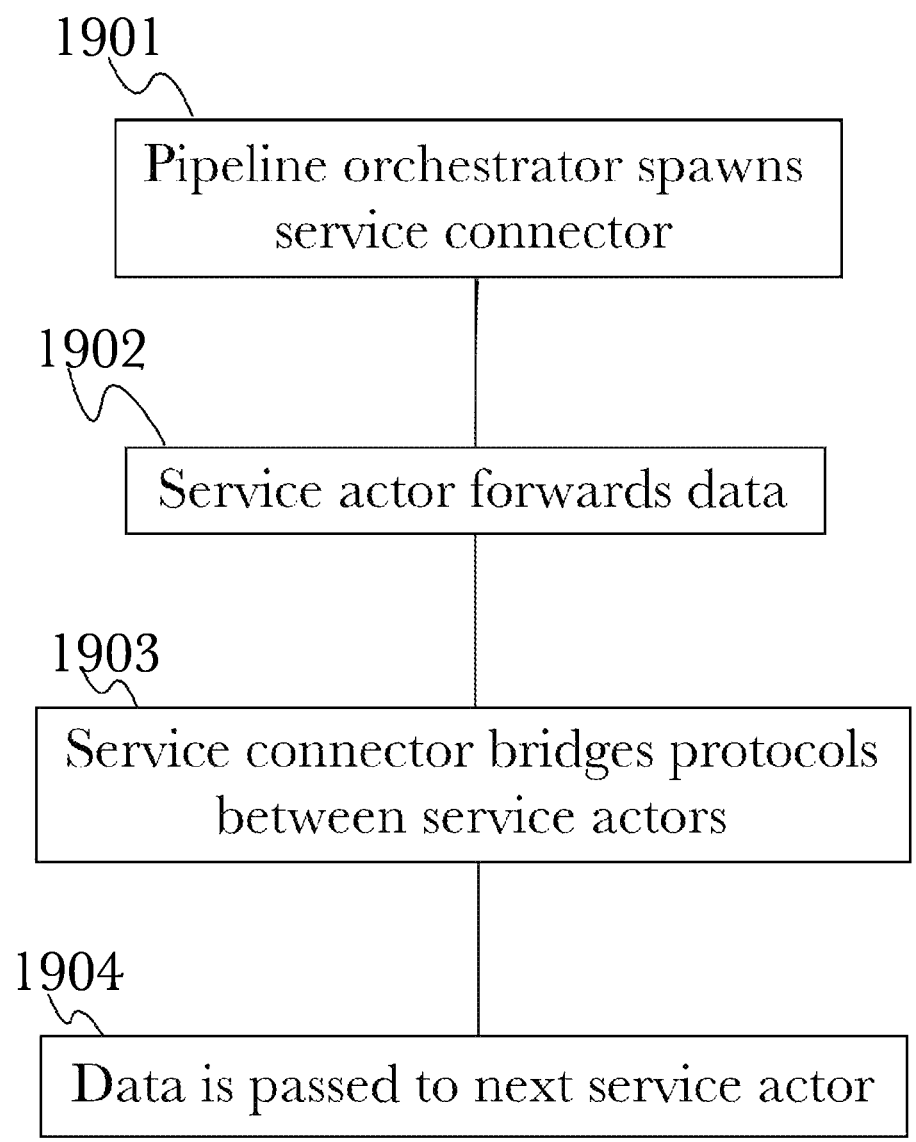
FIG. 19 is a process flow diagram for an exemplary method for rapid predictive analysis of very large data sets using an actor-driven distributed computational graph, according to one aspect.

FIG. 19 is a process flow diagram for an exemplary method 1900 for rapid predictive analysis of very large data sets using an actor-driven distributed computational graph, according to one aspect. In an initial step 1901, a pipeline orchestrator 101 may spawn a plurality of service connectors 410, each of which is configured to bridge communication between two or more service actors 221*a-d* for peer-to-peer messaging without using a messaging system 210 as a central broker. When a service actor 221*a-d* forwards data 1902 to another service actor 221*a-d*, an appropriate service connector 410 may receive the data and perform any necessary interpretation or modification to bridge service protocols 1903 between the source and destination service actors 221*a-d*. The modified data may then be provided 1904 to the destination service actor 221*a-d*. Service connectors may be created and destroyed as needed without impacting other operations, producing a scalable and on-the-fly peerto-peer messaging system that does not rely on any centralized broker to relay messages and permits direct communication between actors.

Figure 10:
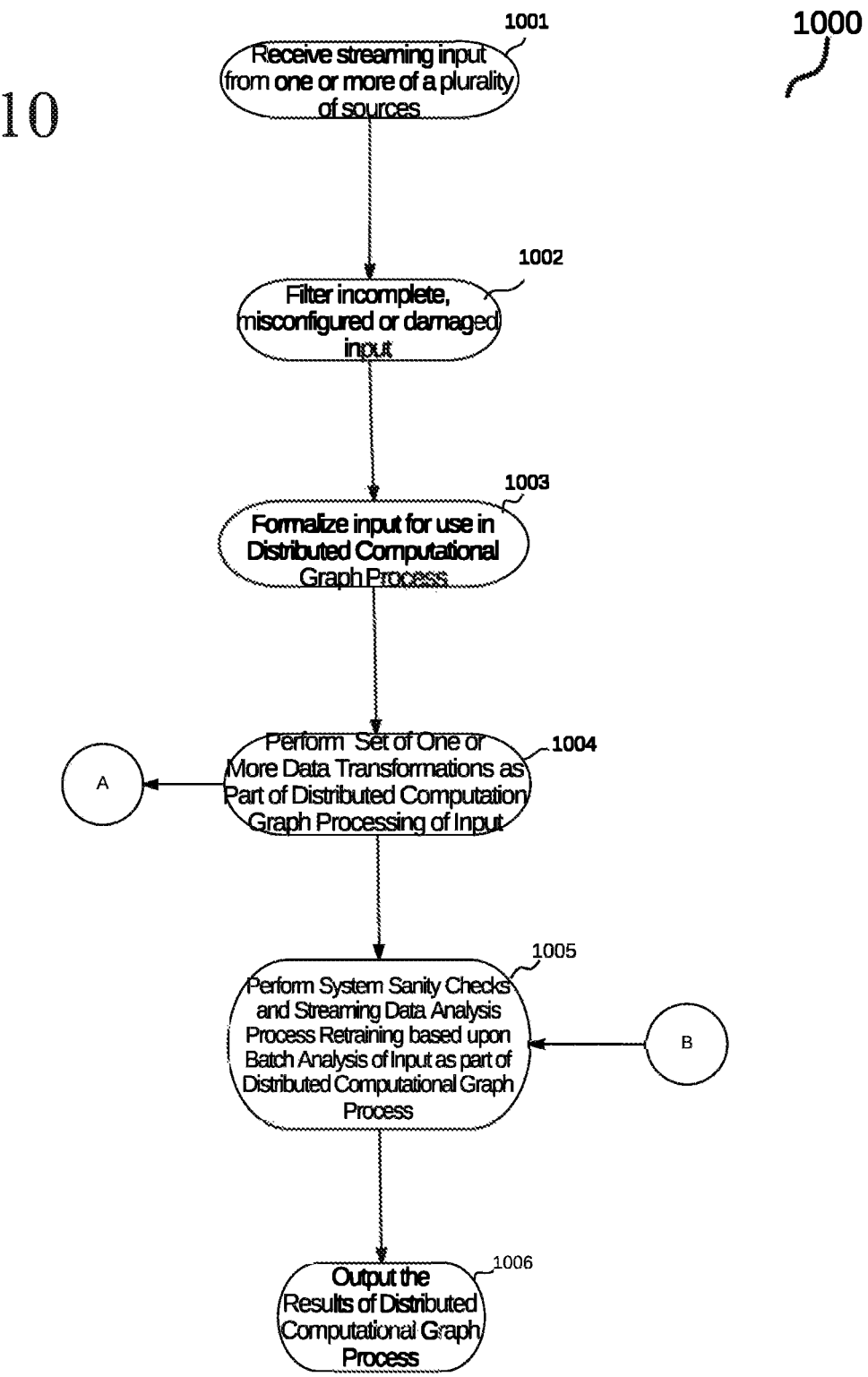
FIG. 10 is a process flow diagram of a method for the receipt, processing and predictive analysis of streaming data according to one aspect.

FIG. 10 is a process flow diagram of a method 1000 for predictive analysis of very large data sets using the distributed computational graph. One or more streams of data from a plurality of sources, which includes, but is in no way not limited to, a number of physical sensors, web based questionnaires and surveys, monitoring of electronic infrastructure, crowd sourcing campaigns, and direct human interaction, may be received by system 1001. The received stream is filtered 1002 to exclude data that has been corrupted, data that is incomplete or misconfigured and therefore unusable, data that may be intact but nonsensical within the context of the analyses being run, as well as a plurality of predetermined analysis related and unrelated criteria set by the authors. Filtered data may be split into two identical streams at this point (second stream not depicted for simplicity), wherein one substream may be sent for batch processing 1600 while another substream may be formalized 1003 for transformation pipeline analysis 1004, 561, 600, 700, 800, 900 and retraining 1005. Data formalization for transformation pipeline analysis acts to reformat the stream data for optimal, reliable use during analysis. Reformatting might entail, but is not limited to: setting data field order, standardizing measurement units if choices are given, splitting complex information into multiple simpler fields, and stripping unwanted characters, again, just to name a few simple examples. The formalized data stream may be subjected to one or more transformations. Each transformation acts as a function on the data and may or may not change the data. Within the invention, transformations working on the same data stream where the output of one transformation acts as the input to the next are represented as transformation pipelines. While the great majority of transformations in transformation pipelines receive a single stream of input, modify the data within the stream in some way and then pass the modified data as output to the next transformation in the pipeline, the invention does not require these characteristics. According to the aspect, individual transformations can receive input of expected form from more than one source 1300 or receive no input at all as would a transformation acting as a timestamp. According to the aspect, individual transformations, may not modify the data as would be encountered with a data store acting as a queue for downstream transformations 1303, 1305, 1405, 1407,1505. According to the aspect, individual transformations may provide output to more than one downstream transformations 1400. This ability lends itself to simulations where multiple possible choices might be made at a single step of a procedure all of which need to be analyzed. While only a single, simple use case has been offered for each example, in each case, that example was chosen for simplicity of description from a plurality of possibilities, the examples given should not be considered to limit the invention to only simplistic applications. Last, according to the invention, transformations in a transformation pipeline backbone may form a linear, a quasi-linear arrangement or may be cyclical 1500, where the output of one of the internal transformations serves as the input of one of its antecedents allowing recursive analysis to be run. The result of transformation pipeline analysis may then be modified by results from batch analysis of the data stream 1600 and output 1006 in format predesigned by the authors of the analysis with could be human readable summary printout, human readable instruction printout, human-readable raw printout, data store, or machine encoded information of any format known to the art to be used in further automated analysis or action schema.

Figure 11:
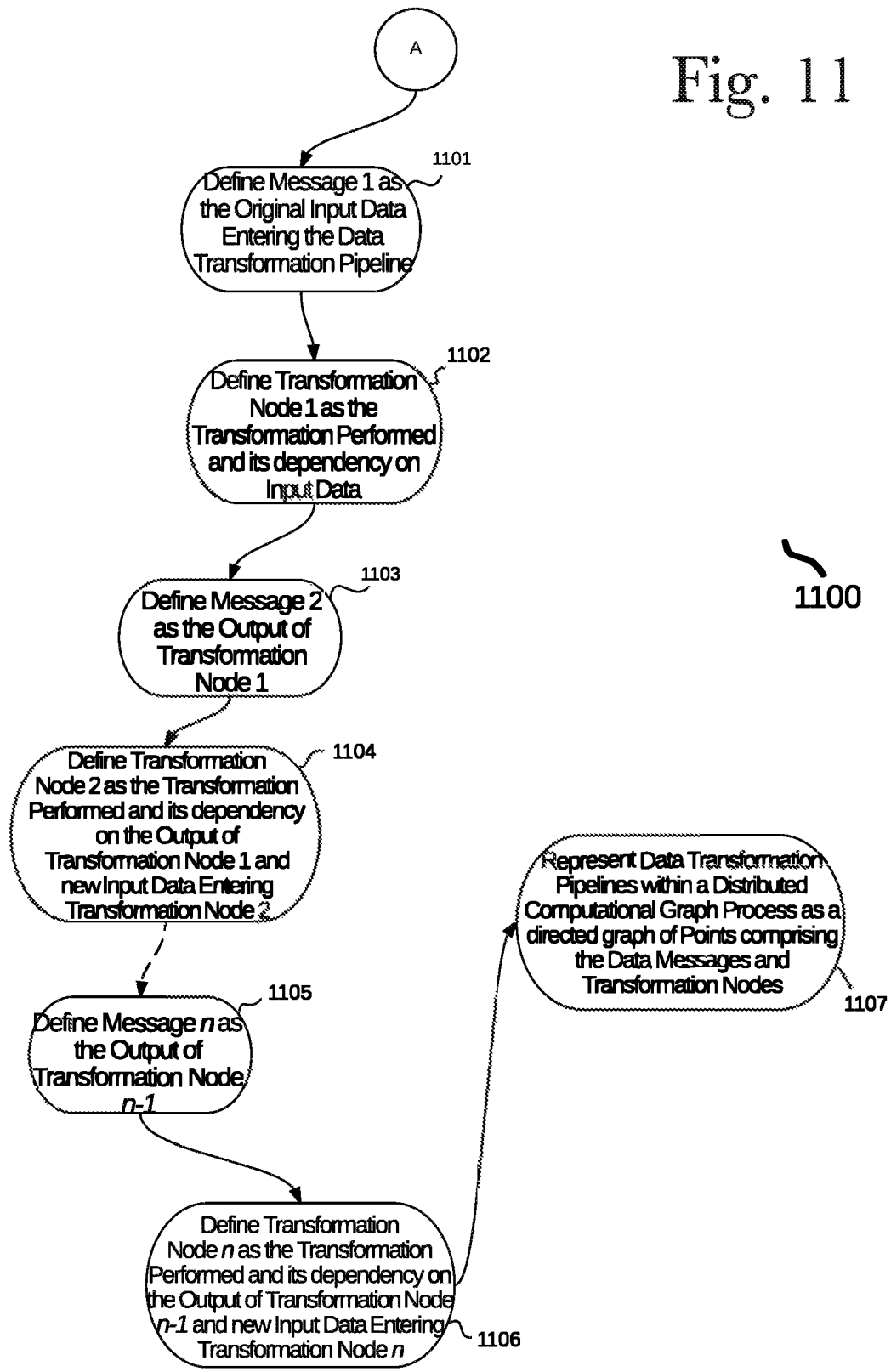
FIG. 11 is a process flow diagram of a method for representing the operation of the transformation pipeline as a directed graph function according to one aspect.

FIG. 11 is a process flow diagram of a method 1100 for an aspect of modeling the transformation pipeline module 561 of the invention as a directed graph using graph theory. According to the aspect, the individual transformations 1102, 1104, 1106 of the transformation pipeline $t_1 \ldots t_n$ such that each $t_i$ T are represented as graph nodes. Transformations belonging to T are discrete transformations over individual datasets $d_i$, consistent with classical functions. As such, each individual transformation $t_j$, receives a set of inputs and produces a single output. The input of an individual transformation $t_j$, is defined with the function in: $t_i$ $d_1 \ldots d_k$ such that in($t_i$)={$d_1 \ldots d_k$) and describes a transformation with k inputs. Similarly, the output of an individual transformation is defined as the function out: $t_i$ [$Id_1$] to describe transformations that produce a single output (usable by other transformations). A dependency function can now be defined such that dep($t_a,t_b$) out($t_a$)in($t_b$) The messages carrying the data stream through the transformation pipeline 1101,1103, 1105 make up the graph edges. Using the above definitions, then, a transformation pipeline within the invention can be defined as G=(V,E) where message($t_1, t_2 \ldots t_{(n-1)}, t_n$)V and all transformations $t_1 \ldots t_n$ and all dependencies dep($t_i,t_j$)E 1107.

Figure 12:
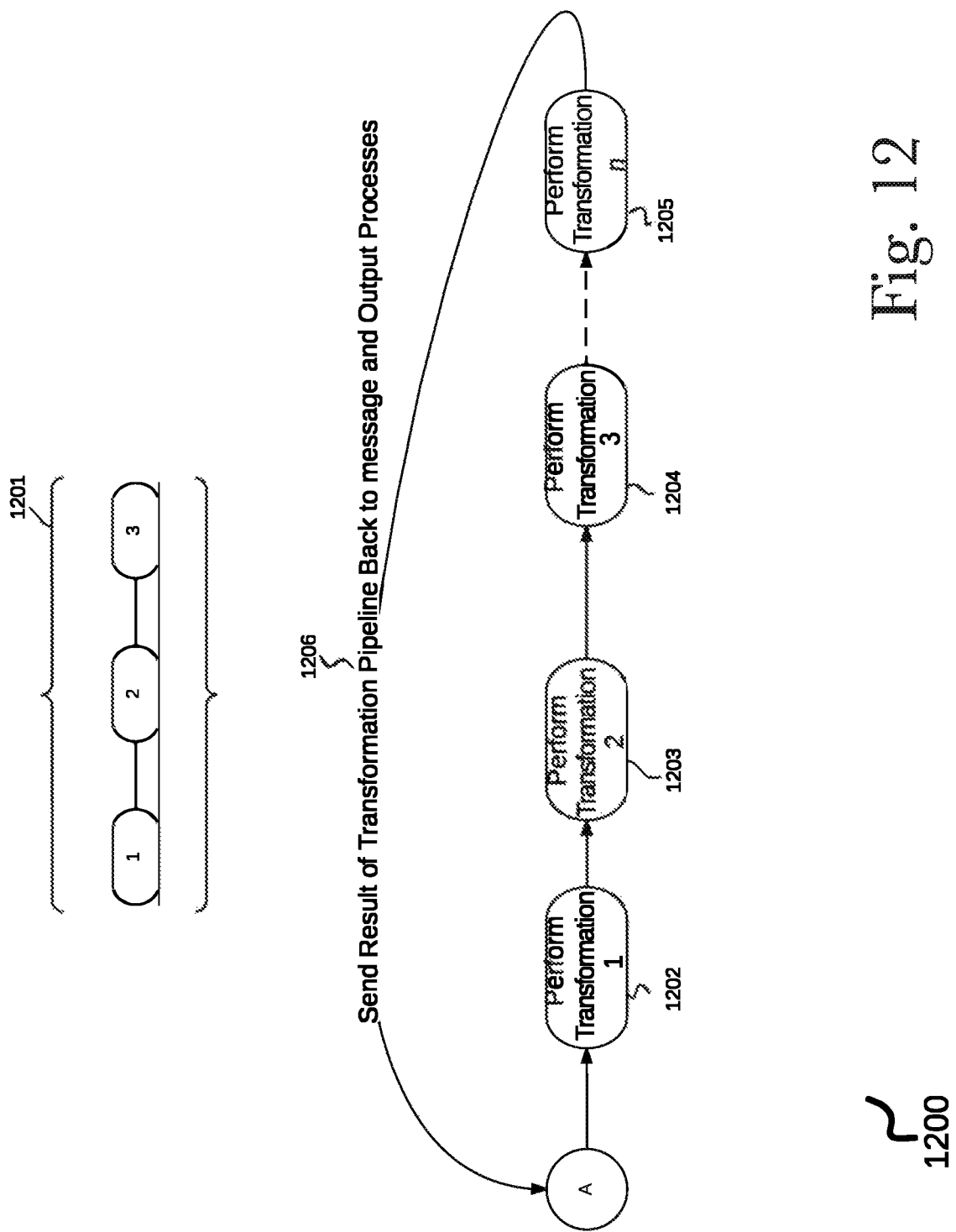
FIG. 12 is a process flow diagram of a method for a linear data transformation pipeline according to one aspect.

FIG. 12 is a process flow diagram of a method 1200 for one aspect of a linear transformation pipeline 1201. This is the simplest of configurations as the input stream is acted upon by the first transformation node 1202 and the remainder of the transformations within the pipeline are then performed sequentially 1202, 1203, 1204, 1205 for the entire pipeline with no introduction of new data internal to the initial node or splitting output stream prior to last node of the pipeline 1205, which then sends the results of the pipeline 1206 as output. This configuration is the current state of the art for transformation pipelines and is the most general form of these constructs. Linear transformation pipelines require no special manipulation to simplify the data pathway and are thus referred to as non-decomposable. The example depicted in this diagram was chosen to convey the configuration of a linear transformation pipeline and is the simplest form of the configuration felt to show the point. It in no way implies limitation of the invention.

Figure 13:
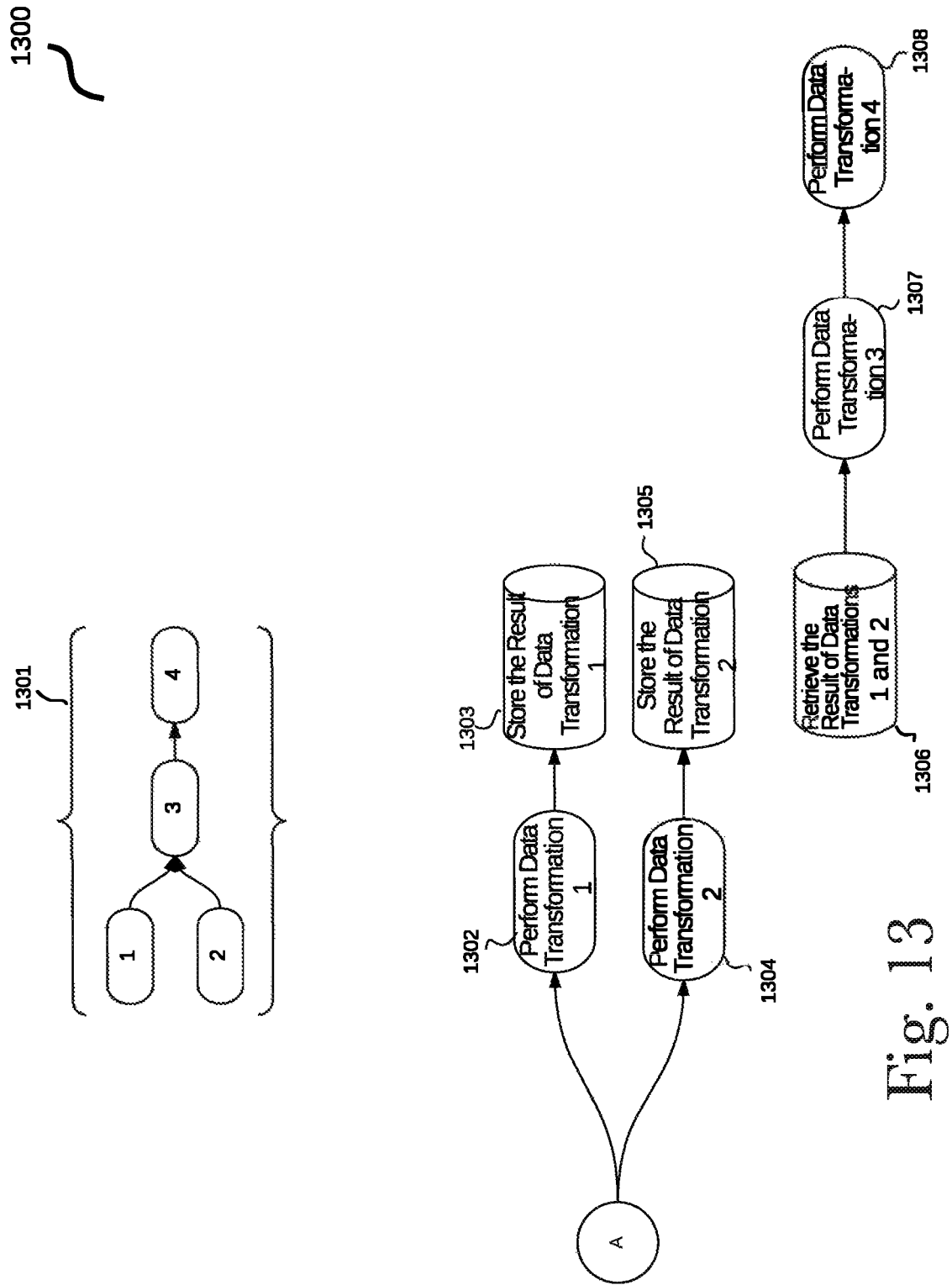
FIG. 13 is a process flow diagram of a method for the disposition of input from two antecedent data transformations into a single data transformation of transformation pipeline according to one aspect.

FIG. 13 is a process flow diagram of a method 1300 for one aspect of a transformation pipeline where one transformation node 1307 in a transformation pipeline receives data streams from two source transformation nodes 1301. The invention handles this transformation pipeline configuration by decomposing or serializing the input events 1302-1303, 130-1305 heavily relying on post transformation function continuation. The results of individual transformation nodes 1302, 1304 just antecedent to the destination transformation node 1306 and placed into a single specialized data storage transformation node 1303, 1305 (shown twice as process occurs twice). The combined results then retrieved from the data store 1306 and serve as the input stream for the transformation node within the transformation pipeline backbone 1307, 1308. The example depicted in this diagram was chosen to convey the configuration of transformation pipelines with individual transformation nodes that receive input from two source nodes 1302, 1304 and is the simplest form of the configuration felt to show the point. It in no way implies limitation of the invention. One knowledgeable in the art will realize the great number of permutations and topologies possible, especially as the invention places no design restrictions on the number of transformation nodes receiving input from greater than one sources or the number sources providing input to a destination node.

Figure 14:
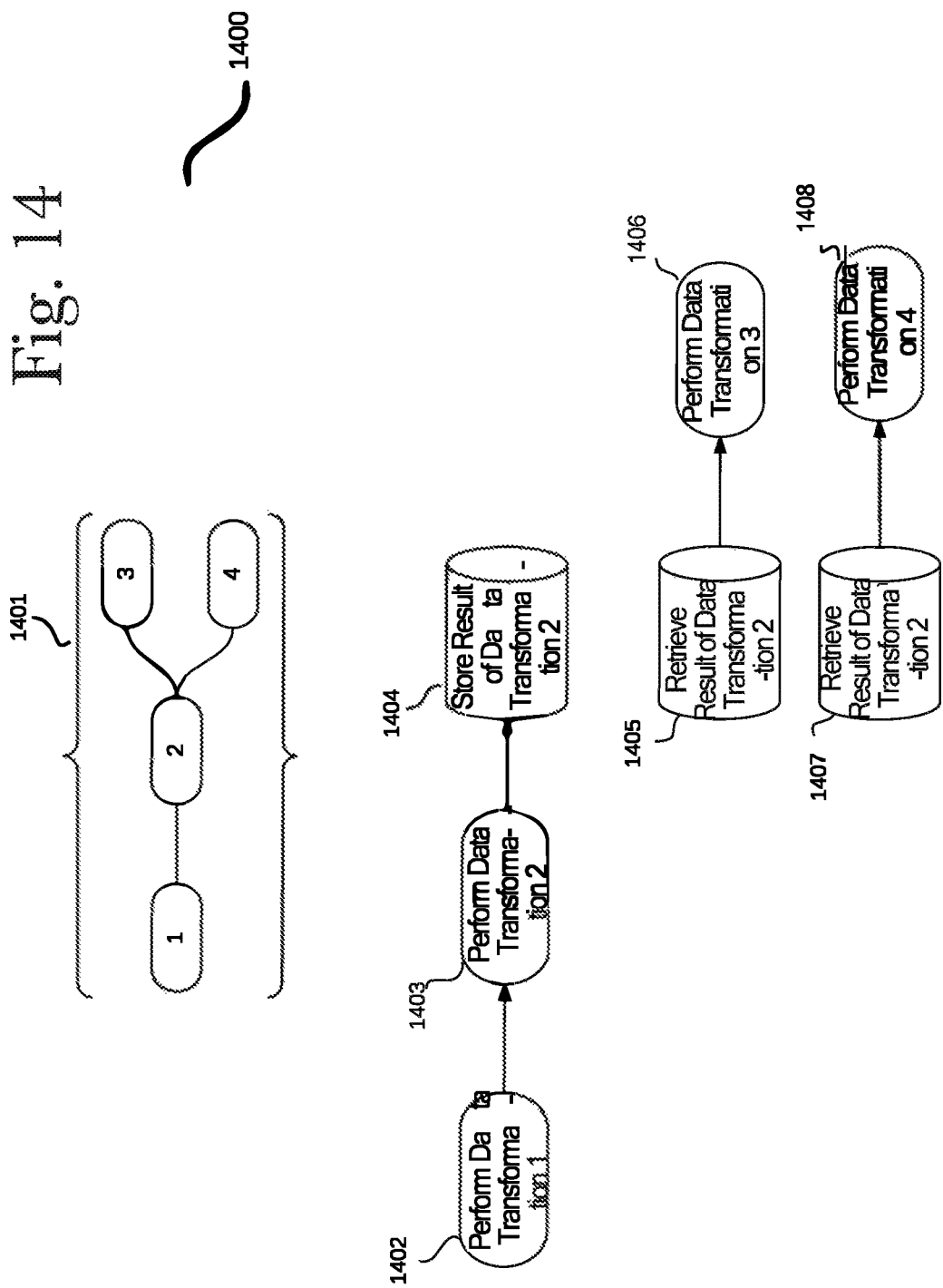
FIG. 14 is a process flow diagram of a method for the disposition of output of one data transformation that then serves as input to two postliminary data transformations according to one aspect.

FIG. 14 is a process flow diagram of a method 1400 for one aspect of a transformation pipeline where one transformation node 1403 in a transformation pipeline receives input data from a transformation node 1402, and sends output data stream to two destination transformation nodes 1401, 1406, 1408 in potentially two separate transformation pipelines. The invention handles this transformation pipeline configuration by decomposing or serializing the output events 1404,1405-1406, 1407-1408. The results of the source transformation node 1403 just antecedent to the destination transformation nodes 1406 and placed into a single specialized data storage transformation node 1404, 1405, 1407 (shown three times as storage occurs and retrieval occurs twice). The results of the antecedent transformation node may then be retrieved from a data store 1404 and serves as the input stream for the transformation nodes two downstream transformation pipeline 1406, 1408. The example depicted in this diagram was chosen to convey the configuration of transformation pipelines with individual transformation nodes that send output streams to two destination nodes 1406, 1408 and is the simplest form of the configuration felt to show the point. It in no way implies limitation of the invention. One knowledgeable in the art will realize the great number of permutations and topologies possible, especially as the invention places no design restrictions on the number of transformation nodes sending output to greater than one destination or the number destinations receiving input from a source node.

Figure 15:
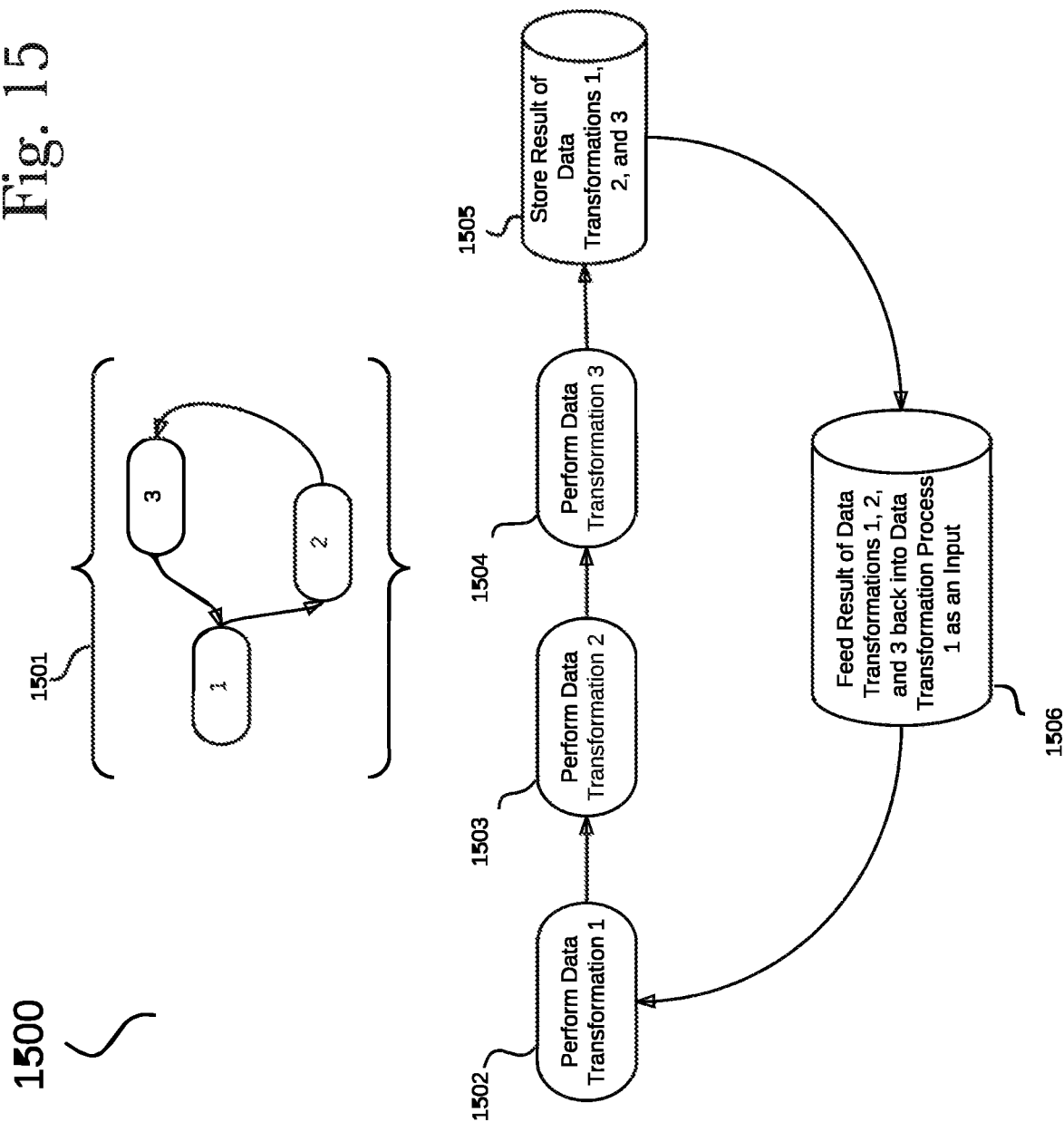
FIG. 15 is a process flow diagram of a method for processing a set of three or more data transformations within a data transformation pipeline where output of the last member transformation of the set serves as input of the first member transformation thereby creating a cyclical relationship according to one aspect.

FIG. 15 is a process flow diagram of a method 1500 for one aspect of a transformation pipeline where the topology of all or part of the pipeline is cyclical 1501. In this configuration, the output stream of one transformation node 1504 acts as an input of an antecedent transformation node within the pipeline 1502 serialization or decomposition linearizes this cyclical configuration by completing the transformation of all of the nodes that make up a single cycle 1502, 1503, 1504 and then storing the result of that cycle in a data store 1505. That result of a cycle is then reintroduced to the transformation pipeline as input 1506 to the first transformation node of the cycle. As this configuration is by nature recursive, special programming to unfold the recursions was developed for the invention to accommodate it. The example depicted in this diagram was chosen to convey the configuration of transformation pipelines with individual transformation nodes that for a cyclical configuration 1501, 1502, 1503, 1504 and is the simplest form of the configuration felt to show the point. It in no way implies limitation of the invention. One knowledgeable in the art will realize the great number of permutations and topologies possible, especially as the invention places no design restrictions on the number of transformation nodes participating in a cycle nor the number of cycles in a transformation pipeline.

Figure 16:
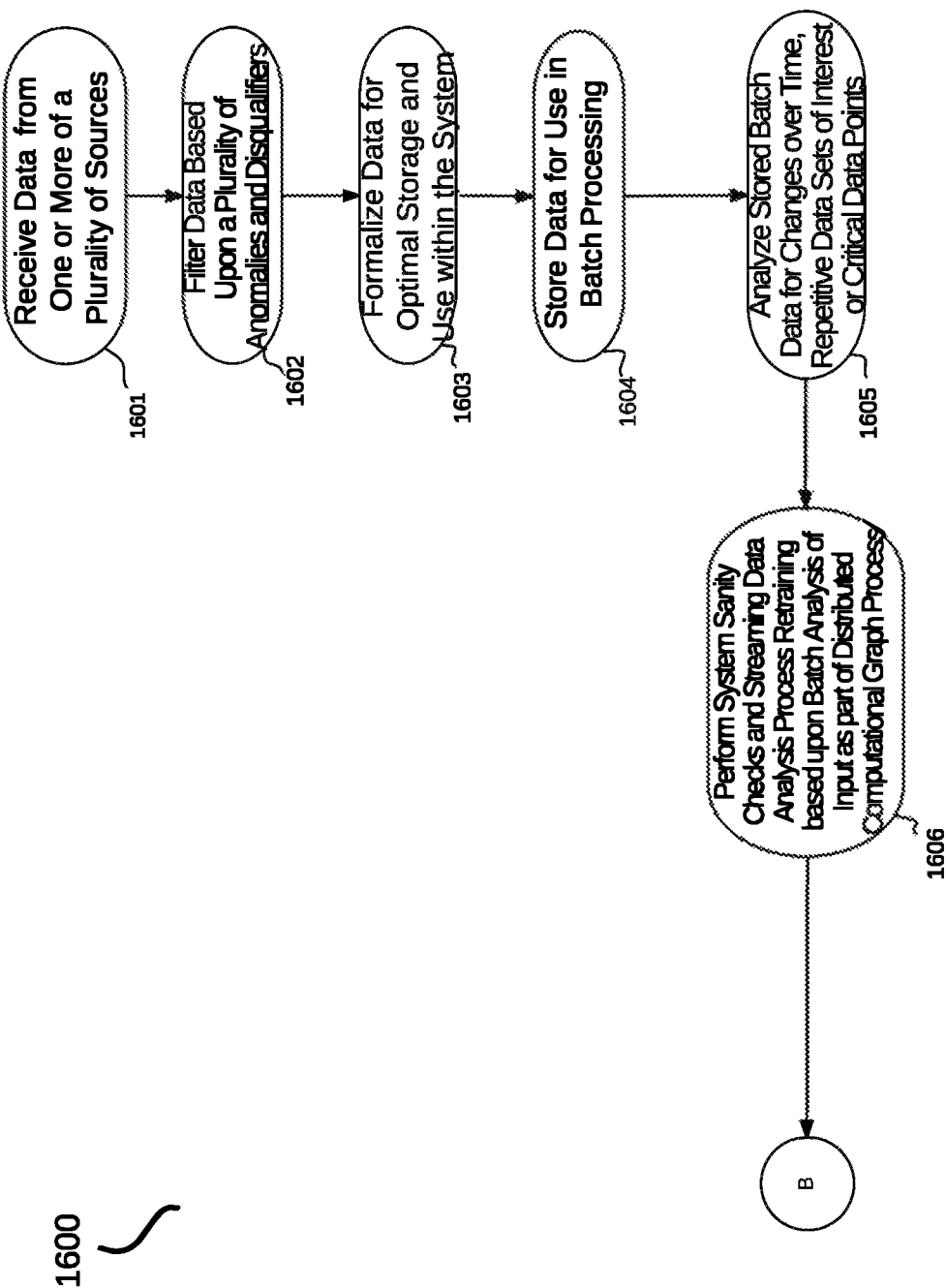
FIG. 16 is a process flow diagram of a method for the receipt and use of streaming data into batch storage and analysis of changes over time, repetition of specific data sequences or the presence of critical data points according to one aspect.

FIG. 16 is a process flow diagram of a method 1600 for one aspect of the batch data stream analysis pathway which forms part of the invention and allows streaming data to be interpreted with historic context. One or more streams of data from a plurality of sources, which includes, but is in no way not limited to, a number of physical sensors, web based questionnaires and surveys, monitoring of electronic infrastructure, crowd sourcing campaigns, and direct human interaction, is received by the system 1601. The received stream may be filtered 1602 to exclude data that has been corrupted, data that is incomplete or misconfigured and therefore unusable, data that may be intact but nonsensical within the context of the analyses being run, as well as a plurality of predetermined analysis related and unrelated criteria set by the authors. Data formalization 1603 for batch analysis acts to reformat the stream data for optimal, reliable use during analysis. Reformatting might entail, but is not limited to: setting data field order, standardizing measurement units if choices are given, splitting complex information into multiple simpler fields, and stripping unwanted characters, again, just to name a few simple examples. The filtered and formalized stream is then added to a distributed data store 1604 due to the vast amount of information accrued over time. The invention has no dependency for specific data stores or data retrieval model. During transformation pipeline analysis of the streaming pipeline, data stored in the batch pathway store can be used to track changes in specifics of the data important to the ongoing analysis over time, repetitive data sets significant to the analysis or the occurrence of critical points of data 1605. The functions of individual transformation nodes 620 may be saved and can be edited also all nodes of a transformation pipeline 600 keep a summary or summarized view (analogous to a network routing table) of applicable parts of the overall route of the pipeline along with detailed information pertaining to adjacent two nodes. This framework information enables steps to be taken and notifications to be passed if individual transformation nodes 640 within a transformation pipeline 600 become unresponsive during analysis operations. Combinations of results from the batch pathway, partial and streaming output results from the transformation pipeline, administrative directives from the authors of the analysis as well as operational status messages from components of the distributed computational graph are used to perform system sanity checks and retraining of one or more of the modules of the system 1606. These corrections are designed to occur without administrative intervention under all but the most extreme of circumstances with deep learning capabilities present as part of the system manager and retrain module 563 responsible for this task.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof.

In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 20:
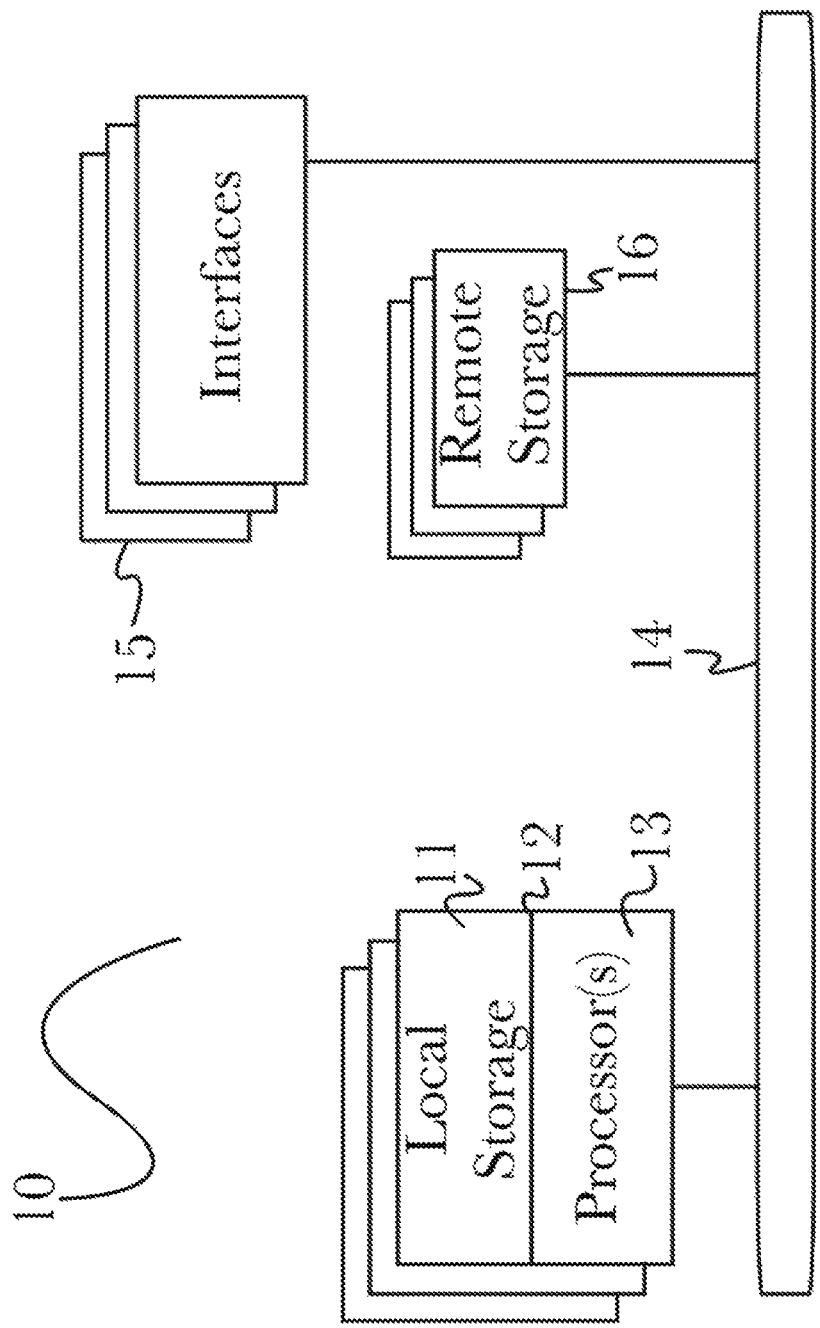
FIG. 20 is a block diagram illustrating an exemplary hardware architecture of a computing device.

Referring now to FIG. 20, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/N hardware interfaces) and, in some instances, volatile and/or non-volatile memory (e.g., RAM).

Although the system shown in FIG. 20 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 21:
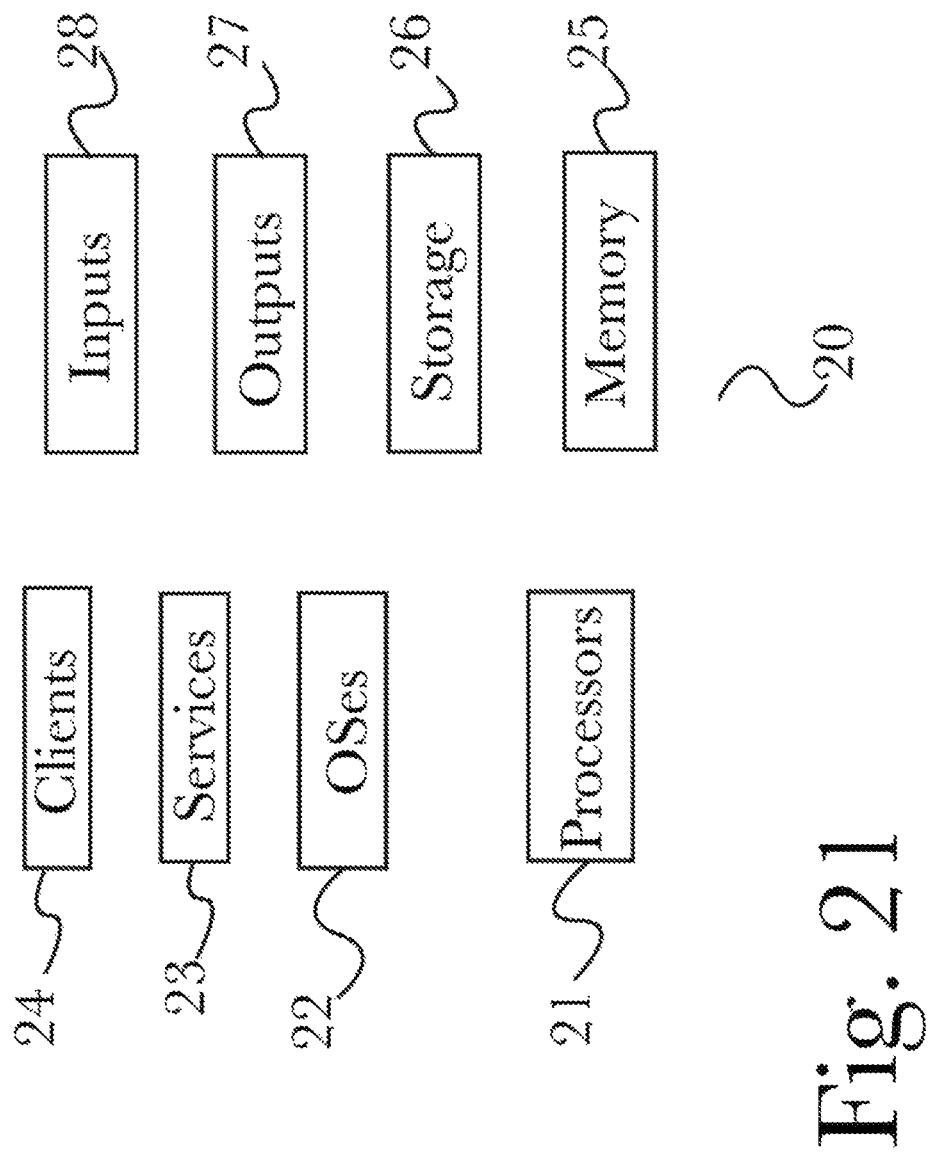
FIG. 21 is a block diagram illustrating an exemplary logical architecture for a client device.

In some aspects, systems may be implemented on a standalone computing system. Referring now to FIG. 21, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 20). Examples of storage devices 26 include flash memory, magnetic hard drive, CD-ROM, and/or the like.

Figure 22:
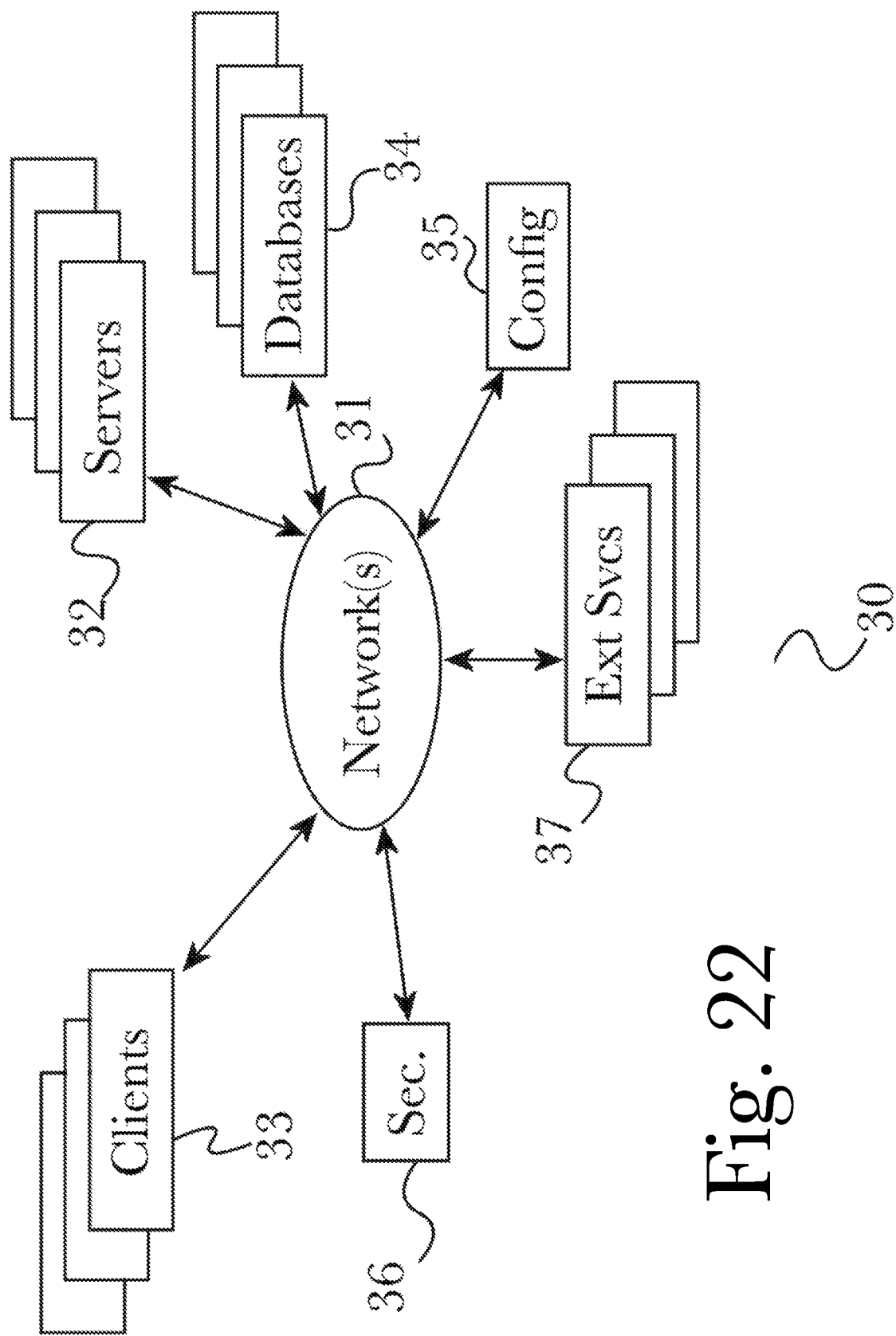
FIG. 22 is a block diagram showing an exemplary architectural arrangement of clients, servers, and external services.

In some aspects, systems may be implemented on a distributed computing network, such as one having any number of clients and/or servers. Referring now to FIG. 22, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 21. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises.

In some aspects, clients 33 or servers 32 (or both) may make use of one or more specialized services or appliances that may be deployed locally or remotely across one or more networks 31. For example, one or more databases 34 may be used or referred to by one or more aspects. It should be understood by one having ordinary skill in the art that databases 34 may be arranged in a wide variety of architectures and using a wide variety of data access and manipulation means. For example, in various aspects one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 23:
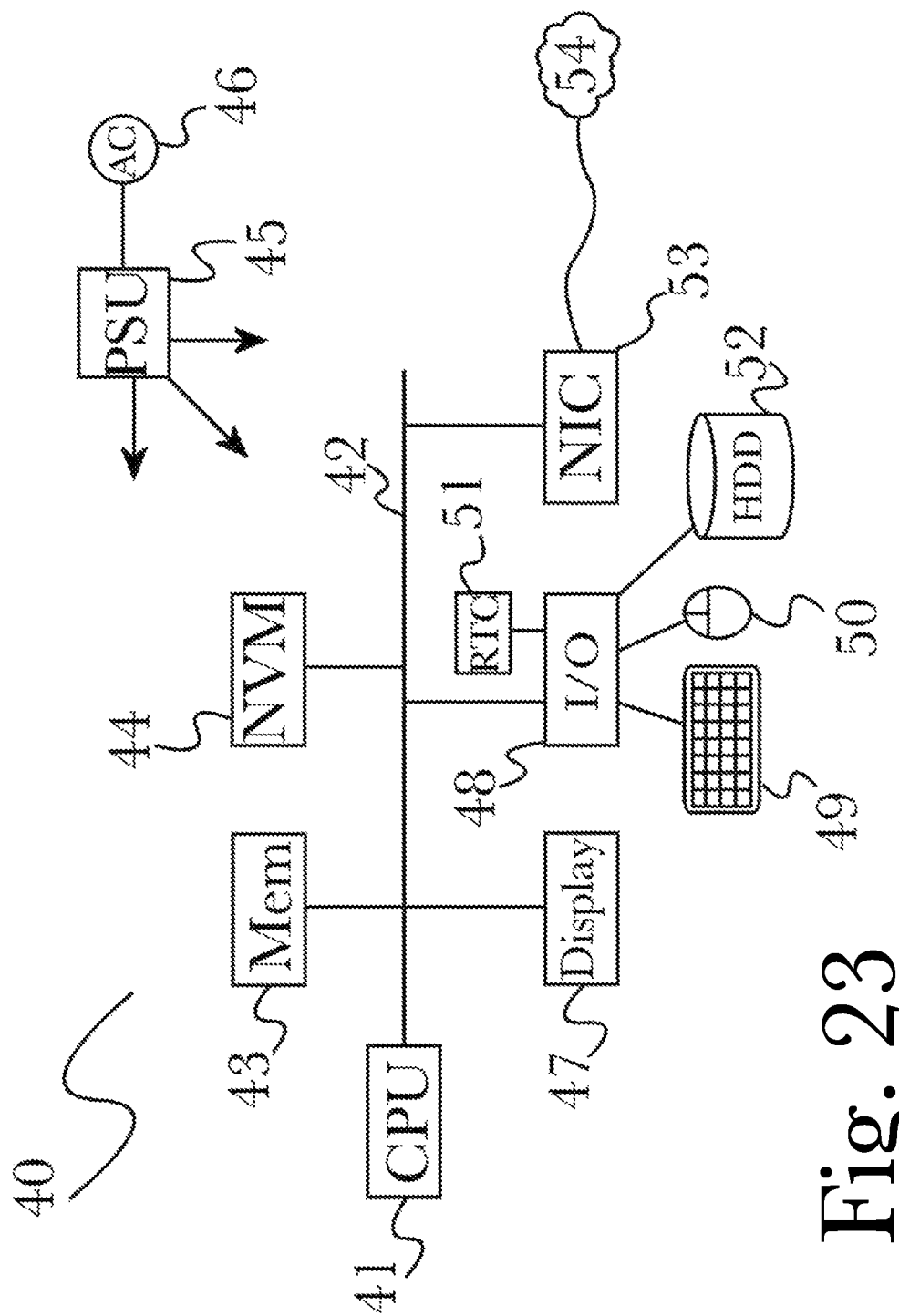
FIG. 23 is another block diagram illustrating an exemplary hardware architecture of a computing device.

FIG. 23 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

Figure 24:
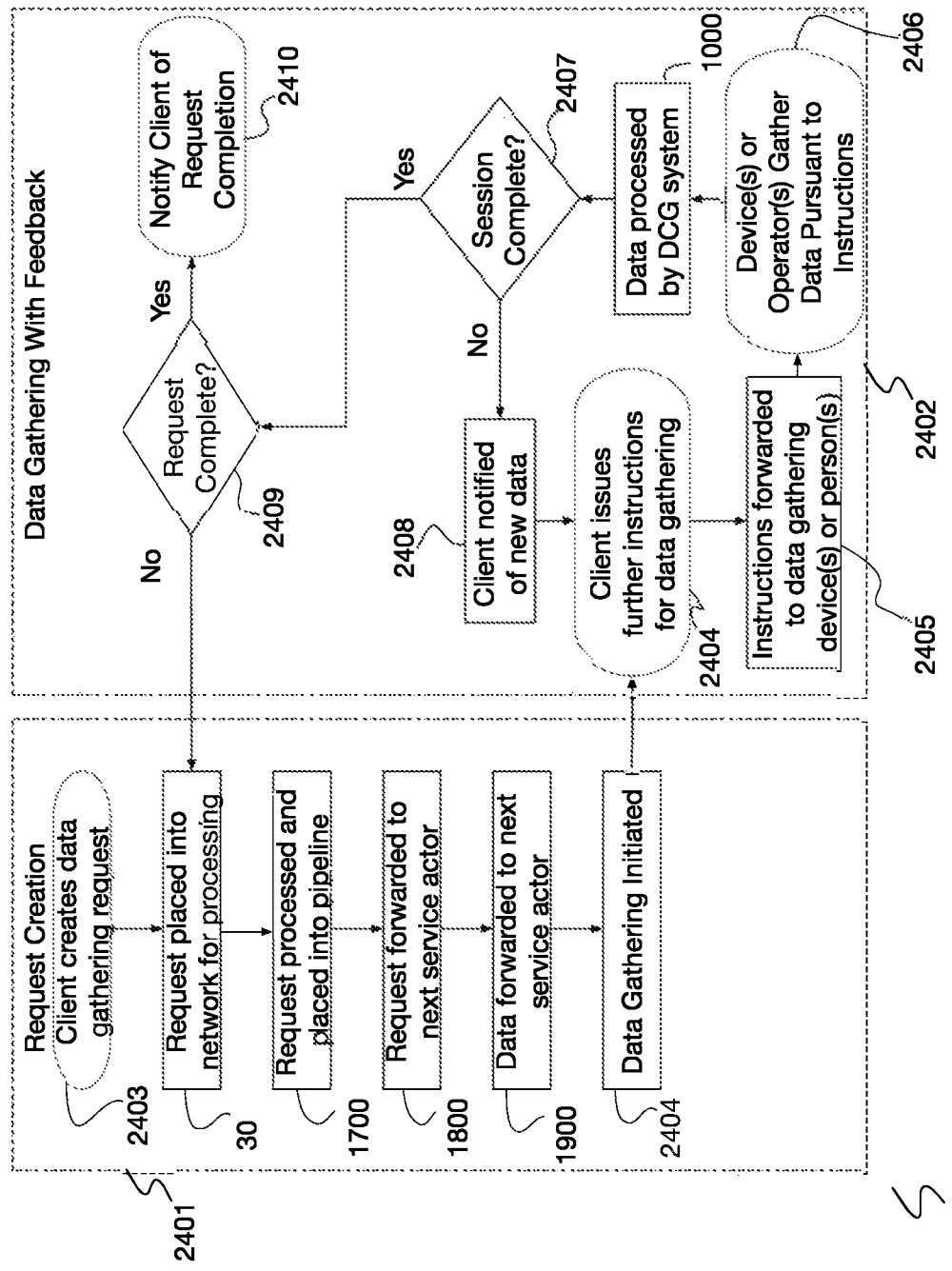
FIG. 24 is a process flow diagram for an exemplary embodiment of a crowd-sourced data gathering system.

FIG. 24 is a process flow diagram for an exemplary embodiment 2400 of the data gathering system. In the request creation application 2401, the client creates a data gathering request 2403. This initial data gathering request will specify the basic parameters of the data gathering task, such as the location, the type of data to be gathered, the method of collection, the frequency, and other parameters, plus the compensation to operators for providing parts of the requested data. This request is placed into the DCG system 30 for processing as previously disclosed. The request is then processed and several steps are taken in sequence or in parallel as previously disclosed: the request is placed into the pipeline 1700 and forwarded to the next service actor 1800, along with the necessary data for action 1900. Once the processing is complete, the data gathering procedure 2402 is initiated. The data gathering procedure is iterative, with successive operations being repeated until that particular data gathering session is complete. Upon initiation of the data gathering procedure and at each iteration of the session, the client may issue further instructions 2404 regarding collection of the data for that session, for example: instructions to the operator to collect additional samples, instructions to pan the camera left, instructions to zoom in on a particular subject of interest, and similar instructions. Said instructions are forwarded to the device or operator 2405, who then gathers the data as requested 2406 and in accordance with the most recent instructions. Said data are passed back through the DCG system for processing 1000 as previously disclosed. The system then makes an assessment as to whether this data gathering session is complete 2407. If it is not complete, the client is notified of the new data collected 2408, and the process repeats, starting with further instructions from the client. If it is complete, a further assessment is made to determine if the entire data gathering request is complete 2409. If it is not complete, the session is ended, but the data gathering request is placed back into the DCG system for further data gathering. If it is complete, the client is notified that the request is complete 2410.

Figure 25:
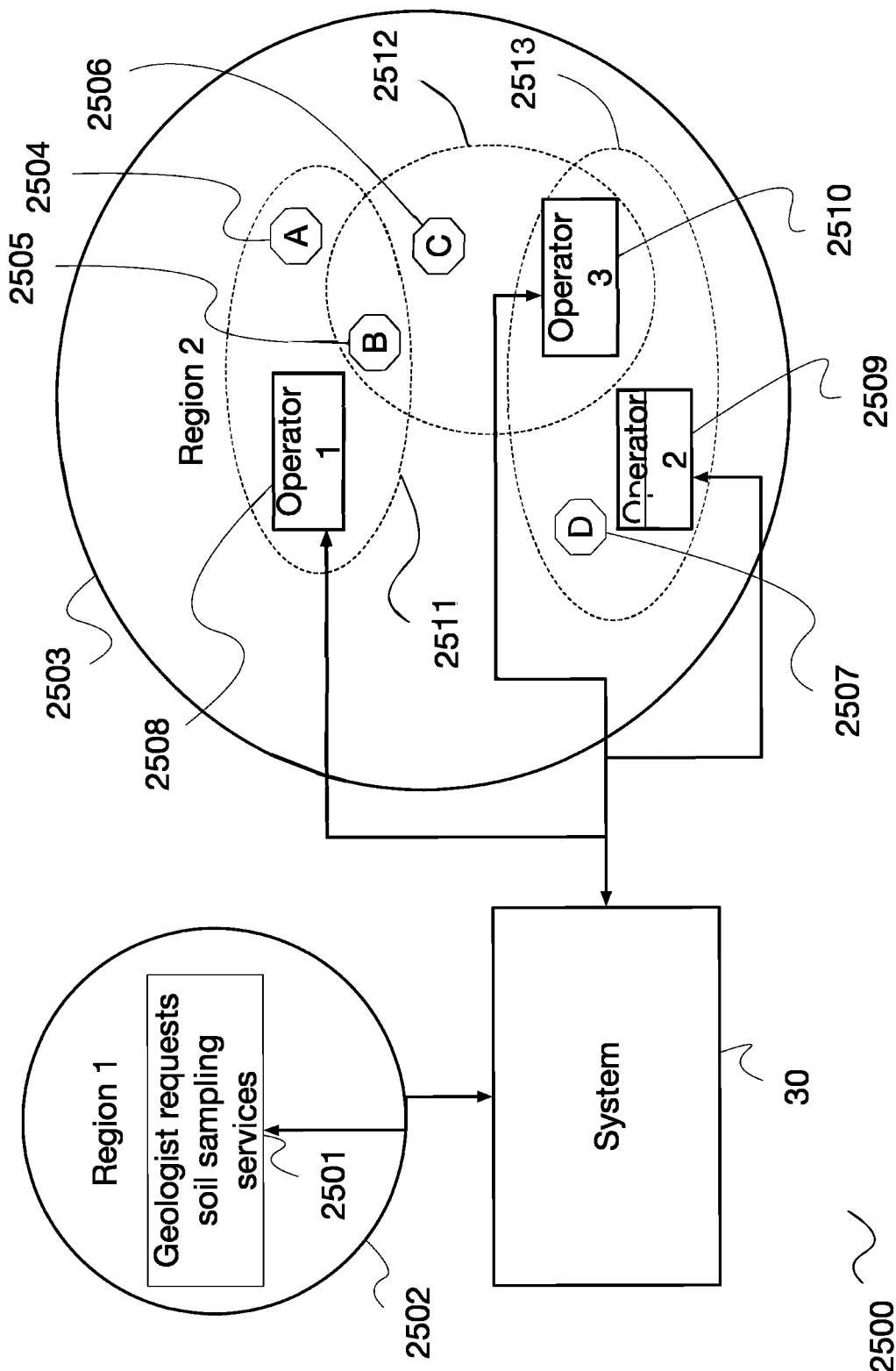
FIG. 25 is a diagram showing an exemplary use of an embodiment of a crowd-sourced data gathering system.

FIG. 25 is a diagram showing an exemplary use 2500 of an embodiment of the data gathering system. Say, for example, that a geologist 2501 in Region 1 2502 needs to have soil samples collected at several times throughout the year in Region 2 2503, a location remote from him. The samples need to be taken at 4 locations: site A 2504, site B 2505, site C 2506, and site D 2507. When the geologist creates his data gathering request, it is sent to the DCG system 30 for processing as previously disclosed. The system forwards data gathering requests to operators whom it predicts based on past behavioral and location data will be willing and able to collect data from at least one of the sites during at least one of the times requested by the geologist. Operator 1 2508 lives in the area, and has participated in similar gathering requests in the past. The system predicts, based on prior information, that Operator 1 will be able to perform data gathering services from a general area 2511 that includes sites A and B, and sends requests to Operator 1 accordingly. Operator 2 2509 will be on vacation in the area on certain dates, and the system predicts that Operator 2 would be willing and able to perform data gathering services from a general area 2513 that includes site D. Operator 3 2510 has relatives in the area, and based on past information, the system believes that Operator 3 would be willing and able to perform data gathering services from a general area 2512 that includes sites B and C. Thus, there is a network of individuals who have agreed to provide data gathering services and who have various connections to the location where the data is to be gathered. Collectively, they are likely to obtain samples from all four sites of interest during the times requested by the geologist without the geologist having to establish a presence in the area or place his own monitoring devices at the sites.

Figure 26:
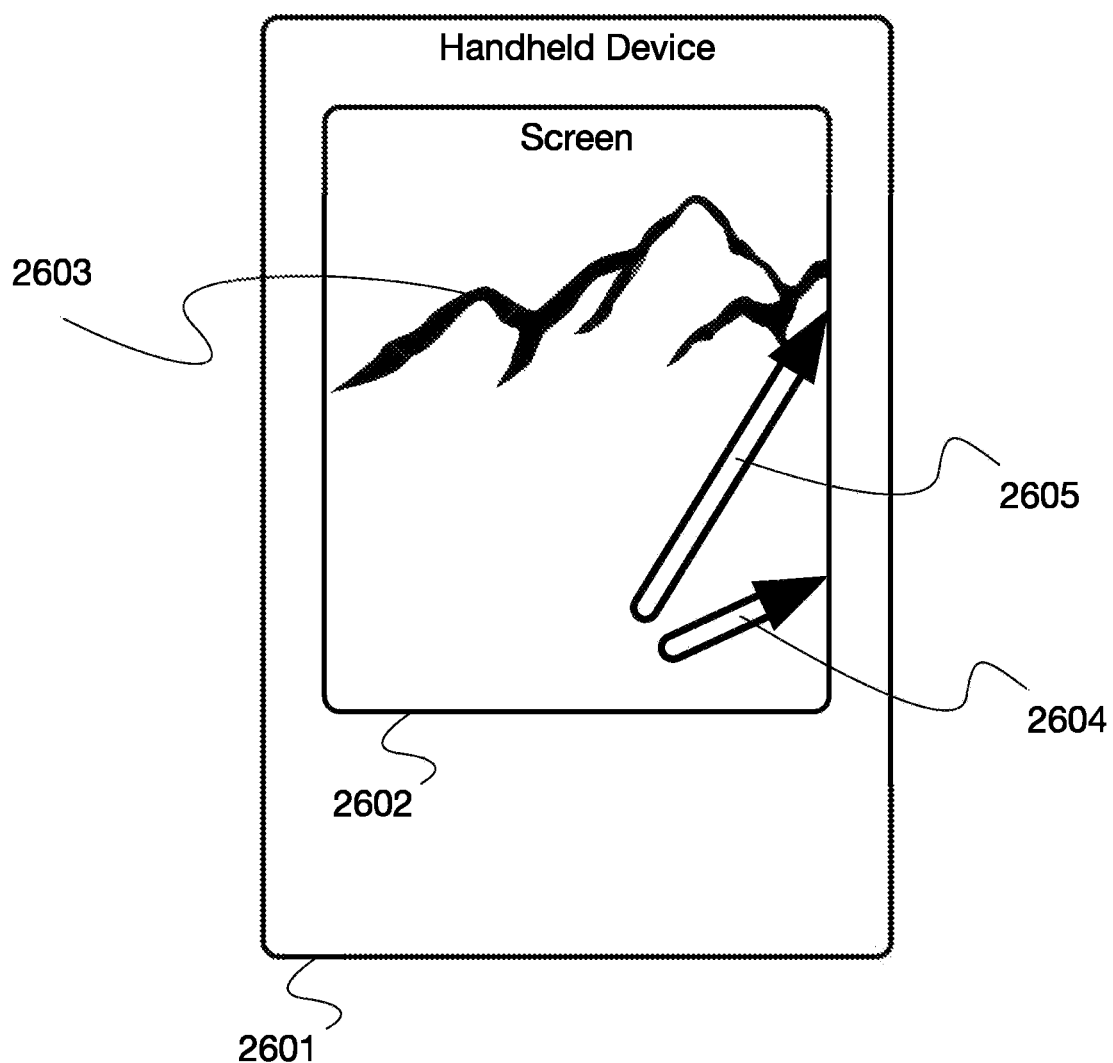
FIG. 26 is a diagram showing an exemplary representation of the client direction and operator visual feedback aspect of a video streaming embodiment of a crowd-sourced data gathering system.

FIG. 26 is a diagram showing an exemplary representation of the client direction and operator visual feedback aspect of a video streaming embodiment 2600 of the data gathering system. A device 2601, likely a mobile phone, is held by an operator, who points the device's video camera at a data gathering subject requested by a client. The device's screen 2602 opposite the video camera, shows the current video feed 2603 both to the operator directly, and to the client via real-time video streaming. The client uses an indicating mechanism such as a computer mouse to indicate in real time directions for movement of the camera to the operator. The client's directions show up on the device's screen as vector arrows with a magnitude and direction for the camera to be moved. For example, the arrow at 2604 shows that the camera should be moved slightly up and to the right. As another example, the arrow at 2605 shows that the camera should be moved substantially upward and to the right. Compliance with these onscreen instructions can be measured in terms of time for compliance and accuracy, and scores can be given which will, in part, determine the operator's compensation for this data gathering session.

Figure 27:
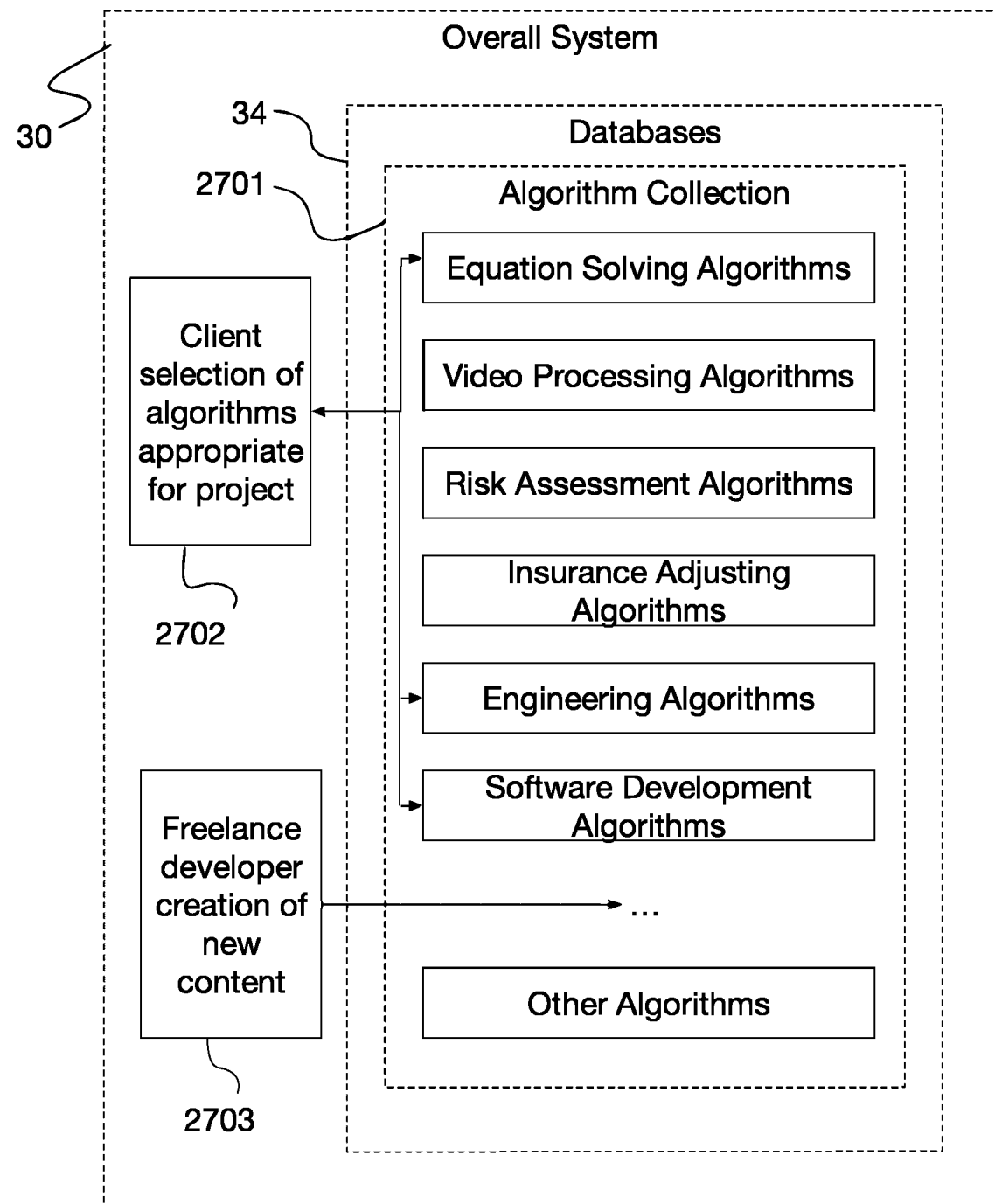
FIG. 27 is a process flow diagram showing an exemplary representation of a universal collection of computing algorithms and a marketplace for clients and developers of such algorithms.

FIG. 27 is a process flow diagram showing an exemplary representation of a universal collection of computing algorithms and a marketplace for clients and developers of such algorithms 2700. In the context of a previously disclosed embodiment 30, and within the database portion of said embodiment 34, exists a universal collection of algorithms 2701, that can be selected for use by a client 2702 separately or in combination with other algorithms for the purpose of meeting the client's specific computing needs. Freelance developers 2703 will be encouraged to contribute additional content to the system for a fee, royalties, or other compensation, thus ensuring that the collection continues to grow and remain up-to-date.

Figure 28:
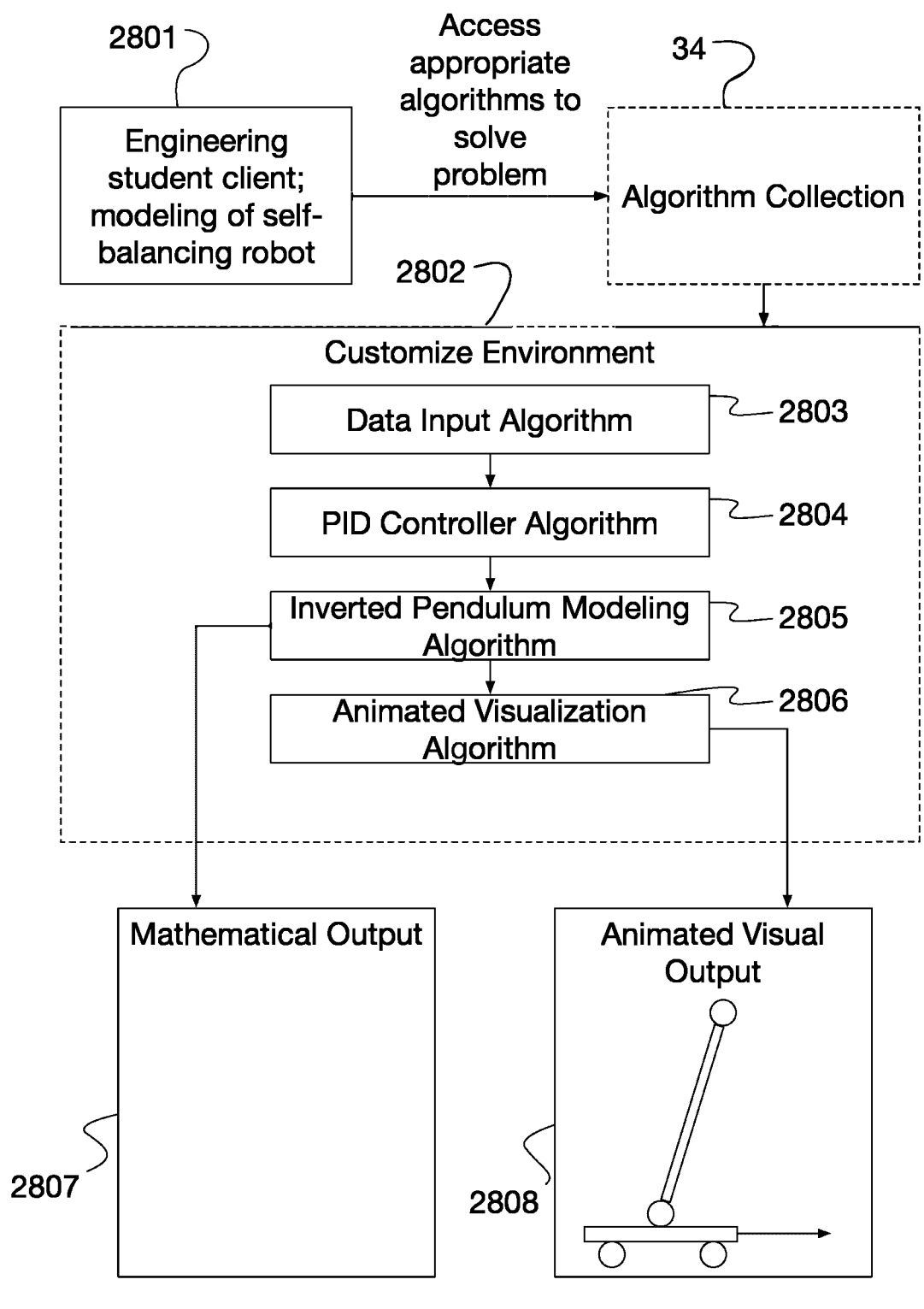
FIG. 28 is a diagram showing an exemplary representation of the usage of a universal collection of computing algorithms by an individual client with simple computing needs.

FIG. 28 is a diagram showing an exemplary representation of the usage of a universal collection of computing algorithms by an individual client with simple computing needs 2800. In this example, a university engineering student 2801 needs to perform repeated simulations of a self-balancing robot under a variety of conditions. Through the use of APIs available in the system, the student customizes his work environment 2802 and selects appropriate algorithms from the previously-disclosed collection 34 to perform the needed computing. The student combines in a modular steps algorithm for inputting data 2803, adjusting the parameters of the proportional/integral/differential (PID) controller 2804, modeling an inverted pendulum 2805, animated visualization algorithm 2806, and outputting both mathematical 2807 and animated visual outputs 2808 of the results.

Figure 29:
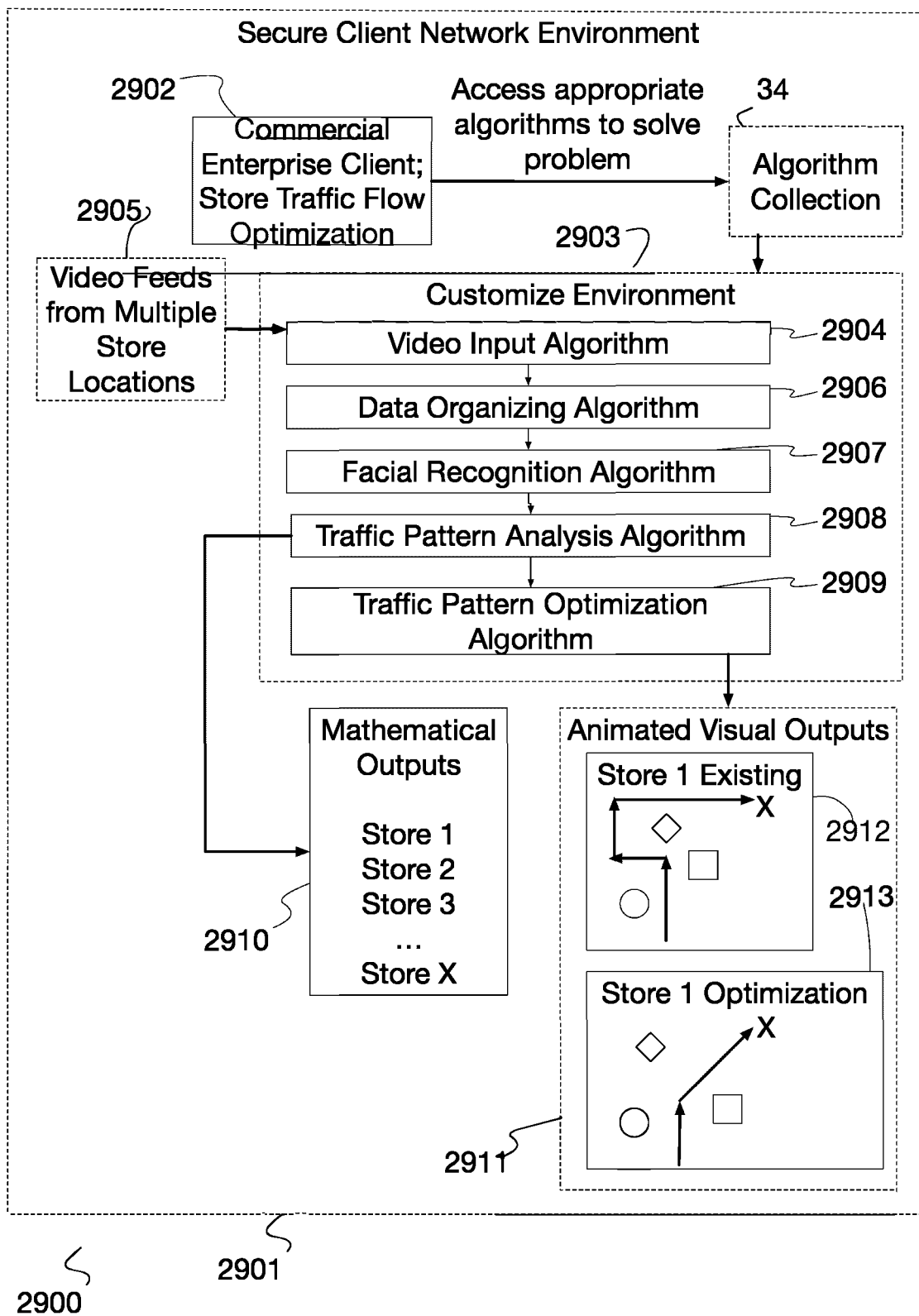
FIG. 29 is a diagram showing an exemplary representation of the usage of a universal collection of computing algorithms by a large commercial enterprise client with complex computing needs.

FIG. 29 is a diagram showing an exemplary representation of the usage of a universal collection of computing algorithms by a large commercial enterprise client with complex computing needs 2900. In this example, a commercial client 2902 needs to analyze the video feed from hundreds of security cameras 2905 located at its many business locations worldwide to analyze the flow of consumer traffic through its stores. Within the client's secure network environment 2901, which is integrated with the system, the client customizes his work environment 2903 and through the use of APIs available in the system, selects appropriate algorithms from the previously-disclosed collection 34 to perform the needed computing. The client combines in a modular steps algorithms for obtaining video input feeds 2904, organizing the gathered video data 2906, processing the video feeds through facial recognition algorithms 2907 to track the movement of people through the store, perform traffic pattern analysis at each store 2908, and run simulations that optimize traffic patterns for each store location 2909. The results are output for each store both in mathematical (raw data) form 2910, and as visual animations 2911 showing the existing 2912 and optimized 2913 store layouts. In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

Figure 30:
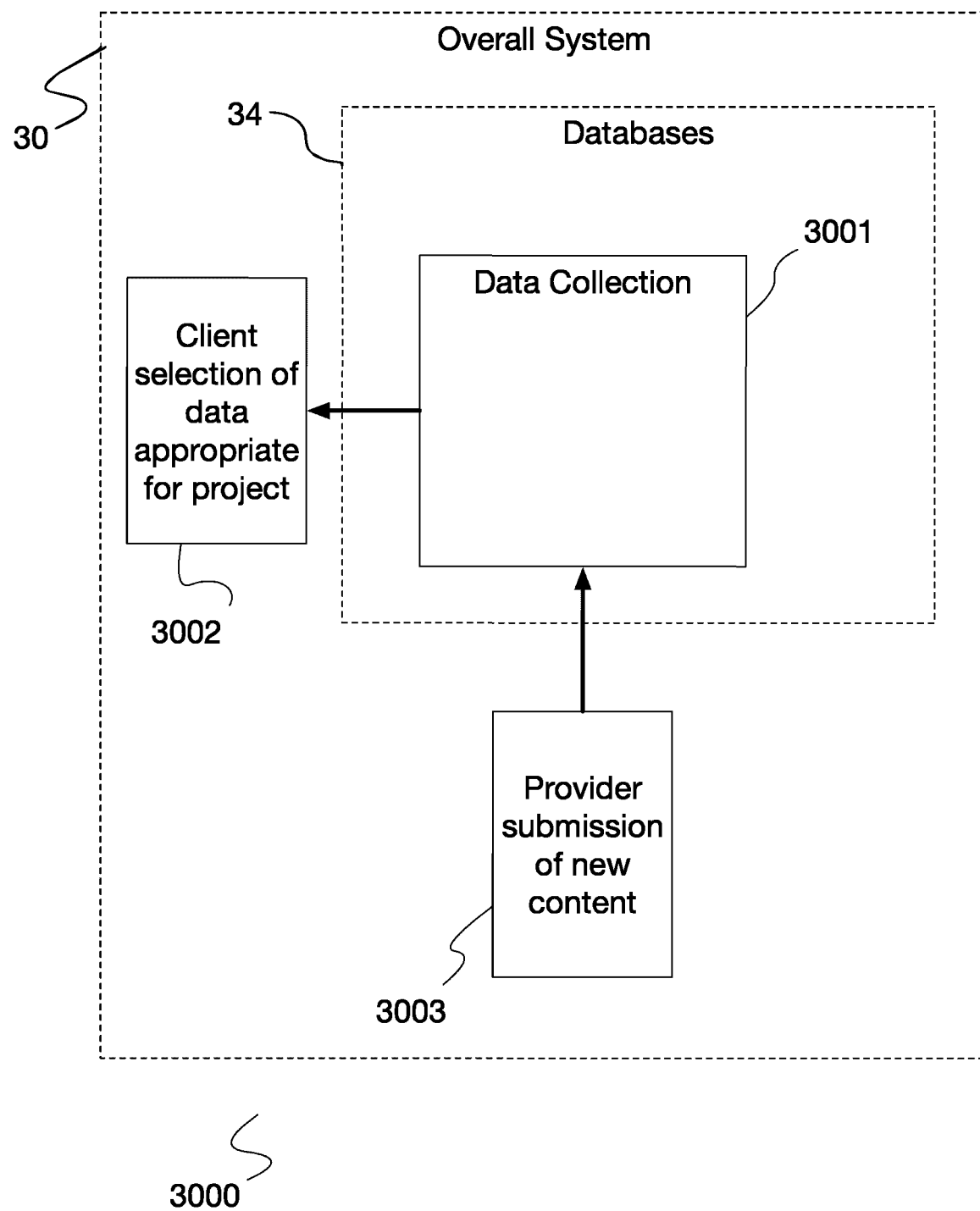
FIG. 30 is a process flow diagram showing an exemplary representation of a collection of data resources and a marketplace for clients and providers of such data.

FIG. 30 is a process flow diagram showing an exemplary representation 3000 of a collection of data resources and a marketplace for clients and providers of such data. Within the previously-disclosed overall system 30, exists a previously-disclosed set of databases 34, which includes a data collection database 3001. Content providers 3003 provide a data to the system, which may be purchased by clients 3002.

Figure 31:
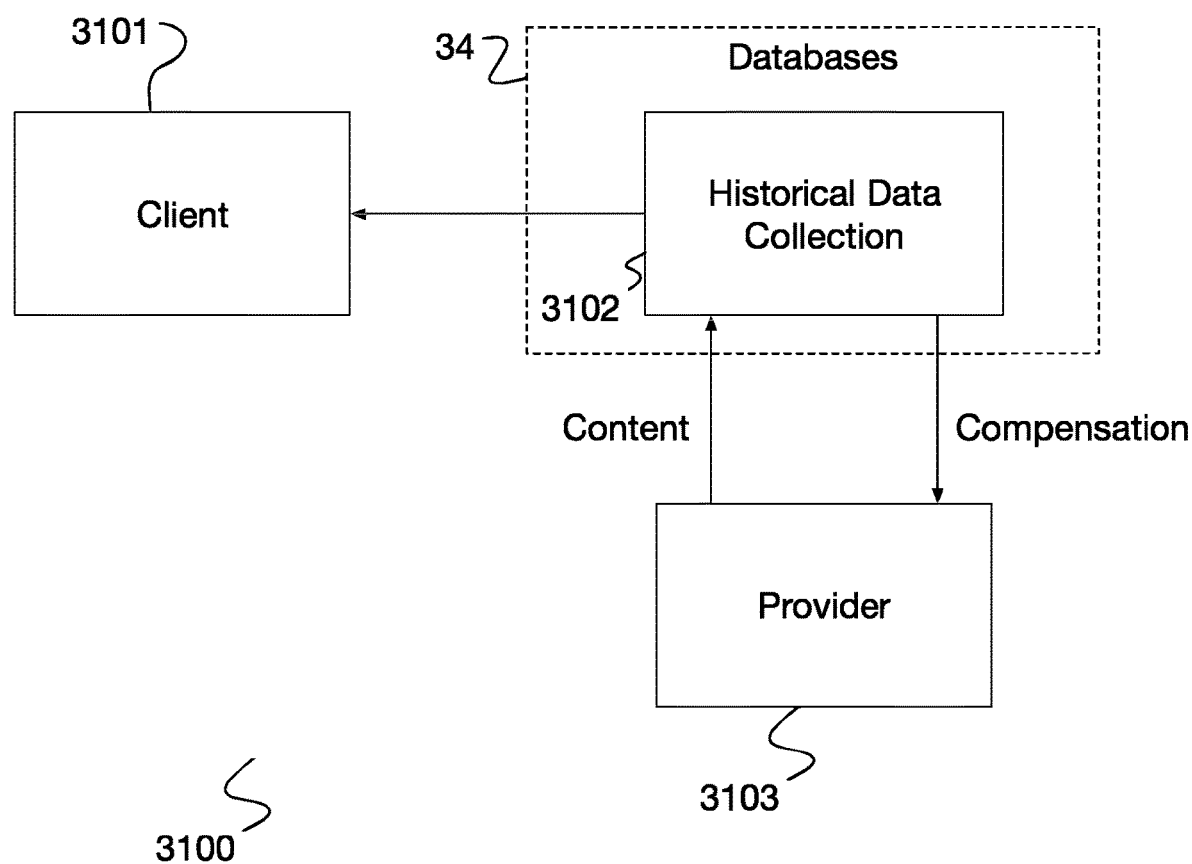
FIG. 31 is a diagram showing an exemplary representation of the usage of a collection of data resources by an individual client with historical data needs.

FIG. 31 is a diagram showing an exemplary representation 3100 of the usage of a collection of data resources by an individual client with historical data needs. In this example, an individual client 3101 may need to certain historical data 3102 which will remain unchanged. A provider 3103 uploads the data to a centralized historical data collection 3102, the client accesses the database, conducts a search for historical data, and pays a fee for use of data he determines to be useful for his purposes. The provider is then compensated for the use of his data.

Figure 32:
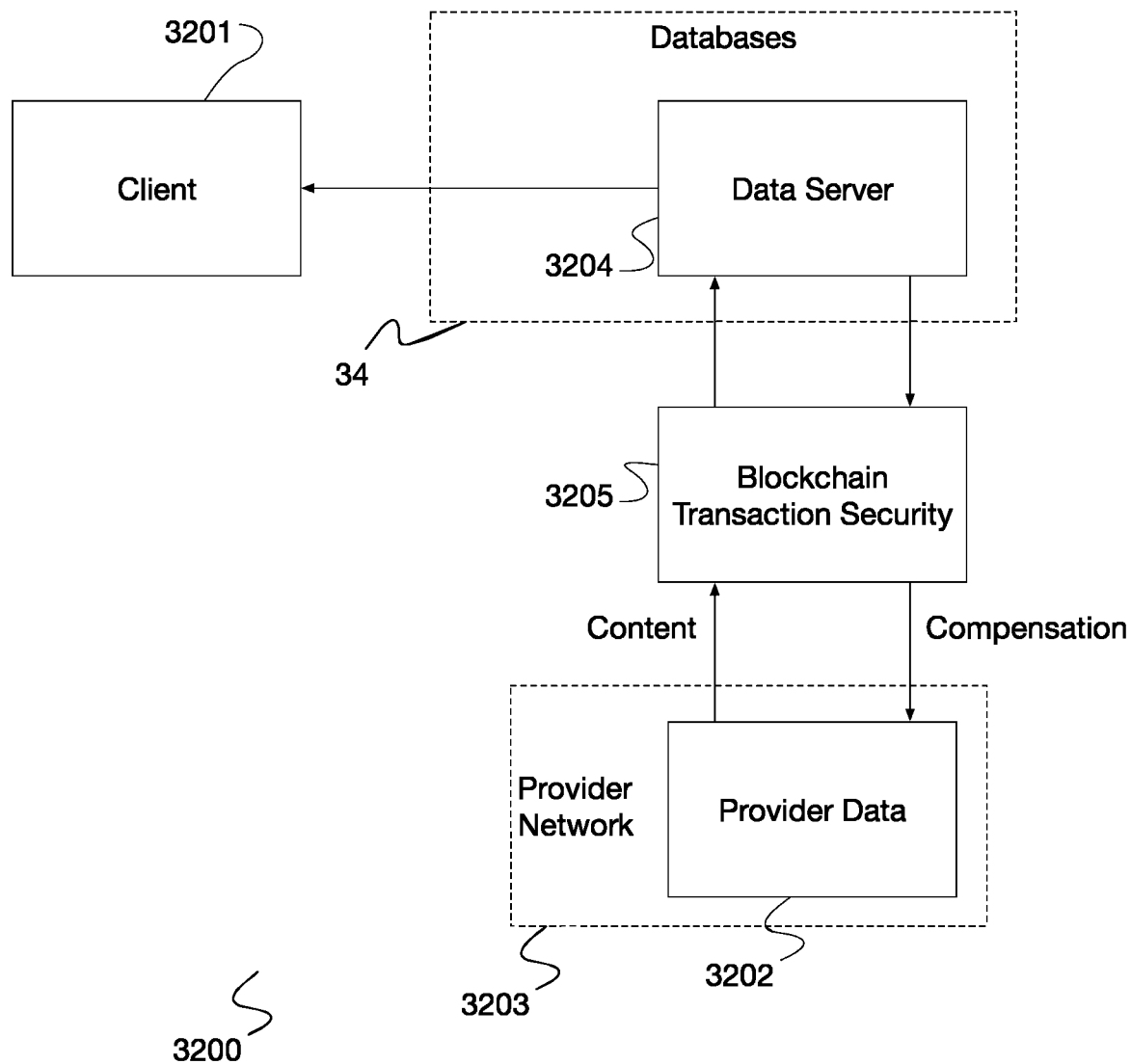
FIG. 32 is a diagram showing an exemplary representation of the usage of a collection of data resources by a commercial enterprise client with current data needs and a provider who prefers to keep the data on its own network.

FIG. 32 is a diagram showing an exemplary representation 3200 of the usage of a collection of data resources by a commercial enterprise client 3201 with real-time data needs and a provider who prefers to keep the current data 3203 on its own network 3204. The system allows the provider to establish a secure connection to a data server 3202 located within the previously-disclosed databases 34. The client request data from the server, and the provider is compensated for the use of his data. For sensitive data or to allow for anonymous transactions, the exchange will be conducted through a blockchain mechanism 3205, which allows for transaction security without requiring a centralized server.

Figure 33:
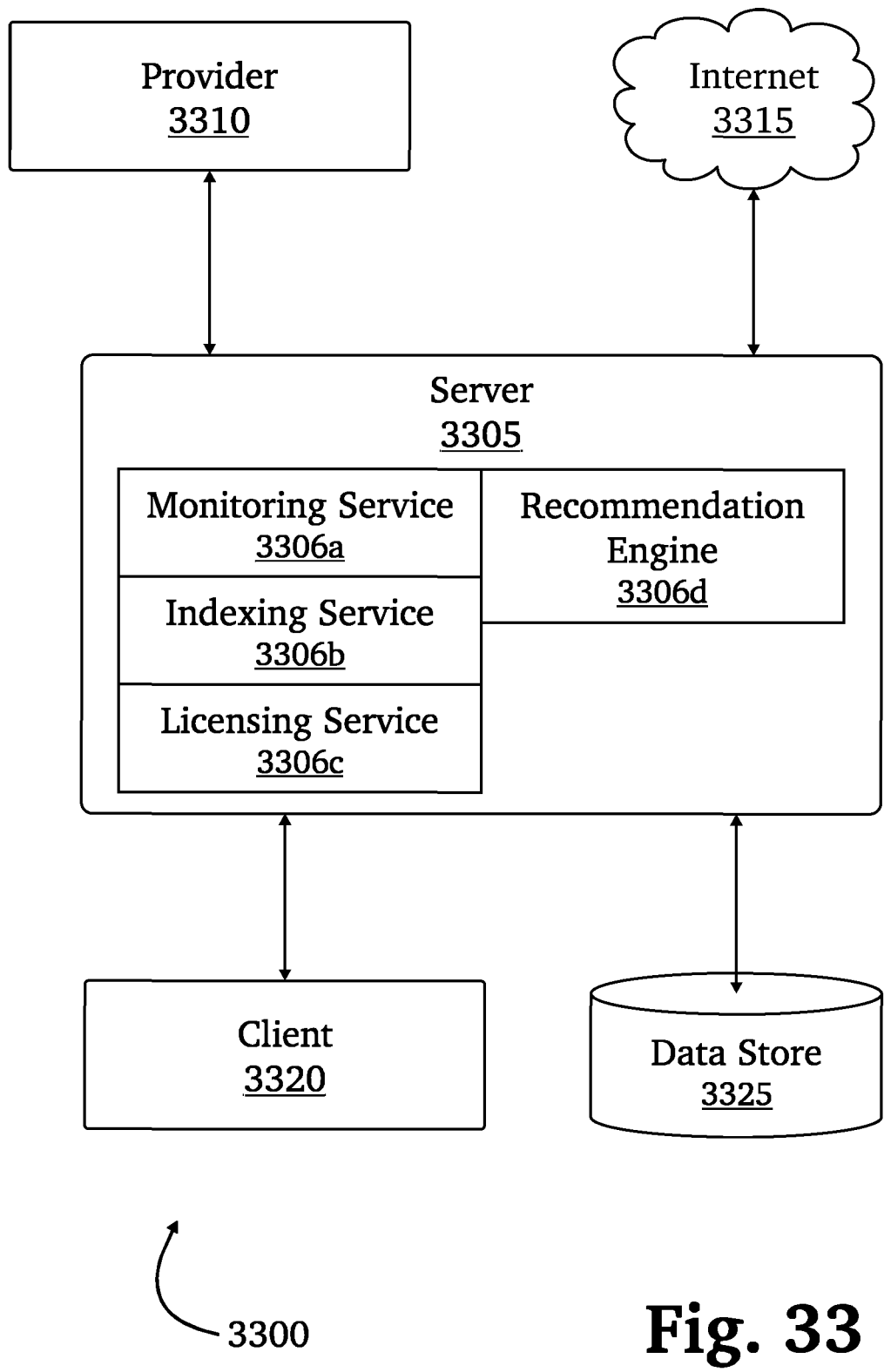
FIG. 33 is a block diagram of an exemplary system for meta-indexing, search, compliance, and test framework for software development according to one aspect.

FIG. 33 is a block diagram of an exemplary system 3300 for meta-indexing, search, compliance, and test framework for software development according to one aspect. System 3300 comprises a server 3305, a content provider 3310, a client 3320, an internet connection 3315, and a data store 3325. System 3300 may be configured to function as a marketplace as discussed above, a repository for providers to distribute their projects, a search engine for projects, and the like. System 3300 may also be used in conjunction with other project management tools currently used in the art, such as MAVEN, SONOTYPE NEXUS, and JIRA.

Content provider 3310 may be a developer providing projects that may be algorithms, data sets, visualizations, and the like for use by potential clients. Some examples of content providers may be found above in FIGS. 27 and 31. Depending on the implementation of system 3300, for example, a marketplace for projects or an aggregator of registered projects, provider 3310 may upload their project to sell, or simply register a publicly listed project such as a GITHUB project page.

Server 3305 may comprise a monitoring service 3306a, an indexing service 3306b, a licensing service 3306c, and a recommendation engine 3306d. Monitoring service 3306a may utilize continuous and ongoing collection and natural language processing to monitor and gather information regarding a particular project, for example, code commits, security-related bulletins, news regarding the project, project status, usage licensing changes, and the like. Monitoring periodicity may be adjusted to a desired interval by an administrator.

Indexing service 3306b may be configured to recursively index a codebase of a project, including all dependencies and libraries that may have been used in the project. This may allow developers to search code snippets. This may allow a developer, as well as the server, to determine whether certain portions of code are being plagiarized, for example. Indexing the code may also allow the codebase to be audited by server 3305 to check for bugs and vulnerabilities. Indexing server 3306b may be configured to locate reference sources that may be relevant to the project to provide easy access to reference resources. Reference resources may include internet message boards, documentation for relevant libraries and dependencies, and the like.

Licensing service 3306c may be used to manage and restrict usage of a particular project. This may be through the use of, for example, integrated digital rights management (DRM), usage licensing agreements, and the like. When used in combination with monitoring service 3306a, or other operating system monitoring tools, such as OSQUERY, licensing service 3306c may locate instances of inappropriate or unauthorized usage of a project, for example, it may be a case of unauthorized distribution, violation of an attributed usage license, or the like. A developer may also use licensing service 3306c, to sell and manage usage licenses in the case of a marketplace setting.

Recommendation engine 3306d may be used to provide recommendations to a client regarding appropriate projects, and usage licenses based on information provided by the client. This may allow clients to avoid inadvertently violating a usage license, or inadvertently subjecting proprietary code to undesirable licensing. For example, many usage licenses, such as General Public License (GPL) and Affero General Public License (AGPL), may require a user to provide source code in order to use licensed code.

Client 3320 may be a company or individual looking for projects that may be used in development of their own projects, or a complete software solution. Examples of various types of clients are discussed above.

Data store 3325 may be used to store data pertaining to a particular project, which may include project index data, reference information, usage statistics, and the like. The information may use a time-series graph database, which may be efficiently processed and queried using DCG processing methods discussed above.

Although only one provider and one client are illustrated in system 3300, it should be understood that this is for illustrative purposes only, and the system may have a as many providers and clients as long as server resources are available. Additionally servers may also be added to system 3300 to balance load, thereby allowing addition providers and clients.

Figure 34:
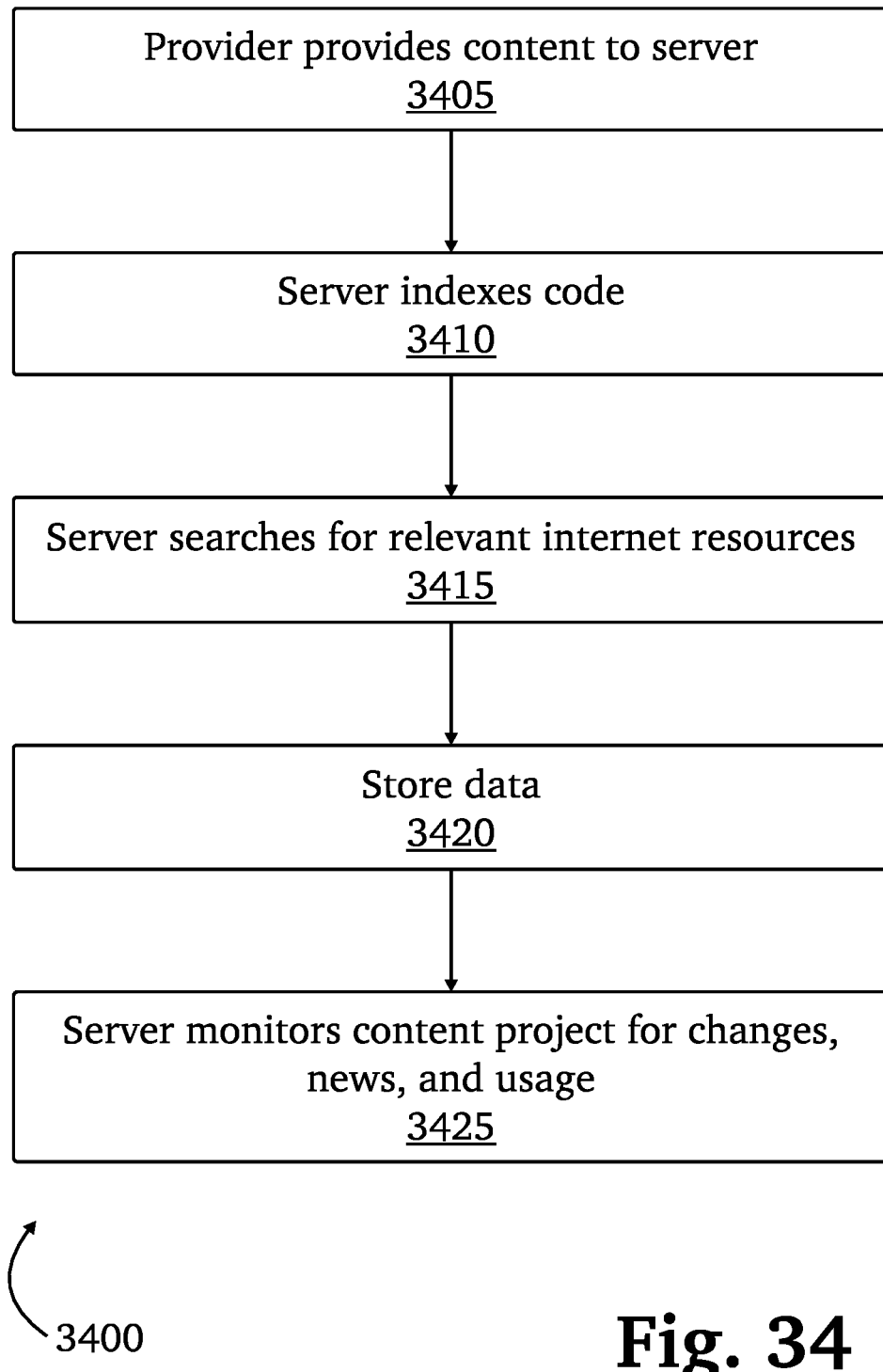
FIG. 34 is a flow chart illustrating a method for providing content to a server to initiate monitoring according to one aspect.

FIG. 34 is a flow chart illustrating a method 3400 for providing content to a server to initiate monitoring according to one aspect. At an initial step 3405, a provider may provide content to a server. As mentioned above, this step may be the provider uploading to a marketplace, or registering their project. At step 3410 the server indexes the code, including and dependencies and libraries used in the project. The server may also be configured to automatically audit code at this point to, for example, looks for bugs, vulnerabilities, poor coding practices, and the like. At step 3415 the server aggregates relevant resources, such as message boards, documentation for programming languages used, documentations for libraries and dependencies, any relevant news, and the like. Links to the resources may be used to create a hub for resources accessible to the project owner and any potential clients. At step 3420 indexed code, and gathered data are stored into memory using a graph database. At step 3425, the server continuously monitors the project. Some things that may be monitored may include code commit history, news regarding the project or any of the dependencies used, data regarding client usage, and the like. Changes may be made to the stored data as needed.

Figure 35:
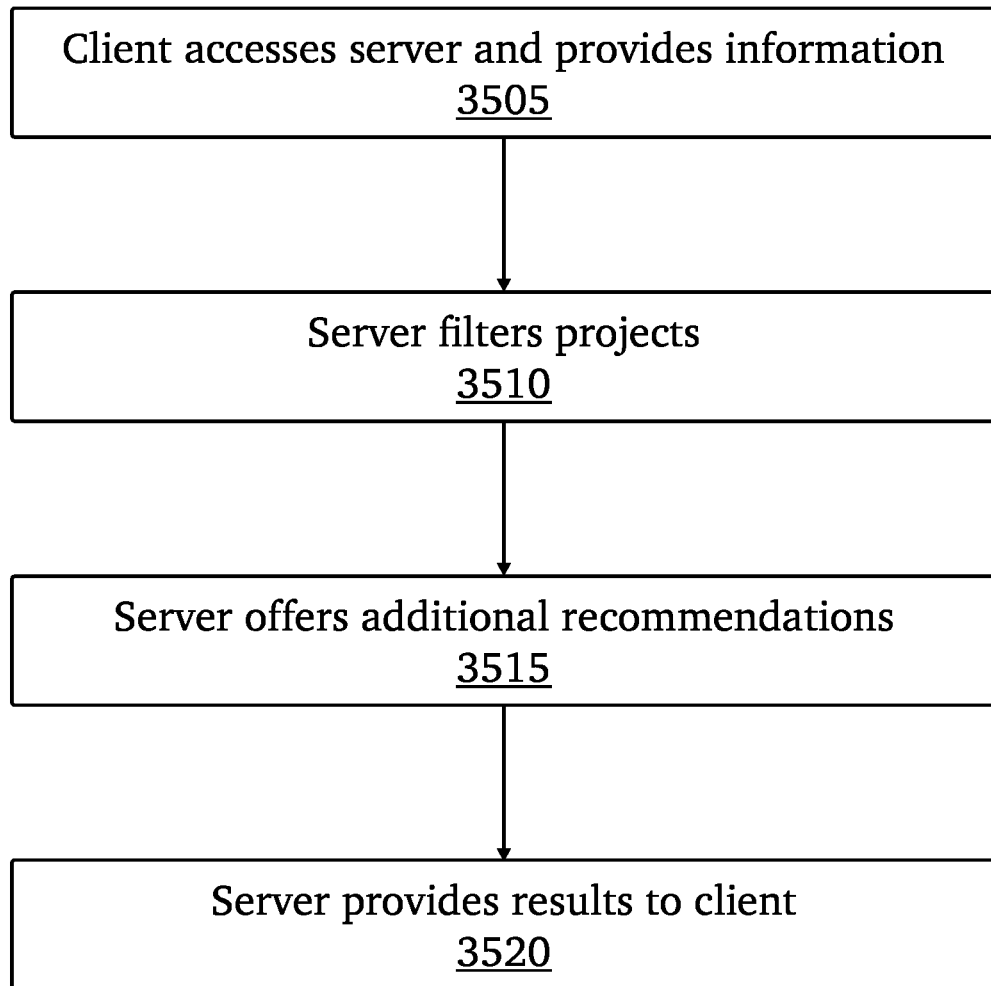
FIG. 35 is a flow chart illustrating a method for using a recommendation engine, according to one aspect.

FIG. 35 is a flow chart illustrating a method 3500 for using a recommendation engine, according to one aspect. At an initial step 3505, a client accesses a server using, for example, a web application or mobile application. The client may then provide information such as intended usage, commercial or non-commercial, and the like. At step 3510, the server filters projects based on the information provided by the client. At step 3515, the server may offer additional recommendations. For example, additional options may be recommended to expand the search or particular usage license, such as AGPL, may be recommended. At step 3520, the server provides results to the client.

Figure 36:
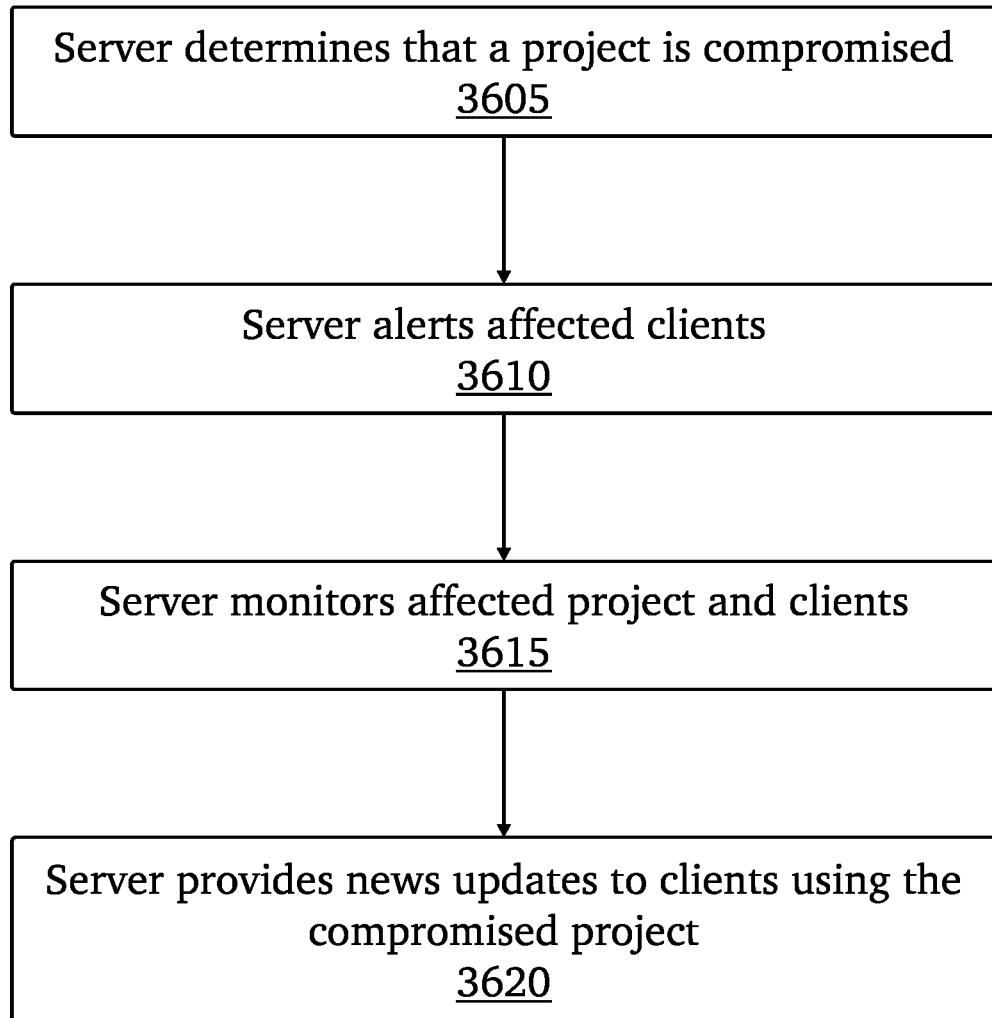
FIG. 36 is a flow chart illustrating a method for handing a compromised project, according to one aspect.

FIG. 36 is a flow chart illustrating a method 3600 for handing a compromised project, according to one aspect. At an initial step 3605, a project has been determined by the server to be compromised. This may be through the monitoring of changes in code, based on news, compromised library or dependency, and the like. At step 3610, the server alerts clients known to be using the affected project that the project is currently unsafe to use, and may provide a solution if one currently exists; for example, temporarily rolling back to an older version until any problems are resolved. At step 3615, the server continuously monitors the status of the project and clients, and may check to see if any clients are still currently using unsafe versions and may continue to alert those clients. At step 3620, the server may provide clients with status updates, and whether the project is safe to use. The server may also recommend another project that may fit the needs of the client if, for example, a compromised project has been abandoned by its developer or a solution is taking longer than expected.

Figure 37:
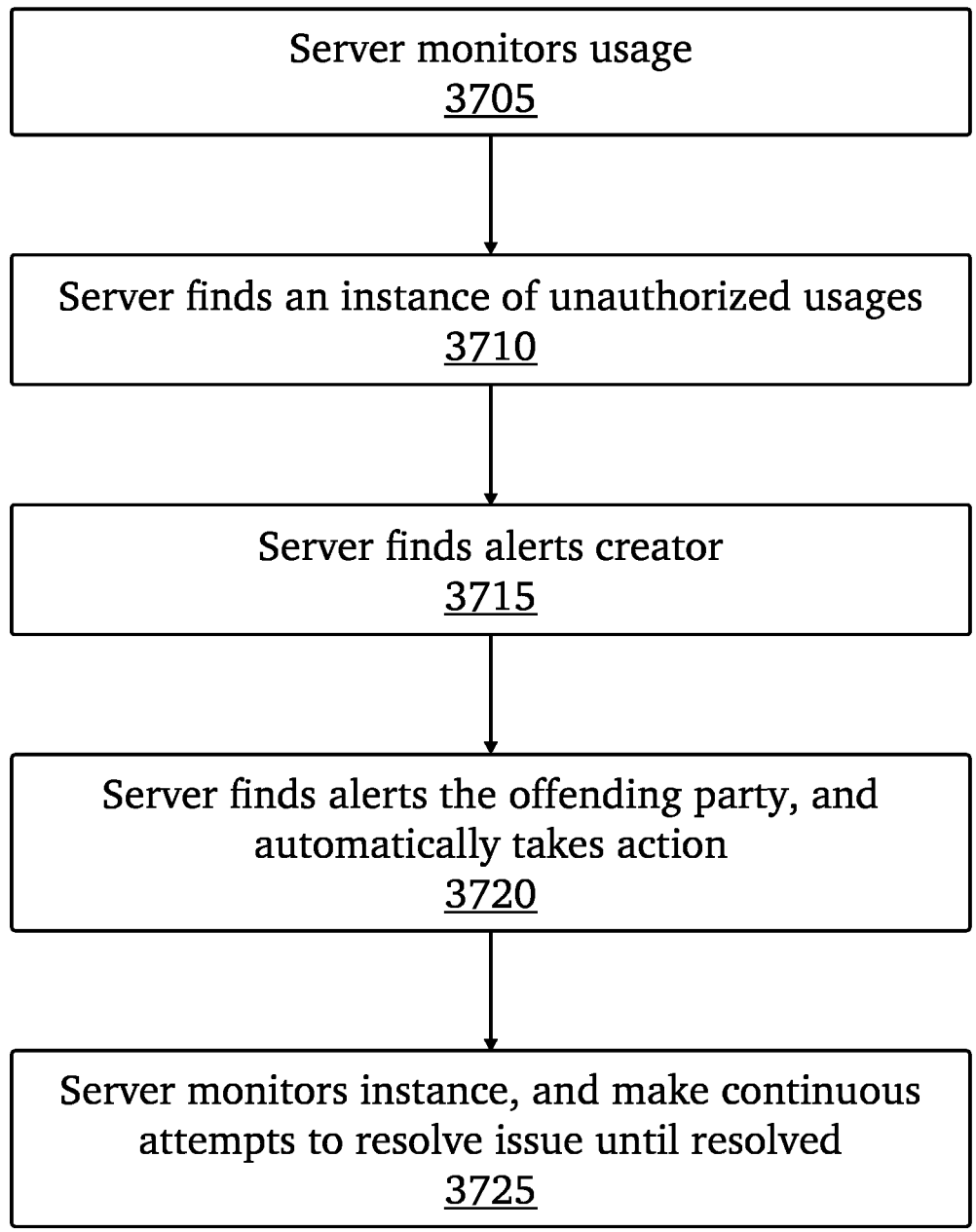
FIG. 37 is a flowchart of a method for handing unauthorized usage of an indexed project, according to one aspect.

FIG. 37 is a flowchart of a method 3700 for handing unauthorized usage of an indexed project, according to one aspect. At an initial step 3705, a server monitors usage of an indexed project by, for example, including a function that continuously provides a status update to the server or through the use of client system monitoring tools. At step 3710, the server has located an instance of unauthorized usage, which may be, for example, violation of usage license such as commercial usage of a non-commercial project, or unauthorized distribution. At step 3715, the server alerts the project owner of the unauthorized usage. The project owner may take corrective measures independent of the server if desired. At step 3720, the server alerts the offending party, and may automatically takes corrective measures after a warning period, such as filing a Digital Millennium Copyright Act (DMCA) notice to a server host. At step 3725, the server may continuously monitor the instance of unauthorized usage to determine whether to issue has been resolved. If not, continuous resolution attempts may be made by the server until the issue is resolved.

The skilled person will be aware of a range of possible modifications of the various aspects described above. Accordingly, the present invention is defined by the claims and their equivalents.

What is claimed is:

1. A system for a compliance and testing framework for software development, comprising:
   a computing device comprising at least a processor and a memory;
   an indexing service comprising a first plurality of programming instructions stored in the memory and operable on the processor of the computing device, wherein the first plurality of programmable instructions, when operating on the processor, cause the processor to:
   create a dataset by processing and indexing source code of a project provided by a developer;
   perform a code audit using automated analysis using a distributed computational graph comprising at least a plurality of network-addressable processors and memories operating on a plurality of network-connected computing devices, the distributed computational graph collectively maintaining a distributed computational graph and a plurality of interfaces for accessing the functionality thereof across a network, on the indexed source code;
   store results from the code audit in the dataset;

gather additional information relating to a project;
store the additional information in the dataset; and
store the dataset into memory; and
an enforcement module comprising a second plurality of programming instructions stored in the memory and operable on the processor of the computing device, wherein the second plurality of programmable instructions, when operating on the processor, cause the processor to:
retrieve a software asset from the database for compliance verification, wherein the software asset is a portion of code;
retrieve metadata from the additional information, wherein the metadata pertains to the software asset;
retrieve rules and obligations relating to the software asset using the metadata from a rules database;
automatically confirm the compliance of the software asset according to the rules and obligations;
produce a compliance recommendation for any non-complaint part of the software asset;
forward any non-automatically verifiable rule and obligation to an enforcement queue;
receive a manual recommendation and an approval or disapproval regarding the any non-automatically verifiable rule and obligation; and
store the results of the compliance verification.

2. The system of claim 1, further comprising a monitoring service comprising a third plurality of programming instructions stored in the memory and operable on the processor of the computing device, wherein the third plurality of programmable instructions, when operating on the processor, cause the processor to continuously monitor the project for at least source code changes and to make changes to the dataset as needed.

3. The system of claim 2, wherein the licensing service may be used to detect and automatically take steps to resolve inappropriate usage of the provided project.

4. The system of claim 1, further comprising a licensing service that the developer may use to manage, track, and restrict usage of the provided project.

5. The system of claim 1, further comprising a recommendation engine to provide usage recommendations to end-users.

6. The system of claim 1, wherein at least a portion of the information relating to the provided project that is gathered comprises links to relevant message forums.

7. The system of claim 1, wherein at least a portion of the information relating to the provided project that is gathered comprises vulnerability information of related libraries and dependencies.

8. The system of claim 1, wherein a software asset may be any medium associated with a software development process.

9. The system of claim 1, wherein the compliance recommendation is automatically applied.

10. The system of claim 1, further comprising a user interface.

11. A method for a compliance and testing framework for software development, comprising the steps of:
creating a dataset by processing and indexing source code of a project provided by a developer;
performing a code audit using automated analysis using a distributed computational graph comprising at least a plurality of network-addressable processors and memories operating on a plurality of network-connected computing devices, the distributed computational graph collectively maintaining a distributed computational graph and a plurality of interfaces for accessing the functionality thereof across a network, on the indexed source code;
storing results from the code audit in the dataset;
gathering additional information relating to a project;
storing the additional information in the dataset;
storing the dataset into memory;
retrieving a software asset from the database for compliance verification, wherein the software asset is a portion of code;
retrieving metadata from the additional information, wherein the metadata pertains to the software asset;
retrieving rules and obligations relating to the software asset using the metadata from a rules database;
automatically confirming the compliance of the software asset according to the rules and obligations;
producing a compliance recommendation for any non-complaint part of the software asset;
forwarding any non-automatically verifiable rule and obligation to an enforcement queue;
receiving a manual recommendation and an approval or disapproval regarding the any non-automatically verifiable rule and obligation; and
storing the results of the compliance verification.

12. The method of claim 11, further comprising the step of: continuously monitoring the project for at least source code changes and to make changes to the dataset as needed.

13. The method of claim 12, wherein the licensing service may be used to detect and automatically take steps to resolve inappropriate usage of the provided project.

14. The method of claim 11, further comprising a licensing service that the developer may use to manage, track, and restrict usage of the provided project.

15. The method of claim 11, further comprising a recommendation engine to provide usage recommendations to end-users.

16. The method of claim 11, wherein at least a portion of the information relating to the provided project that is gathered comprises links to relevant message forums.

17. The method of claim 11, wherein at least a portion of the information relating to the provided project that is gathered comprises vulnerability information of related libraries and dependencies.

18. The method of claim 11, wherein a software asset may be any medium associated with a software development process.

19. The method of claim 11, wherein the compliance recommendation is automatically applied.

20. The method of claim 11, further comprising a user interface.

* * * * *